(12) United States Patent
Snodgrass

(10) Patent No.: US 11,284,333 B2
(45) Date of Patent: Mar. 22, 2022

(54) ADAPTIVE ROUTE, BI-DIRECTIONAL NETWORK COMMUNICATION

(71) Applicant: Ecolab USA Inc., St. Paul, MN (US)

(72) Inventor: David L. Snodgrass, Stuart, FL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 16/723,234

(22) Filed: Dec. 20, 2019

(65) Prior Publication Data
US 2020/0205055 A1 Jun. 25, 2020

Related U.S. Application Data

(60) Provisional application No. 62/782,991, filed on Dec. 20, 2018.

(51) Int. Cl.
*H04W 40/32* (2009.01)
*H04L 12/44* (2006.01)
(Continued)

(52) U.S. Cl.
CPC ............. *H04W 40/32* (2013.01); *H04L 12/44* (2013.01); *H04L 45/745* (2013.01); *H04W 84/18* (2013.01); *H04W 88/16* (2013.01)

(58) Field of Classification Search
CPC ..... H04W 40/32; H04W 84/18; H04W 88/16; H04W 40/005; H04W 40/34;
(Continued)

(56) References Cited

U.S. PATENT DOCUMENTS 1,643,828 A  9/1927 Young
1,985,615 A  12/1934 Mitchell
(Continued)

FOREIGN PATENT DOCUMENTS

| AU | 200114943 | 5/2001 |
|---|---|---|
| AU | 2012360763 A1 | 7/2013 |
| AU | 2015202637 A1 | 6/2015 |
| AU | 2015258158 A1 | 12/2015 |
| AU | 2015275337 A1 | 1/2016 |

(Continued)

OTHER PUBLICATIONS

"America's Dirty Little Secret: Second Handwashing Survey Reveals Americans Still Don't Get It," American Society for Microbiology, Sep. 19, 2000, 3 pp. 2 "Don't Get Caught Dirty Handed," ASM's Microbes Afterhours, September 6, 2009, 11 pp.

(Continued)

*Primary Examiner* — Afshawn M Towfighi
(74) *Attorney, Agent, or Firm* — Shumaker & Sieffert, P.A.

(57) ABSTRACT

In an adaptive route wireless network and bi-directional protocol, each computing device along a route to a gateway appends the previous node's network address to downstream messages as they are transmitted along the route from an originating computing device to the gateway. The list of appended network addresses thus records the route taken by the downstream network message through the adaptive route network. A server computing device maintains a route table including the list of appended network addresses received with each downstream message. To send unsolicited upstream messages to any computing device on the wireless network, the server generates an upstream network message that includes the appended network address(es) from the portion of the route table corresponding to the destination computing device. The upstream route to the destination computing device is thus contained in the list of appended network addresses within the network message.

20 Claims, 38 Drawing Sheets

(51) Int. Cl.
   *H04L 45/745* (2022.01)
   *H04W 84/18* (2009.01)
   *H04W 88/16* (2009.01)

(58) Field of Classification Search
   CPC ...... H04W 40/00; H04W 40/24; H04L 12/44;
   H04L 45/745; H04L 67/12; H04L 45/00;
   H04L 45/40
   See application file for complete search history.

(56) References Cited

U.S. PATENT DOCUMENTS

| | | | |
|---|---|---|---|
| 2,219,597 A | 10/1940 | Lutz | |
| 2,319,739 A | 5/1943 | Kessler | |
| 2,333,791 A | 11/1943 | Hutchinson | |
| 3,091,327 A | 5/1963 | Lalley | |
| 3,136,157 A | 6/1964 | Seed et al. | |
| 3,412,254 A | 11/1968 | Meyer-Doering et al. | |
| 3,526,334 A | 9/1970 | Ashton et al. | |
| 3,578,094 A | 5/1971 | Henry et al. | |
| 3,653,544 A | 4/1972 | Young et al. | |
| 3,736,584 A | 5/1973 | Goble et al. | |
| 3,743,598 A | 7/1973 | Field | |
| 3,754,871 A | 8/1973 | Hessel et al. | |
| 3,760,166 A | 9/1973 | Adams et al. | |
| 3,761,909 A | 9/1973 | Schweitzer et al. | |
| 3,772,193 A | 11/1973 | Nelli et al. | |
| 3,774,056 A | 11/1973 | Sample et al. | |
| 3,786,467 A | 1/1974 | Cotter | |
| 3,801,977 A | 1/1974 | Cotter | |
| 3,796,349 A | 3/1974 | Weber | |
| 3,826,113 A | 7/1974 | Boraas et al. | |
| 3,826,408 A | 7/1974 | Berndt et al. | |
| 3,866,198 A | 2/1975 | Cohen | |
| 3,961,321 A | 6/1976 | Moss | |
| 3,986,182 A | 10/1976 | Hackett | |
| 4,040,515 A | 8/1977 | Hessel et al. | |
| 4,046,996 A | 9/1977 | Williams et al. | |
| 4,076,146 A | 2/1978 | Lausberg et al. | |
| 4,083,298 A | 4/1978 | Schotten | |
| 4,117,462 A | 9/1978 | Miller | |
| 4,198,618 A | 4/1980 | Kleinschmidt | |
| 4,199,001 A | 4/1980 | Kratz | |
| 4,209,776 A | 6/1980 | Frederick | |
| 4,211,517 A | 7/1980 | Schmid | |
| 4,241,400 A | 12/1980 | Keifer | |
| 4,247,396 A | 1/1981 | Buseing | |
| 4,265,266 A | 5/1981 | Kierbow et al. | |
| 4,275,390 A | 6/1981 | Heywang et al. | |
| 4,319,349 A | 3/1982 | Hackett | |
| 4,353,482 A | 10/1982 | Tomlinson et al. | |
| 4,360,905 A | 11/1982 | Hackett | |
| 4,373,418 A | 2/1983 | Rhodes et al. | |
| 4,380,726 A | 4/1983 | Sado et al. | |
| 4,396,828 A | 8/1983 | Dino et al. | |
| 4,402,426 A | 9/1983 | Faulkner et al. | |
| 4,404,639 A | 9/1983 | McGuire et al. | |
| 4,463,844 A | 8/1984 | Huffman et al. | |
| 4,482,785 A | 11/1984 | Finnegan et al. | |
| 4,486,910 A | 12/1984 | Saalmann | |
| 4,509,543 A | 4/1985 | Livingston et al. | |
| 4,523,219 A | 6/1985 | Heidegger et al. | |
| 4,539,846 A | 9/1985 | Grossman | |
| 4,573,606 A | 3/1986 | Lewis et al. | |
| 4,590,460 A | 5/1986 | Abbott et al. | |
| 4,597,091 A | 6/1986 | Blake | |
| 4,606,085 A | 8/1986 | Davies | |
| 4,630,654 A | 12/1986 | Kennedy, Jr. | |
| 4,644,509 A | 2/1987 | Kiewit | |
| 4,676,399 A | 6/1987 | Burckhardt | |
| 4,688,585 A | 8/1987 | Vetter | |
| 4,690,305 A | 9/1987 | Copeland | |
| 4,697,243 A | 9/1987 | Moore et al. | |
| 4,707,848 A | 11/1987 | Durston et al. | |
| 4,711,370 A | 12/1987 | Goudy, Jr. et al. | |
| 4,727,522 A | 2/1988 | Steiner et al. | |
| 4,729,120 A | 3/1988 | Steiner et al. | |
| 4,733,971 A | 3/1988 | Pratt | |
| 4,756,321 A | 7/1988 | Livingston et al. | |
| 4,766,548 A | 8/1988 | Cedrone et al. | |
| 4,770,859 A | 9/1988 | Heiser, Jr. | |
| 4,826,661 A | 5/1989 | Copeland et al. | |
| 4,834,546 A | 5/1989 | Putz | |
| 4,837,811 A | 6/1989 | Butler et al. | |
| 4,839,597 A | 6/1989 | Rowland | |
| 4,843,579 A | 6/1989 | Andrews et al. | |
| 4,845,965 A | 7/1989 | Copeland et al. | |
| 4,848,381 A | 7/1989 | Livingston et al. | |
| 4,858,449 A | 8/1989 | Lehn | |
| 4,867,196 A | 9/1989 | Zetena et al. | |
| 4,867,343 A | 9/1989 | Ricciardi et al. | |
| 4,896,144 A | 1/1990 | Bogstad | |
| 4,908,190 A | 3/1990 | Maglio et al. | |
| 4,938,240 A | 7/1990 | Lakhan et al. | |
| 4,944,428 A | 7/1990 | Gmuer et al. | |
| 4,964,185 A | 10/1990 | Lehn | |
| 4,969,011 A | 11/1990 | Faull et al. | |
| 4,974,646 A | 12/1990 | Martin et al. | |
| 4,976,137 A | 12/1990 | Decker et al. | |
| 4,980,292 A | 12/1990 | Elbert et al. | |
| D313,422 S | 1/1991 | Leonard et al. | |
| 4,987,402 A | 1/1991 | Nykerk | |
| 4,991,146 A | 2/1991 | Ransdell et al. | |
| 4,999,124 A | 3/1991 | Copeland | |
| 5,006,995 A | 4/1991 | Toschi et al. | |
| 5,014,211 A | 5/1991 | Turner et al. | |
| 5,014,877 A | 5/1991 | Roos | |
| 5,024,352 A | 6/1991 | Gmiir et al. | |
| 5,036,479 A | 7/1991 | Prednis et al. | |
| 5,038,807 A | 8/1991 | Bailey et al. | |
| 5,038,973 A | 8/1991 | Gmür et al. | |
| 5,040,699 A | 8/1991 | Gangemi | |
| 5,043,860 A | 8/1991 | Koether et al. | |
| 5,053,206 A | 10/1991 | Maglio et al. | |
| 5,064,094 A | 11/1991 | Roos et al. | |
| 5,083,298 A | 1/1992 | Citterio et al. | |
| 5,110,364 A | 5/1992 | Mazur et al. | |
| 5,115,842 A | 5/1992 | Crafts et al. | |
| 5,136,281 A | 8/1992 | Bonaquist | |
| 5,147,615 A | 9/1992 | Bird et al. | |
| 5,150,099 A | 9/1992 | Lienau | |
| 5,153,520 A | 10/1992 | Dumbeck | |
| 5,158,895 A | 10/1992 | Ashihara et al. | |
| 5,199,118 A | 4/1993 | Cole et al. | |
| 5,202,666 A | 4/1993 | Knippscheer | |
| 5,203,366 A | 4/1993 | Czeck et al. | |
| 5,219,224 A | 6/1993 | Pratt | |
| 5,222,027 A | 6/1993 | Williams et al. | |
| 5,240,326 A | 8/1993 | Evanson | |
| 5,245,317 A | 9/1993 | Chidley et al. | |
| 5,263,006 A | 11/1993 | Hermesmeyer | |
| 5,268,153 A | 12/1993 | Muller | |
| 5,279,448 A | 1/1994 | Hanlin et al. | |
| 5,283,639 A | 2/1994 | Esch et al. | |
| 5,294,022 A | 3/1994 | Earle | |
| 5,309,409 A | 5/1994 | Jones et al. | |
| 5,316,195 A | 5/1994 | Moksnes et al. | |
| 5,322,571 A | 6/1994 | Plummer et al. | |
| 5,332,312 A | 7/1994 | Evanson | |
| 5,345,379 A | 9/1994 | Brous et al. | |
| 5,369,032 A | 11/1994 | Pratt | |
| 5,370,267 A | 12/1994 | Schroeder | |
| 5,389,344 A | 2/1995 | Copeland et al. | |
| 5,390,385 A | 2/1995 | Beldham | |
| 5,397,028 A | 3/1995 | Jesadanont | |
| 5,400,018 A | 3/1995 | Scholl et al. | |
| 5,404,893 A | 4/1995 | Brady et al. | |
| 5,407,598 A | 4/1995 | Olson et al. | |
| 5,411,716 A | 5/1995 | Thomas et al. | |
| 5,427,748 A | 6/1995 | Wiedrich et al. | |
| 5,430,293 A | 7/1995 | Sato et al. | |
| 5,463,595 A | 10/1995 | Rodhall et al. | |
| 5,467,481 A | 11/1995 | Srivastava | |
| 5,476,385 A | 12/1995 | Parikh et al. | |

(56) References Cited

U.S. PATENT DOCUMENTS

| | | |
|---|---|---|
| 5,480,068 A | 1/1996 | Frazier et al. |
| 5,497,914 A | 3/1996 | Maltsis |
| 5,500,050 A | 3/1996 | Chan et al. |
| 5,505,915 A | 4/1996 | Copeland et al. |
| 5,556,478 A | 9/1996 | Brady et al. |
| 5,570,079 A | 10/1996 | Dockery |
| 5,580,448 A | 12/1996 | Brandreth |
| 5,581,982 A | 12/1996 | Schroeder et al. |
| 5,584,025 A | 12/1996 | Keithley et al. |
| 5,584,079 A | 12/1996 | Wong et al. |
| 5,609,417 A | 3/1997 | Otte |
| 5,610,589 A | 3/1997 | Evans et al. |
| 5,619,183 A | 4/1997 | Ziegra et al. |
| 5,624,810 A | 4/1997 | Miller et al. |
| 5,625,659 A | 4/1997 | Sears |
| 5,625,908 A | 5/1997 | Shaw |
| 5,632,411 A | 5/1997 | Harty et al. |
| 5,636,008 A | 6/1997 | Lobiondo et al. |
| 5,638,417 A | 6/1997 | Boyer et al. |
| 5,653,269 A | 8/1997 | Miller et al. |
| 5,661,471 A | 8/1997 | Kotlicki et al. |
| 5,671,262 A | 9/1997 | Boyer et al. |
| 5,679,173 A | 10/1997 | Hartman |
| 5,681,400 A | 10/1997 | Brady et al. |
| 5,684,458 A | 11/1997 | Calvarese |
| 5,687,717 A | 11/1997 | Halpern et al. |
| 5,694,323 A | 12/1997 | Koropitzer et al. |
| 5,695,091 A | 12/1997 | Winings et al. |
| 5,724,261 A | 3/1998 | Denny et al. |
| 5,731,526 A | 3/1998 | Kindrick |
| 5,735,925 A | 4/1998 | Scott |
| 5,745,381 A | 4/1998 | Tanaka et al. |
| 5,757,664 A | 5/1998 | Rogers et al. |
| 5,758,300 A | 5/1998 | Abe |
| 5,759,501 A | 6/1998 | Livingston et al. |
| 5,761,278 A | 6/1998 | Pickett et al. |
| 5,762,096 A | 6/1998 | Mirabile |
| 5,764,136 A | 6/1998 | Harron |
| 5,765,605 A | 6/1998 | Waymire et al. |
| 5,769,536 A | 6/1998 | Kotylak |
| 5,771,925 A | 6/1998 | Lewandowski |
| D396,009 S | 7/1998 | Reubens |
| 5,777,895 A | 7/1998 | Kuroda et al. |
| 5,781,942 A | 7/1998 | Allen et al. |
| 5,793,653 A | 8/1998 | Segal |
| 5,808,553 A | 9/1998 | Cunningham |
| 5,812,059 A | 9/1998 | Shaw et al. |
| 5,821,523 A | 10/1998 | Bunte et al. |
| 5,826,749 A | 10/1998 | Howland et al. |
| 5,827,486 A | 10/1998 | Crossdale |
| 5,839,097 A | 11/1998 | Klausner |
| 5,851,291 A | 12/1998 | Poterala et al. |
| 5,861,881 A | 1/1999 | Freeman et al. |
| 5,864,783 A | 1/1999 | Struck et al. |
| 5,875,430 A | 2/1999 | Koether |
| 5,885,446 A | 3/1999 | McGrew, Jr. |
| 5,887,145 A | 3/1999 | Harari et al. |
| 5,887,975 A | 3/1999 | Mordaunt et al. |
| 5,897,671 A | 4/1999 | Newman et al. |
| 5,900,067 A | 5/1999 | Jones |
| 5,902,749 A | 5/1999 | Lichtwardt et al. |
| 5,913,915 A | 6/1999 | McQuinn |
| 5,917,425 A | 6/1999 | Crimmins |
| 5,919,567 A | 7/1999 | Okada et al. |
| 5,931,877 A | 8/1999 | Smith et al. |
| 5,933,479 A | 8/1999 | Michael et al. |
| 5,938,074 A | 8/1999 | Dartus |
| 5,939,974 A | 8/1999 | Heagle et al. |
| 5,945,910 A | 8/1999 | Gorra |
| 5,952,924 A | 9/1999 | Evans et al. |
| 5,954,069 A | 9/1999 | Foster |
| 5,956,487 A | 9/1999 | Venkatraman et al. |
| 5,961,561 A | 10/1999 | Wakefield, II |
| 5,966,753 A | 10/1999 | Gauthier |
| 5,967,202 A | 10/1999 | Mullen et al. |
| 5,973,696 A | 10/1999 | Agranat et al. |
| 5,974,345 A | 10/1999 | Buck et al. |
| 5,975,352 A | 11/1999 | Spriggs et al. |
| 5,977,913 A | 11/1999 | Christ |
| 5,979,703 A | 11/1999 | Nystrom |
| 5,980,090 A | 11/1999 | Royal et al. |
| 5,987,105 A | 11/1999 | Jenkins et al. |
| 5,992,686 A | 11/1999 | Cline et al. |
| 6,003,070 A | 12/1999 | Frantz |
| 6,007,788 A | 12/1999 | Bellon et al. |
| 6,012,041 A | 1/2000 | Brewer et al. |
| 6,029,286 A | 2/2000 | Funk |
| 6,031,461 A | 2/2000 | Lynn |
| 6,038,331 A | 3/2000 | Johnson |
| 6,049,792 A | 4/2000 | Hart et al. |
| 6,061,668 A | 5/2000 | Sharrow |
| 6,065,639 A | 5/2000 | Maddox et al. |
| 6,073,124 A | 6/2000 | Krishnan et al. |
| 6,082,149 A | 7/2000 | Woods |
| 6,098,843 A | 8/2000 | Soberanis et al. |
| 6,120,175 A | 9/2000 | Tewell |
| 6,125,482 A | 10/2000 | Foster |
| 6,129,449 A | 10/2000 | McCain et al. |
| 6,130,607 A | 10/2000 | McClanahan et al. |
| 6,133,555 A | 10/2000 | Brenn |
| 6,136,184 A | 10/2000 | King |
| 6,147,607 A | 11/2000 | Lynn |
| 6,164,189 A | 12/2000 | Anson |
| 6,167,358 A | 12/2000 | Othmer et al. |
| 6,175,308 B1 | 1/2001 | Tailman et al. |
| 6,191,693 B1 | 2/2001 | Sangsingkeow |
| 6,211,788 B1 | 4/2001 | Lynn et al. |
| 6,213,424 B1 | 4/2001 | Helfer-Grand |
| 6,220,312 B1 | 4/2001 | Hirsch et al. |
| 6,221,788 B1 | 4/2001 | Kobayashi et al. |
| 6,236,317 B1 | 5/2001 | Cohen et al. |
| 6,236,953 B1 | 5/2001 | Segal |
| 6,247,621 B1 | 6/2001 | Lewis |
| 6,249,778 B1 | 6/2001 | Vaghi |
| 6,259,956 B1 | 7/2001 | Myers et al. |
| 6,269,975 B2 | 8/2001 | Soberanis et al. |
| 6,278,372 B1 | 8/2001 | Velasco, Jr. |
| 6,279,777 B1 | 8/2001 | Goodin et al. |
| 6,288,641 B1 | 9/2001 | Casais |
| 6,291,000 B1 | 9/2001 | Hayakawa |
| 6,314,282 B1 | 11/2001 | Weber et al. |
| 6,321,204 B1 | 11/2001 | Kazami et al. |
| 6,330,499 B1 | 12/2001 | Chou et al. |
| 6,331,964 B1 | 12/2001 | Barone |
| 6,347,724 B1 | 2/2002 | Chen et al. |
| 6,351,223 B1 | 2/2002 | DeWeerd et al. |
| 6,356,205 B1 | 3/2002 | Salvo et al. |
| 6,357,292 B1 | 3/2002 | Schultz et al. |
| 6,360,181 B1 | 3/2002 | Gemmell et al. |
| 6,368,420 B1 | 4/2002 | Angevaare et al. |
| 6,370,454 B1 | 4/2002 | Moore |
| 6,375,038 B1 | 4/2002 | Daansen et al. |
| 6,377,868 B1 | 4/2002 | Gardner, Jr. |
| 6,392,546 B1 | 5/2002 | Smith |
| 6,404,837 B1 | 6/2002 | Thompson et al. |
| 6,417,773 B1 | 7/2002 | Vlahos et al. |
| 6,418,371 B1 | 7/2002 | Arnold |
| 6,426,701 B1 | 7/2002 | Levy et al. |
| 6,438,471 B1 | 8/2002 | Katagishi et al. |
| 6,463,940 B1 | 10/2002 | Thomas et al. |
| 6,472,615 B1 | 10/2002 | Carlson |
| 6,476,385 B1 | 11/2002 | Albert |
| 6,485,979 B1 | 11/2002 | Kippenhan et al. |
| 6,490,513 B1 | 12/2002 | Fish et al. |
| 6,523,193 B2 | 2/2003 | Saraya |
| 6,524,390 B1 | 2/2003 | Jones |
| 6,547,097 B1 | 4/2003 | Cavallaro et al. |
| 6,561,381 B1 | 5/2003 | Osterheld et al. |
| 6,577,240 B2 | 6/2003 | Armstrong |
| 6,611,207 B1 | 8/2003 | Yuan et al. |
| 6,681,003 B2 | 1/2004 | Linder |
| 6,697,706 B2 | 2/2004 | Gardner, Jr. |
| 6,707,873 B2 | 3/2004 | Thompson et al. |
| 6,718,394 B2 | 4/2004 | Cain |

(56) References Cited

U.S. PATENT DOCUMENTS

| | | |
|---|---|---|
| 6,727,818 B1 | 4/2004 | Wildman et al. |
| 6,730,024 B2 | 5/2004 | Freyre et al. |
| 6,749,148 B2 | 6/2004 | Helfer-Grand |
| 6,759,959 B2 | 7/2004 | Wildman |
| 6,762,161 B2 | 7/2004 | Sava et al. |
| 6,778,092 B2 | 8/2004 | Braune |
| 6,781,523 B2 | 8/2004 | Matsui et al. |
| 6,792,395 B2 | 9/2004 | Roberts |
| 6,799,085 B1 | 9/2004 | Crisp, III |
| 6,807,460 B2 | 10/2004 | Black et al. |
| 6,870,846 B2 | 3/2005 | Cain |
| 6,882,278 B2 | 4/2005 | Winings et al. |
| 6,882,315 B2 | 4/2005 | Richley et al. |
| 6,883,563 B2 | 4/2005 | Smith |
| 6,893,321 B1 | 5/2005 | Buchanan et al. |
| 6,896,140 B1 | 5/2005 | Perry |
| 6,897,780 B2 | 5/2005 | Ulrich et al. |
| 6,917,290 B2 | 7/2005 | Land |
| 6,919,567 B2 | 7/2005 | Iwasawa |
| 6,950,683 B2 | 9/2005 | Hunt |
| 6,956,498 B1 | 10/2005 | Gauthier et al. |
| 6,970,860 B1 | 11/2005 | Liu et al. |
| 6,975,231 B2 | 12/2005 | Lane et al. |
| 6,977,588 B2 | 12/2005 | Schotz et al. |
| 6,987,228 B1 | 1/2006 | MacMichael et al. |
| 6,991,779 B2 | 1/2006 | Steiner et al. |
| 7,015,816 B2 | 3/2006 | Wildman et al. |
| 7,023,341 B2 | 4/2006 | Stilp |
| 7,023,356 B2 | 4/2006 | Burkhardt et al. |
| 7,042,361 B2 | 5/2006 | Kazdin et al. |
| 7,056,050 B2 | 6/2006 | Sacks |
| 7,067,054 B2 | 6/2006 | Fritze |
| 7,069,188 B2 | 6/2006 | Roberts |
| 7,075,412 B1 | 7/2006 | Reynolds et al. |
| 7,099,781 B1 | 8/2006 | Heidl et al. |
| 7,099,856 B2 | 8/2006 | Barangan et al. |
| 7,117,374 B2 | 10/2006 | Hill et al. |
| 7,119,688 B2 | 10/2006 | Wildman |
| 7,119,692 B2 | 10/2006 | Lieffort et al. |
| 7,128,215 B2 | 10/2006 | Danechi |
| 7,142,108 B2 | 11/2006 | Diener et al. |
| 7,154,397 B2 | 12/2006 | Zerhusen et al. |
| 7,157,045 B2 | 1/2007 | McVey |
| 7,160,846 B2 | 1/2007 | Biering et al. |
| 7,175,048 B2 | 2/2007 | Wolfschaffner |
| 7,187,287 B2 | 3/2007 | Ryal |
| 7,191,090 B1 | 3/2007 | Cunningham |
| 7,201,005 B2 | 4/2007 | Voglewede et al. |
| 7,202,780 B2 | 4/2007 | Teller |
| 7,228,990 B2 | 6/2007 | Schmidt |
| 7,236,097 B1 | 6/2007 | Cunningham |
| 7,242,306 B2 | 7/2007 | Wildman et al. |
| 7,242,307 B1 | 7/2007 | LeBlond et al. |
| 7,248,933 B2 | 7/2007 | Wildman |
| 7,265,673 B2 | 9/2007 | Teller |
| 7,266,347 B2 | 9/2007 | Gross |
| 7,267,531 B2 | 9/2007 | Anderson et al. |
| 7,271,728 B2 | 9/2007 | Taylor et al. |
| 7,272,537 B2 | 9/2007 | Mogadam |
| 7,286,057 B2 | 10/2007 | Bolling |
| 7,292,914 B2 | 11/2007 | Jungmann et al. |
| 7,293,645 B2 | 11/2007 | Harper et al. |
| 7,315,245 B2 | 1/2008 | Lynn et al. |
| 7,320,418 B2 | 1/2008 | Sassoon |
| 7,330,108 B2 | 2/2008 | Thomas |
| 7,372,367 B2 | 5/2008 | Lane et al. |
| 7,375,640 B1 | 5/2008 | Plost |
| 7,400,264 B2 | 7/2008 | Boaz |
| 7,408,470 B2 | 8/2008 | Wildman et al. |
| 7,411,511 B2 | 8/2008 | Kennish et al. |
| 7,423,533 B1 | 9/2008 | LeBlond et al. |
| 7,425,900 B2 | 9/2008 | Lynn et al. |
| 7,440,620 B1 | 10/2008 | Aartsen |
| 7,443,302 B2 | 10/2008 | Reeder et al. |
| 7,443,305 B2 | 10/2008 | Verdiramo |
| RE40,588 E | 11/2008 | Ostendorf et al. |
| 7,450,472 B2 | 11/2008 | Guyvarch |
| 7,457,869 B2 | 11/2008 | Keman |
| 7,474,215 B2 | 1/2009 | Scott et al. |
| 7,477,148 B2 | 1/2009 | Lynn et al. |
| 7,482,936 B2 | 1/2009 | Bolling |
| 7,486,193 B2 | 2/2009 | Elwell |
| 7,487,538 B2 | 2/2009 | Mok |
| 7,490,045 B1 | 2/2009 | Flores et al. |
| 7,496,479 B2 | 2/2009 | Garcia et al. |
| 7,530,729 B2 | 5/2009 | O'Callaghan |
| 7,538,680 B2 | 5/2009 | Scott et al. |
| 7,551,092 B1 | 6/2009 | Henry |
| 7,597,122 B1 | 10/2009 | Smith |
| 7,600,137 B2 | 10/2009 | Trappeniers et al. |
| 7,605,704 B2 | 10/2009 | Munro et al. |
| 7,611,030 B2 | 11/2009 | Reynolds et al. |
| 7,616,122 B2 | 11/2009 | Bolling |
| 7,649,884 B1 * | 1/2010 | Ahmed ............... H04L 45/026 370/390 |
| 7,682,464 B2 | 3/2010 | Glenn et al. |
| 7,718,395 B2 | 5/2010 | Carling |
| 7,738,457 B2 * | 6/2010 | Nordmark ............ H04L 45/60 370/392 |
| 7,755,494 B2 | 7/2010 | Melker et al. |
| 7,770,782 B2 | 8/2010 | Sahud |
| 7,780,453 B2 | 8/2010 | Carling |
| 7,783,380 B2 | 8/2010 | York et al. |
| 7,785,109 B2 | 8/2010 | Carling |
| 7,812,730 B2 | 10/2010 | Wildman et al. |
| 7,855,651 B2 | 12/2010 | LeBlond et al. |
| 7,891,523 B2 | 2/2011 | Mehus et al. |
| 7,893,842 B2 | 2/2011 | Deutsch |
| 7,898,407 B2 | 3/2011 | Hufton et al. |
| 7,952,484 B2 | 5/2011 | Lynn |
| 7,978,564 B2 | 7/2011 | DeLaHuerga |
| 7,982,619 B2 | 7/2011 | Bolling |
| 8,020,733 B2 | 9/2011 | Snodgrass |
| 8,026,821 B2 | 9/2011 | Reeder et al. |
| 8,040,245 B2 | 10/2011 | Koblasz |
| 8,045,498 B2 | 10/2011 | Hyland |
| 8,056,768 B2 | 11/2011 | Snodgrass |
| 8,085,155 B2 | 12/2011 | Prodanovich et al. |
| D654,743 S | 2/2012 | Rospierski |
| 8,146,613 B2 | 4/2012 | Barnhill et al. |
| 8,152,027 B1 | 4/2012 | Baker |
| 8,154,412 B2 | 4/2012 | Verdiramo |
| 8,164,439 B2 | 4/2012 | Dempsey et al. |
| 8,196,810 B2 | 6/2012 | Sahud |
| 8,212,653 B1 | 7/2012 | Goldstein et al. |
| 8,237,558 B2 | 8/2012 | Momen et al. |
| 8,240,517 B1 | 8/2012 | Stob et al. |
| 8,249,295 B2 | 8/2012 | Johnson |
| 8,258,965 B2 | 9/2012 | Reeder et al. |
| 8,261,950 B2 | 9/2012 | Cittadino et al. |
| 8,264,343 B2 | 9/2012 | Snodgrass |
| 8,279,063 B2 | 10/2012 | Wohltjen |
| 8,294,585 B2 | 10/2012 | Barnhill |
| 8,308,027 B2 | 11/2012 | Law et al. |
| 8,342,365 B2 | 1/2013 | Snodgrass |
| 8,344,893 B1 | 1/2013 | Drammeh |
| 8,350,706 B2 | 1/2013 | Wegelin et al. |
| 8,368,544 B2 | 2/2013 | Wildman et al. |
| 8,372,207 B1 | 2/2013 | Shields |
| 8,395,515 B2 | 3/2013 | Tokhtuev et al. |
| 8,400,309 B2 | 3/2013 | Glenn et al. |
| 8,427,323 B2 | 4/2013 | Alper et al. |
| 8,482,406 B2 | 7/2013 | Snodgrass |
| 8,502,680 B2 | 8/2013 | Tokhtuev et al. |
| 8,502,681 B2 | 8/2013 | Bolling et al. |
| 8,511,512 B2 | 8/2013 | Carlson et al. |
| 8,525,666 B2 | 9/2013 | Melker et al. |
| 8,547,220 B1 | 10/2013 | Dempsey et al. |
| 8,558,660 B2 | 10/2013 | Nix et al. |
| 8,558,701 B2 | 10/2013 | Wegelin et al. |
| 8,564,431 B2 | 10/2013 | Snodgrass |
| D693,140 S | 11/2013 | Rospierski |
| 8,587,437 B2 | 11/2013 | Kyle et al. |
| 8,598,996 B2 | 12/2013 | Wildman et al. |

(56) References Cited

U.S. PATENT DOCUMENTS

| | | |
|---|---|---|
| 8,633,806 B2 | 1/2014 | Amir |
| 8,633,816 B2 | 1/2014 | Snodgrass et al. |
| 8,639,527 B2 | 1/2014 | Rensvold et al. |
| 8,646,656 B2 | 2/2014 | Johnson |
| 8,648,724 B2 | 2/2014 | Forsberg et al. |
| 8,651,328 B2 | 2/2014 | Cittadinoc |
| 8,668,145 B2 | 3/2014 | Tessier |
| 8,674,840 B2 | 3/2014 | Snodgrass |
| 8,698,637 B2 | 4/2014 | Raichman |
| 8,720,107 B1 | 5/2014 | Vickery |
| 8,776,817 B2 | 7/2014 | Sawaski et al. |
| 8,783,511 B2 | 7/2014 | Snodgrass |
| 8,786,429 B2 | 7/2014 | Li et al. |
| 8,816,860 B2 | 8/2014 | Ophardt et al. |
| 8,823,525 B2 | 9/2014 | Cartner et al. |
| 8,842,406 B2 | 9/2014 | Tseng et al. |
| 8,847,752 B2 | 9/2014 | Wegelin et al. |
| 8,872,665 B2 | 10/2014 | Snodgrass |
| 8,903,416 B1 | 12/2014 | Perkins et al. |
| D48,940 S | 2/2015 | Keown et al. |
| 8,963,721 B2 | 2/2015 | Harris et al. |
| 8,963,723 B2 | 2/2015 | Snodgrass |
| 8,976,031 B2 | 3/2015 | Ophardt |
| 8,988,228 B2 | 3/2015 | Iseri et al. |
| 8,990,098 B2 | 3/2015 | Swart et al. |
| 8,994,537 B2 | 3/2015 | Pokrajac |
| 8,999,261 B2 | 4/2015 | Benedetto |
| 9,000,930 B2 | 4/2015 | Pelland et al. |
| 9,007,936 B2 | 4/2015 | Gaylard et al. |
| 9,013,312 B2 | 4/2015 | Bolling |
| D134,354 S | 5/2015 | Alper et al. |
| 9,047,755 B2 | 6/2015 | Bonner |
| 9,060,655 B2 | 6/2015 | Iseri et al. |
| 9,076,044 B2 | 7/2015 | Dryer et al. |
| 9,111,435 B2 | 8/2015 | Gips et al. |
| 9,117,361 B1 | 8/2015 | Hennigan et al. |
| 9,123,233 B2 | 9/2015 | Hermann |
| 9,159,216 B2 | 10/2015 | Limbert et al. |
| 9,218,734 B2 | 12/2015 | Wallace et al. |
| 9,235,977 B2 | 1/2016 | Deutsch |
| 9,239,361 B2 | 1/2016 | Long |
| 9,262,905 B2 | 2/2016 | Wegelin et al. |
| 9,271,611 B2 | 3/2016 | Stratman |
| 9,271,612 B2 | 3/2016 | Miller |
| 9,299,238 B1 | 3/2016 | Ahmad et al. |
| 9,311,809 B2 | 4/2016 | Diaz |
| 9,317,817 B2 | 4/2016 | Barsky |
| 9,328,490 B2 | 5/2016 | Bayley et al. |
| 9,349,274 B2 | 5/2016 | Wegelin et al. |
| 9,373,242 B1 | 6/2016 | Conrad et al. |
| 9,437,103 B2 | 9/2016 | Ophardt |
| 9,472,089 B2 | 10/2016 | AlHazme |
| 9,478,118 B2 | 10/2016 | Keown et al. |
| 9,497,428 B2 | 11/2016 | Gaisser et al. |
| 9,524,480 B2 | 12/2016 | Christensen |
| 9,524,632 B2 | 12/2016 | Moore |
| 9,526,380 B2 | 12/2016 | Hamilton et al. |
| 9,536,415 B2 | 1/2017 | De Luca et al. |
| 9,561,517 B2 | 2/2017 | Wertheim et al. |
| 9,613,519 B2 | 4/2017 | Iseri et al. |
| 9,626,650 B2 | 4/2017 | Hwang et al. |
| 9,628,434 B2 | 4/2017 | Laidlaw et al. |
| 9,633,543 B2 | 4/2017 | Wegelin et al. |
| 9,633,544 B2 | 4/2017 | Wegelin et al. |
| 9,633,545 B2 | 4/2017 | Wegelin et al. |
| 9,640,059 B2 | 5/2017 | Hyland |
| 9,702,961 B2 | 7/2017 | Shields |
| 9,824,569 B2 | 11/2017 | Snodgrass |
| 9,830,764 B1 | 11/2017 | Murphy |
| 9,881,485 B2 | 1/2018 | Hajdenberg |
| 9,920,553 B2 | 3/2018 | Limbert et al. |
| 10,022,023 B2 | 7/2018 | Santoro et al. |
| 10,123,661 B2 | 11/2018 | Wertheim et al. |
| 10,226,037 B2 | 3/2019 | States, III et al. |
| 10,373,477 B1 | 8/2019 | Bonner et al. |
| 10,490,057 B1 | 11/2019 | Malina et al. |
| 10,529,219 B2 | 1/2020 | Herdt et al. |
| 10,665,084 B1 | 5/2020 | Peck et al. |
| 10,714,216 B1 | 7/2020 | Hardman et al. |
| 10,743,720 B2 | 8/2020 | Wertheim |
| 10,743,721 B2 | 8/2020 | Wertheim |
| 10,978,200 B1 | 4/2021 | Hardman et al. |
| 2001/0023841 A1 | 9/2001 | Zimmerman et al. |
| 2001/0028308 A1 | 10/2001 | De La Huerga |
| 2001/0039501 A1 | 11/2001 | Crevel et al. |
| 2001/0047214 A1 | 11/2001 | Cocking et al. |
| 2001/0053939 A1 | 12/2001 | Crevel et al. |
| 2001/0054038 A1 | 12/2001 | Crevel et al. |
| 2001/0054626 A1 | 12/2001 | Bethune et al. |
| 2002/0000449 A1 | 1/2002 | Armstrong |
| 2002/0005414 A1 | 1/2002 | DeKoning et al. |
| 2002/0014496 A1 | 2/2002 | Cline et al. |
| 2002/0019709 A1 | 2/2002 | Segal |
| 2002/0050006 A1 | 5/2002 | Saraya |
| 2002/0096537 A1 | 7/2002 | Gardner, Jr. |
| 2002/0100676 A1 | 8/2002 | Janniere |
| 2002/0103671 A1 | 8/2002 | Pederson et al. |
| 2002/0107744 A1 | 8/2002 | Rosenberg et al. |
| 2002/0117187 A1 | 8/2002 | Helminger |
| 2002/0132343 A1 | 9/2002 | Lum |
| 2002/0135486 A1 | 9/2002 | Brohagen et al. |
| 2002/0145523 A1 | 10/2002 | Robaey |
| 2002/0168216 A1 | 11/2002 | Policicchio et al. |
| 2002/0175182 A1 | 11/2002 | Matthews |
| 2002/0183979 A1 | 12/2002 | Wildman |
| 2003/0030562 A1 | 2/2003 | Lane et al. |
| 2003/0033396 A1 | 2/2003 | McCall |
| 2003/0043688 A1 | 3/2003 | Peterson et al. |
| 2003/0065536 A1 | 4/2003 | Hansen et al. |
| 2003/0074222 A1 | 4/2003 | Rosow et al. |
| 2003/0109057 A1 | 6/2003 | DiCesare et al. |
| 2003/0121561 A1 | 7/2003 | Wagner et al. |
| 2003/0155035 A1 | 8/2003 | Ichikawa et al. |
| 2003/0182180 A1 | 9/2003 | Zarrow |
| 2004/0001009 A1 | 1/2004 | Winings et al. |
| 2004/0015269 A1 | 1/2004 | Jungmann et al. |
| 2004/0018839 A1 | 1/2004 | Andric et al. |
| 2004/0028608 A1 | 2/2004 | Saul et al. |
| 2004/0049369 A1 | 3/2004 | Konicek et al. |
| 2004/0075347 A1 | 4/2004 | Biskup et al. |
| 2004/0088076 A1 | 5/2004 | Gardner |
| 2004/0090333 A1 | 5/2004 | Wildman et al. |
| 2004/0148196 A1 | 7/2004 | Kalies |
| 2004/0150527 A1 | 8/2004 | Harper et al. |
| 2004/0162850 A1 | 8/2004 | Sanville et al. |
| 2004/0220844 A1 | 11/2004 | Sanville et al. |
| 2004/0226956 A1 | 11/2004 | Brooks |
| 2004/0226959 A1 | 11/2004 | Mehus et al. |
| 2004/0226962 A1 | 11/2004 | Mazursky et al. |
| 2004/0230339 A1 | 11/2004 | Maser et al. |
| 2005/0065644 A1 | 3/2005 | Gardner, Jr. et al. |
| 2005/0072793 A1 | 4/2005 | Mehus et al. |
| 2005/0086341 A1 | 4/2005 | Enga et al. |
| 2005/0102167 A1 | 5/2005 | Kapoor |
| 2005/0134465 A1 | 6/2005 | Rice et al. |
| 2005/0134466 A1 | 6/2005 | Tirkel |
| 2005/0149341 A1 | 7/2005 | Eguchi et al. |
| 2005/0171634 A1 | 8/2005 | York et al. |
| 2005/0222889 A1 | 10/2005 | Lai et al. |
| 2005/0248461 A1 | 11/2005 | Lane et al. |
| 2006/0067545 A1 | 3/2006 | Lewis et al. |
| 2006/0067546 A1 | 3/2006 | Lewis et al. |
| 2006/0071799 A1 | 4/2006 | Verdiramo |
| 2006/0104245 A1 | 5/2006 | Naravanaswami et al. |
| 2006/0132316 A1 | 6/2006 | Wildman et al. |
| 2006/0139449 A1 | 6/2006 | Cheng et al. |
| 2006/0140703 A1 | 6/2006 | Sacks |
| 2006/0154642 A1 | 7/2006 | Scannell |
| 2006/0156415 A1 | 7/2006 | Rubinstein et al. |
| 2006/0191068 A1 | 8/2006 | Vlahos et al. |
| 2006/0223731 A1 | 10/2006 | Carling |
| 2006/0229821 A1 | 10/2006 | Brossette et al. |
| 2006/0240397 A1 | 10/2006 | Lynn et al. |

(56) References Cited

U.S. PATENT DOCUMENTS

| | | | |
|---|---|---|---|
| 2006/0248588 A1* | 11/2006 | Jayaraman | H04L 63/1458 726/22 |
| 2006/0272361 A1 | 12/2006 | Snodgrass | |
| 2006/0273915 A1 | 12/2006 | Snodgrass | |
| 2006/0277065 A1 | 12/2006 | Guten et al. | |
| 2007/0008146 A1 | 1/2007 | Taylor et al. | |
| 2007/0008147 A1 | 1/2007 | Bolling | |
| 2007/0008149 A1 | 1/2007 | Boiling | |
| 2007/0016466 A1 | 1/2007 | Taylor | |
| 2007/0020212 A1 | 1/2007 | Bernal et al. | |
| 2007/0029962 A1 | 2/2007 | Saeki | |
| 2007/0044819 A1 | 3/2007 | Chan et al. | |
| 2007/0055483 A1 | 3/2007 | Lee et al. | |
| 2007/0056091 A1 | 3/2007 | Bolton et al. | |
| 2007/0069884 A1 | 3/2007 | Waxman | |
| 2007/0096930 A1 | 5/2007 | Cardoso | |
| 2007/0135866 A1 | 6/2007 | Baker et al. | |
| 2007/0182581 A1 | 8/2007 | Elwell | |
| 2007/0198067 A1 | 8/2007 | Van den Heuvel et al. | |
| 2007/0205861 A1 | 9/2007 | Nair et al. | |
| 2007/0213877 A1 | 9/2007 | Hart et al. | |
| 2007/0222599 A1 | 9/2007 | Coveley et al. | |
| 2007/0228065 A1 | 10/2007 | Anderson et al. | |
| 2007/0229288 A1 | 10/2007 | Ogrin et al. | |
| 2007/0247316 A1 | 10/2007 | Wildman et al. | |
| 2007/0257803 A1 | 11/2007 | Munro et al. | |
| 2007/0285277 A1 | 12/2007 | Scott et al. | |
| 2007/0290865 A1 | 12/2007 | Lynn et al. | |
| 2008/0001763 A1 | 1/2008 | Raja et al. | |
| 2008/0019489 A1 | 1/2008 | Lynn | |
| 2008/0019490 A1 | 1/2008 | Lynn | |
| 2008/0046278 A1 | 2/2008 | Sanville et al. | |
| 2008/0084315 A1 | 4/2008 | Pittz | |
| 2008/0087719 A1 | 4/2008 | Sahud | |
| 2008/0095677 A1 | 4/2008 | McSherry et al. | |
| 2008/0100441 A1 | 5/2008 | Prodanovich et al. | |
| 2008/0103636 A1 | 5/2008 | Glenn et al. | |
| 2008/0131332 A1 | 6/2008 | Nguyen et al. | |
| 2008/0136649 A1 | 6/2008 | Van De Hey | |
| 2008/0177155 A1 | 7/2008 | Hansen et al. | |
| 2008/0185540 A1 | 8/2008 | Turner et al. | |
| 2008/0189142 A1 | 8/2008 | Brown et al. | |
| 2008/0193631 A1 | 8/2008 | Kanamori et al. | |
| 2008/0246599 A1 | 10/2008 | Hufton et al. | |
| 2008/0262097 A1 | 10/2008 | Eady et al. | |
| 2008/0266113 A1 | 10/2008 | Kennish et al. | |
| 2008/0267408 A1 | 10/2008 | Hsieh | |
| 2008/0271928 A1 | 11/2008 | Mehus et al. | |
| 2008/0280380 A1 | 11/2008 | Dietz et al. | |
| 2008/0283145 A1 | 11/2008 | Maxwell | |
| 2008/0290112 A1 | 11/2008 | Lynn | |
| 2008/0303658 A1 | 12/2008 | Melker et al. | |
| 2009/0002644 A1 | 1/2009 | Christensen et al. | |
| 2009/0019552 A1 | 1/2009 | McLaughlin et al. | |
| 2009/0030721 A1 | 1/2009 | Garcia et al. | |
| 2009/0037026 A1 | 2/2009 | Sostaric et al. | |
| 2009/0049610 A1 | 2/2009 | Heimbrock et al. | |
| 2009/0051545 A1 | 2/2009 | Koblasz | |
| 2009/0068116 A1 | 3/2009 | Arndt | |
| 2009/0084407 A1 | 4/2009 | Glenn et al. | |
| 2009/0090564 A1 | 4/2009 | Kresina | |
| 2009/0091458 A1 | 4/2009 | Deutsch | |
| 2009/0102681 A1 | 4/2009 | Brennan, Jr. et al. | |
| 2009/0112360 A1 | 4/2009 | Berg | |
| 2009/0112541 A1 | 4/2009 | Anderson et al. | |
| 2009/0112630 A1 | 4/2009 | Collins, Jr. et al. | |
| 2009/0119142 A1 | 5/2009 | Yenni et al. | |
| 2009/0125424 A1 | 5/2009 | Wegelin | |
| 2009/0127282 A1 | 5/2009 | Reynolds et al. | |
| 2009/0138303 A1 | 5/2009 | Seshadri | |
| 2009/0145925 A1 | 6/2009 | Wegelin | |
| 2009/0148342 A1 | 6/2009 | Bromberg et al. | |
| 2009/0166378 A1 | 7/2009 | Stilley | |
| 2009/0171502 A1 | 7/2009 | Freidin | |
| 2009/0195385 A1 | 8/2009 | Huang | |
| 2009/0204256 A1 | 8/2009 | Wegelin | |
| 2009/0219131 A1 | 9/2009 | Barnett et al. | |
| 2009/0219172 A1 | 9/2009 | Wilbrod | |
| 2009/0224907 A1 | 9/2009 | Sinha et al. | |
| 2009/0224924 A1 | 9/2009 | Thom | |
| 2009/0266842 A1 | 10/2009 | Snodgrass | |
| 2009/0267776 A1 | 10/2009 | Glenn et al. | |
| 2009/0272405 A1 | 11/2009 | Barnhill et al. | |
| 2009/0273477 A1 | 11/2009 | Barnhill | |
| 2009/0276239 A1 | 11/2009 | Swart et al. | |
| 2009/0294469 A1 | 12/2009 | Poulain et al. | |
| 2009/0299787 A1 | 12/2009 | Barnhill | |
| 2009/0301523 A1 | 12/2009 | Barnhill et al. | |
| 2010/0074157 A1* | 3/2010 | Doh | H04W 84/18 370/311 |
| 2010/0084486 A1 | 4/2010 | Kim | |
| 2010/0094581 A1 | 4/2010 | Cagle | |
| 2010/0097224 A1 | 4/2010 | Prodanovich et al. | |
| 2010/0117823 A1 | 5/2010 | Wholtjen | |
| 2010/0117836 A1 | 5/2010 | Momen et al. | |
| 2010/0134296 A1 | 6/2010 | Hwang | |
| 2010/0153374 A1 | 6/2010 | LeBlond et al. | |
| 2010/0173581 A1 | 7/2010 | Dolan | |
| 2010/0188228 A1 | 7/2010 | Hyland | |
| 2010/0233020 A1 | 9/2010 | Klaassen et al. | |
| 2010/0238021 A1 | 9/2010 | Harris | |
| 2010/0274640 A1 | 10/2010 | Morey et al. | |
| 2010/0315243 A1 | 12/2010 | Tokhtuev et al. | |
| 2010/0315244 A1 | 12/2010 | Tokhtuev et al. | |
| 2010/0328076 A1 | 12/2010 | Kyle et al. | |
| 2010/0332022 A1 | 12/2010 | Wegelin et al. | |
| 2011/0018056 A1 | 1/2011 | Takeuchi | |
| 2011/0063106 A1 | 3/2011 | Snodgrass | |
| 2011/0088809 A1 | 4/2011 | Lin | |
| 2011/0093313 A1 | 4/2011 | LeBlond et al. | |
| 2011/0291841 A1 | 4/2011 | Hollock et al. | |
| 2011/0121974 A1 | 5/2011 | Tenarvitz et al. | |
| 2011/0169645 A1 | 7/2011 | Cartner et al. | |
| 2011/0169646 A1 | 7/2011 | Raichman | |
| 2011/0193703 A1 | 8/2011 | Payton et al. | |
| 2011/0196720 A1 | 8/2011 | Guten et al. | |
| 2011/0234598 A1 | 9/2011 | Scarola et al. | |
| 2011/0260872 A1 | 10/2011 | Kennish et al. | |
| 2011/0273298 A1 | 11/2011 | Snodgrass et al. | |
| 2011/0286326 A1 | 11/2011 | Awano | |
| 2011/0296664 A1 | 12/2011 | Minard et al. | |
| 2011/0316695 A1 | 12/2011 | Li et al. | |
| 2011/0316701 A1 | 12/2011 | Alper et al. | |
| 2011/0316703 A1 | 12/2011 | Butler et al. | |
| 2012/0024890 A1 | 2/2012 | Ota et al. | |
| 2012/0047988 A1 | 3/2012 | Mehus et al. | |
| 2012/0062382 A1 | 3/2012 | Taneff | |
| 2012/0112906 A1 | 5/2012 | Borke et al. | |
| 2012/0112914 A1 | 5/2012 | Wegelin et al. | |
| 2012/0168459 A1 | 7/2012 | D'Onofrio | |
| 2012/0212344 A1 | 8/2012 | Forsberg et al. | |
| 2012/0218106 A1 | 8/2012 | Zaima et al. | |
| 2012/0245729 A1 | 9/2012 | Wegelin et al. | |
| 2012/0256742 A1 | 10/2012 | Snodgrass et al. | |
| 2012/0274468 A1 | 11/2012 | Wegelin et al. | |
| 2012/0310664 A1 | 12/2012 | Long et al. | |
| 2012/0329438 A1 | 12/2012 | Snodgrass | |
| 2013/0045685 A1 | 2/2013 | Kiani | |
| 2013/0075346 A1 | 3/2013 | Rumberger et al. | |
| 2013/0076514 A1 | 3/2013 | Wegelin et al. | |
| 2013/0091631 A1 | 4/2013 | Hayes et al. | |
| 2013/0098941 A1 | 4/2013 | Wegelin | |
| 2013/0099900 A1 | 4/2013 | Pulvermacher | |
| 2013/0113931 A1 | 5/2013 | Alper | |
| 2013/0120120 A1 | 5/2013 | Long et al. | |
| 2013/0122807 A1* | 5/2013 | Tenarvitz | H04B 5/0031 455/41.1 |
| 2013/0133762 A1 | 5/2013 | Snodgrass | |
| 2013/0224076 A1 | 8/2013 | Hansmann et al. | |
| 2013/0229276 A1 | 9/2013 | Hunter | |
| 2013/0234855 A1* | 9/2013 | Knighton | G16H 40/20 340/573.1 |
| 2013/0257615 A1 | 10/2013 | Iser et al. | |
| 2013/0261795 A1 | 10/2013 | Long et al. | |

(56) References Cited

U.S. PATENT DOCUMENTS

| | | |
|---|---|---|
| 2013/0264355 A1 | 10/2013 | Jodoin |
| 2013/0285814 A1 | 10/2013 | Snodgrass |
| 2013/0290016 A1 | 10/2013 | Alper et al. |
| 2013/0292407 A1 | 11/2013 | Beavis et al. |
| 2013/0306105 A1 | 11/2013 | Battah |
| 2013/0332184 A1 | 12/2013 | Burnham et al. |
| 2013/0333184 A1 | 12/2013 | Couture et al. |
| 2013/0342349 A1 | 12/2013 | Cruz |
| 2014/0009292 A1 | 1/2014 | Long et al. |
| 2014/0015670 A1 | 1/2014 | Wegelin et al. |
| 2014/0070950 A1 | 3/2014 | Snodgrass |
| 2014/0081653 A1 | 3/2014 | Davis et al. |
| 2014/0108039 A1 | 4/2014 | Rensvold et al. |
| 2014/0158714 A1 | 6/2014 | Snodgrass et al. |
| 2014/0180713 A1 | 6/2014 | Tenarvitz et al. |
| 2014/0210620 A1 | 7/2014 | Snodgrass |
| 2014/0214449 A1 | 7/2014 | Long et al. |
| 2014/0231455 A1 | 8/2014 | Jersey et al. |
| 2014/0242562 A1 | 8/2014 | McSterling et al. |
| 2014/0253334 A1 | 9/2014 | Hanlin et al. |
| 2014/0253336 A1 | 9/2014 | Ophardt |
| 2014/0279603 A1 | 9/2014 | Ortiz et al. |
| 2014/0311239 A1 | 10/2014 | Marjanovic et al. |
| 2014/0320289 A1 | 10/2014 | Raichman |
| 2014/0327545 A1 | 11/2014 | Bolling et al. |
| 2014/0333433 A1 | 11/2014 | Li et al. |
| 2014/0333744 A1 | 11/2014 | Baym et al. |
| 2014/0347185 A1 | 11/2014 | Smith et al. |
| 2014/0361898 A1 | 12/2014 | Wegelin et al. |
| 2014/0366264 A1 | 12/2014 | Ciavarella et al. |
| 2014/0368320 A1 | 12/2014 | Hyland |
| 2015/0022361 A1 | 1/2015 | Gaisser et al. |
| 2015/0035678 A1 | 2/2015 | Long |
| 2015/0048940 A1 | 2/2015 | Keown et al. |
| 2015/0061867 A1 | 3/2015 | Engelhard et al. |
| 2015/0070174 A1 | 3/2015 | Douglas |
| 2015/0101121 A1 | 4/2015 | Burgo, Sr. et al. |
| 2015/0127365 A1 | 5/2015 | Rizvi et al. |
| 2015/0134354 A1 | 5/2015 | Alper et al. |
| 2015/0134357 A1 | 5/2015 | Davis et al. |
| 2015/0170502 A1 | 6/2015 | Harris et al. |
| 2015/0179047 A1 | 6/2015 | Wallace et al. |
| 2015/0194043 A1 | 7/2015 | Dunn et al. |
| 2015/0199883 A1 | 7/2015 | Hartley et al. |
| 2015/0221208 A1 | 8/2015 | Knighton et al. |
| 2015/0278456 A1 | 10/2015 | Bermudez Rodriguez et al. |
| 2015/0308149 A1 | 10/2015 | Oshymansky et al. |
| 2015/0313422 A1 | 11/2015 | Ophardt et al. |
| 2015/0366411 A1 | 12/2015 | Yang et al. |
| 2016/0042635 A1 | 2/2016 | Rosebraugh et al. |
| 2016/0068383 A1 | 3/2016 | Falco, III et al. |
| 2016/0093195 A1 | 3/2016 | Ophardt |
| 2016/0128520 A1 | 5/2016 | Wegelin et al. |
| 2016/0140830 A1 | 5/2016 | Hathorn |
| 2016/0152430 A1 | 6/2016 | Ray |
| 2016/0174022 A1 | 6/2016 | Nhu |
| 2016/0179089 A1 | 6/2016 | Stratmann |
| 2016/0240070 A1 | 8/2016 | Wegelin et al. |
| 2016/0247381 A1 | 8/2016 | Rensvold et al. |
| 2016/0249774 A1 | 9/2016 | Ophardt et al. |
| 2016/0267772 A1 | 9/2016 | Iser et al. |
| 2016/0292992 A1 | 10/2016 | Ortiz et al. |
| 2016/0309967 A1 | 10/2016 | Pelfrey et al. |
| 2017/0004287 A1 | 1/2017 | O'Toole |
| 2017/0098366 A1 | 4/2017 | Hood et al. |
| 2017/0120274 A1 | 5/2017 | Schultz et al. |
| 2017/0134887 A1 | 5/2017 | Wegelin et al. |
| 2017/0256155 A1 | 9/2017 | Sengstaken, Jr. et al. |
| 2018/0024202 A1 | 1/2018 | Erickson et al. |
| 2018/0111145 A1 | 4/2018 | Ophardt et al. |
| 2018/0255981 A1 | 9/2018 | Rospierski |
| 2018/0310780 A1 | 11/2018 | Mahaffey et al. |
| 2019/0228640 A1 | 7/2019 | Freedman et al. |
| 2020/0205055 A1 | 6/2020 | Snodgrass |
| 2021/0012640 A1 | 1/2021 | Tokhtuev et al. |

FOREIGN PATENT DOCUMENTS

| | | |
|---|---|---|
| AU | 2013378514 B2 | 11/2017 |
| BR | 102012030486 A2 | 9/2014 |
| CA | 2605412 A1 | 12/2006 |
| CA | 2592814 A1 | 12/2007 |
| CA | 2674654 A1 | 10/2009 |
| CA | 2776280 A1 | 11/2013 |
| CA | 2780411 A1 | 12/2013 |
| CA | 2807337 A1 | 8/2014 |
| CA | 2914864 A1 | 6/2016 |
| CN | 2354482 Y | 12/1999 |
| CN | 1181415 C | 12/2004 |
| CN | 1938724 A | 3/2007 |
| CN | 100340935 C | 10/2007 |
| CN | 101592510 A | 12/2009 |
| CN | 201974318 U | 9/2011 |
| CN | 202677403 U | 1/2013 |
| CN | 103169409 A | 6/2013 |
| CN | 103198628 A | 7/2013 |
| CN | 203153706 U | 8/2013 |
| CN | 203325033 U | 12/2013 |
| CN | 103617349 A | 3/2014 |
| CN | 204218783 U | 3/2015 |
| CN | 104615091 A | 5/2015 |
| CN | 104622348 A | 5/2015 |
| CN | 204520455 U | 8/2015 |
| CN | 105139320 A | 12/2015 |
| CN | 105164737 A | 12/2015 |
| CN | 204990347 U | 1/2016 |
| CN | 101911108 B | 2/2016 |
| CN | 205197874 U | 5/2016 |
| CN | 106154902 A | 11/2016 |
| DE | 69708606 T2 | 8/2002 |
| DE | 10157975 A1 | 6/2003 |
| DE | 69917795 T2 | 7/2005 |
| DE | 19882120 B4 | 10/2010 |
| DE | 102012105365 A1 | 12/2013 |
| DK | 2015665 T3 | 11/2009 |
| EP | 0921506 B1 | 6/1999 |
| EP | 0927535 | 7/1999 |
| EP | 0940110 A1 | 9/1999 |
| EP | 1121500 | 10/1999 |
| EP | 1245016 | 10/2000 |
| EP | 1049998 A2 | 11/2000 |
| EP | 1099400 A2 | 5/2001 |
| EP | 1201172 A2 | 5/2002 |
| EP | 1390204 B1 | 12/2004 |
| EP | 1034132 B1 | 8/2005 |
| EP | 1483728 B1 | 10/2006 |
| EP | 1791077 A2 | 5/2007 |
| EP | 1794727 A1 | 6/2007 |
| EP | 1872802 A1 | 1/2008 |
| EP | 1872892 A1 | 1/2008 |
| EP | 1913892 A2 | 4/2008 |
| EP | 1978703 A1 | 10/2008 |
| EP | 2012277 A1 | 1/2009 |
| EP | 2223642 A2 | 9/2010 |
| EP | 2511889 A2 | 10/2010 |
| EP | 2509017 A2 | 10/2012 |
| EP | 2637540 A2 | 9/2013 |
| EP | 2860716 A1 | 4/2015 |
| EP | 2956918 A1 | 12/2015 |
| EP | 3581897 B1 | 9/2020 |
| FR | 2872315 A1 | 12/2005 |
| FR | 2997779 A1 | 5/2014 |
| GB | 2052251 A | 1/1981 |
| GB | 2137749 A | 10/1984 |
| GB | 2217013 A | 10/1989 |
| GB | 2299405 A | 2/1996 |
| GB | 2298851 A | 9/1996 |
| GB | 2324397 A | 10/1998 |
| GB | 2337327 A | 11/1999 |
| GB | 2340647 A | 2/2000 |
| GB | 2394654 A | 5/2004 |
| GB | 2417810 A | 3/2006 |
| GB | 2417811 A | 3/2006 |
| GB | 2425388 A | 10/2006 |
| GB | 2446871 | 8/2007 |

(56) References Cited

FOREIGN PATENT DOCUMENTS

| | | |
|---|---|---|
| GB | 2436793 A | 10/2007 |
| GB | 2437555 A | 10/2007 |
| GB | 2439306 A | 12/2007 |
| GB | 2439457 | 12/2007 |
| GB | 2452189 A | 2/2009 |
| GB | 2457930 A | 9/2009 |
| GB | 2458118 A | 9/2009 |
| GB | 2469482 A | 10/2010 |
| GB | 2474317 A | 4/2011 |
| GB | 2486767 A | 6/2012 |
| GB | 2537179 A | 10/2016 |
| JP | 06226068 A | 8/1994 |
| JP | 09066995 A | 3/1997 |
| JP | 09066999 A | 3/1997 |
| JP | 10309540 A | 11/1998 |
| JP | 11332961 A | 12/1999 |
| JP | 2001292918 A | 10/2001 |
| JP | 3281375 B2 | 5/2002 |
| JP | 2002197559 | 7/2002 |
| JP | 2003105819 A | 4/2003 |
| JP | 2003122823 A | 4/2003 |
| JP | 2006132277 A | 5/2005 |
| JP | 2005218999 A | 8/2005 |
| JP | 2006198318 A | 8/2006 |
| JP | 2008027436 A | 2/2008 |
| JP | 2009282442 A | 12/2009 |
| JP | 4523219 B2 | 8/2010 |
| JP | 2013017631 A | 1/2013 |
| JP | 2013180046 A | 9/2013 |
| JP | 2013187557 A | 9/2013 |
| JP | 2015153084 A | 8/2015 |
| JP | 2015230207 A | 12/2015 |
| JP | 2016520883 A | 7/2016 |
| KR | 101632716 B1 | 6/2016 |
| KR | 101647831 B1 | 8/2016 |
| MX | 2012015244 A | 4/2013 |
| PH | 01219439 A | 9/1989 |
| PT | 882280 E | 5/2002 |
| SG | 186323 A1 | 1/2013 |
| TW | 503189 U | 6/2015 |
| WO | WO 199213327 A1 | 8/1992 |
| WO | WO 199731350 A1 | 8/1997 |
| WO | WO 1998092.61 A1 | 3/1998 |
| WO | WO 199826704 A1 | 6/1998 |
| WO | WO 1998036258 A2 | 8/1998 |
| WO | WO 199930299 A1 | 6/1999 |
| WO | WO 199933008 | 7/1999 |
| WO | WO 200022260 A1 | 4/2000 |
| WO | WO 200125730 A1 | 4/2001 |
| WO | WO 200131532 A2 | 5/2001 |
| WO | WO 2001033529 A1 | 5/2001 |
| WO | WO 200141612 | 6/2001 |
| WO | WO 2002021475 A1 | 3/2002 |
| WO | WO 2002059701 A1 | 8/2002 |
| WO | WO 2002077927 A1 | 10/2002 |
| WO | WO 2002094073 A1 | 11/2002 |
| WO | WO 2003059143 A1 | 7/2003 |
| WO | WO 2003079278 A1 | 9/2003 |
| WO | WO 2003082351 A2 | 10/2003 |
| WO | WO 2004052162 A1 | 6/2004 |
| WO | 2004101122 A2 | 11/2004 |
| WO | WO 2005040984 A2 | 5/2005 |
| WO | WO 2005055793 A2 | 6/2005 |
| WO | WO 2005055793 A3 | 6/2005 |
| WO | WO 2005094711 A2 | 10/2005 |
| WO | WO 2005117672 A1 | 12/2005 |
| WO | WO 2006036687 A1 | 4/2006 |
| WO | WO 2006133026 A2 | 12/2006 |
| WO | WO 2006135922 A2 | 12/2006 |
| WO | WO 2007001866 A2 | 1/2007 |
| WO | WO 2007090470 A1 | 8/2007 |
| WO | WO 2007127495 A2 | 11/2007 |
| WO | WO 2007129289 A1 | 11/2007 |
| WO | WO 2007133960 A2 | 11/2007 |
| WO | WO 2008088424 A1 | 7/2008 |
| WO | WO 2008118143 A2 | 10/2008 |
| WO | WO 2008119158 A1 | 10/2008 |
| WO | WO 2008133495 A1 | 11/2008 |
| WO | WO 2009087046 A1 | 7/2009 |
| WO | WO 2009097096 A1 | 8/2009 |
| WO | WO 2009134242 A1 | 11/2009 |
| WO | WO 2010026581 A2 | 3/2010 |
| WO | WO 2010101929 A2 | 9/2010 |
| WO | WO 2011038173 A1 | 3/2011 |
| WO | WO 2011085292 A2 | 7/2011 |
| WO | WO 2011131800 A1 | 10/2011 |
| WO | WO 2011161475 A1 | 12/2011 |
| WO | WO 2012064515 A2 | 5/2012 |
| WO | 2012150563 A1 | 11/2012 |
| WO | WO 2012152495 A1 | 11/2012 |
| WO | WO 2012161766 A1 | 11/2012 |
| WO | 2013003661 A1 | 1/2013 |
| WO | WO 2013025889 A1 | 2/2013 |
| WO | WO 2013025956 A1 | 2/2013 |
| WO | WO 2013033243 A2 | 3/2013 |
| WO | WO 2013049357 A2 | 4/2013 |
| WO | WO 2013049462 A1 | 4/2013 |
| WO | WO 2013055616 A2 | 4/2013 |
| WO | WO 2013058821 A1 | 4/2013 |
| WO | WO 2013063690 A1 | 5/2013 |
| WO | WO 2013070888 A1 | 5/2013 |
| WO | WO 2013074660 A1 | 5/2013 |
| WO | WO 2013140253 A1 | 9/2013 |
| WO | WO 2013165585 A1 | 11/2013 |
| WO | WO 2013190016 A1 | 12/2013 |
| WO | WO 2014027030 A2 | 2/2014 |
| WO | WO 2014035610 A1 | 3/2014 |
| WO | WO 2014037938 A2 | 3/2014 |
| WO | WO 2014046645 A1 | 3/2014 |
| WO | WO 2014060726 A1 | 4/2014 |
| WO | WO 2012125320 A1 | 8/2014 |
| WO | WO 2014125320 A1 | 8/2014 |
| WO | WO 2014205283 A1 | 12/2014 |
| WO | 2015/017702 A2 | 2/2015 |
| WO | WO 2015054193 A1 | 4/2015 |
| WO | WO 2015061718 A1 | 4/2015 |
| WO | WO 2015070016 A2 | 5/2015 |
| WO | WO 2016168082 A1 | 10/2016 |
| WO | 2017200965 A1 | 11/2017 |
| WO | 2018165107 A1 | 9/2018 |

OTHER PUBLICATIONS

"Dr. Semmelweiss Was Right: Washing Hands Prevents Infection," Water Quality and Health Council, retrieved from www.waterandhealth.org/newsletter/new/4/12/20I7/right.htm. Feb. 2017, 2 pp.

Evaluating Municipal Services: Scorecard Cleanliness Program Prospectus, New York, found at http://www.worldsweeper.com/Street/Profiles/NYCScorecard.pdf, archived Jan. 5, 2009, 16 pp.

"Evidence of hand hygiene to reduce transmission and infections by multi-drug resistant organisms in health-care settings," World Health Organization, Jan. 5, 2014, 7 pp.

"Home Routines App for iPhone, iPad, & iPod touch," retrieved from the internet http://www.homeroutines.com/, (Applicant points out, in accordance with MPEP 609.04(a), that the year of publication, 2010, is sufficiently earlier than the effective U.S. filing date, 2017, so that the particular month of publication is not in issue.) 7 pp.

"Measuring Hand Hygiene Adherence: Overcoming the Challenges," The Joint Commission et al., 2009 (Applicant points out, in accordance with MPEP 609.04(a), that the year of publication, 2009, is sufficiently earlier than the effective U.S. filing date, 2017, so that the particular month of publication is not in issue.) 234 pp.

"WHO Guidelines on Hand Hygiene in Health Care (Advanced Draft)," World Health Organization, Apr. 2006, 216 pp.

"WHO Guidelines on Hand Hygiene in Health Care," World Health Organization, 2009 (Applicant points out, in accordance with MPEP 609.04(a), that the year of publication, 2009, is sufficiently earlier than the effective U.S. filing date, 2017, so that the particular month of publication is not in issue.) 270 pp.

(56) References Cited

OTHER PUBLICATIONS

Al-Hamad et al., "Flow Clean is Clean? Proposed Methods for Hospital Cleaning Assessment," Journal ofHospital Infection, vol. 70, Oct. 9, 2008, pp. 328-334 14 Anonymous et al., "Hand Hygiene," Progressive Grocer, vol. 76, No. 8, Aug. 1997, pp. 111-112.
Bourn, Auditor General for Wales, "The Management and Delivery of Hospital Cleaning Services in Wales," National Audit Office Wales, 39 pp., May 23, 2003.
Dancer, "How do we Assess Hospital Cleaning? A Proposal for Microbiological Standards for Surface Hygiene in Hospitals" Journal of Hospital Infection, vol. 56, Sep. 2003, pp. 10-15.
Diller et al., "Estimation of hand hygiene opportunities on an adult medical ward using 24-hour camera surveillance: Validation of the HOW2 Benchmark Study," American Journal ofInfection Control, vol. 42, 2014 (Applicant points out, in accordance with MPEP 609.04(a), that the year of publication, 2014, is sufficiently earlier than the effective U.S. filing date, 2017, so that the particular month of publication is not in issue.) pp. 602-607.
Diversey, "Imap TM/MC . . . Data Collection & Reporting Platform," Diversey Inc., Sep. 5, 2013, 2 pp.
Diversey, "Reporting," downloaded from Diversey.com, Sep. 5, 2013, 1 pp.
Diversey, "Unleash Your Data, The power of iMAP is now available on virtually any smart device. Get robust data collection and analysis anytime, anywhere, in any language," Diversey Inc., Sep. 15, 2011, 2 pp.
Diversey, "iMAP Internet Mobile Auditing Platform," Diversey Inc., 2012, (Applicant points out, in accordance with MPEP 609.04(a), that the year of publication, 2012, is sufficiently earlier than the effective U.S. filing date, so that the particular month of publication is not in issue.) 2 pp.
Diversey, Inc., "iMAPTM/MC Internet Mobile Auditing Platform", 2012, (Applicant points out, in accordance with MPEP 609.04(a), that the vear of publication, 2012, is sufficiently earlier than the effective U.S. filing date, so that the particular month of publication is not in issue.) 2pp.
Elliott, "Determining Three Metrics for Cleaning Satisfaction," found at equi pmentrentaltool s/ arti cl e/Determining-Three-Metrics-for -Cleaning-Satisfaction-- 7698#, Nov. 2007, 2 pp.
Dix et al., "Environmental Surface Cleaning: First Defense Against Infectious Agents," Infection Control Today Magazine, 6 pp., Dec. 1, 2005.
Exner et al., "Household Cleaning and Surface Disinfection: New Insights and Stategies," Journal of Hospital Infection, vol. 56, 2008, pp. s70-s75.
Florida Department of Health, "Guidelines for Control of Antibiotic Resistant Organisms," Dec. 20, 1999, 34 pp.
Garner et al., "Guideline for Handwashing and Hospital Environmental Control," CDC Prevention Guidelines, Jan. 1, 1985, 10 pp.
Garner, "Guidelines for Isolation Precautions in Hospitals," Hospital Infection Control Advisory Committee, Jan. 1, 1996, 39 pp.
Griffith et al., "An Evaluation of Hospital Cleaning Regimes and Standards," J. Hosp. Infect., vol. 45, pp. 19-28, 2000, accepted Dec. 23, 1999.
Griffith et al., "The Effectiveness of Existing and Modified Cleaning Regimens in a Welsh Hospital," Journal of Hospital Infection, vol. 66, Jul. 26, 2007, p. 352-359.
Hamilton et al., "Hand Hygiene," Wild Iris Medical Education, Inc., 2014, (Applicant points out, in accordance with MPEP 609.04(a), that the year of publication, 2014, is sufficiently earlier than the effective U.S. filing date, 2017, so that the particular month of publication is not in issue.) 24 pp.
Hicpac, "Recommendations for Preventing the Spread of Vancomycin Resistance," Morbidity and CDC Mortality Weekly Report, Recommendations and Reports, vol. 44. No. RR-12, 1-13, Sep. 22, 1995, 16 pp.
Larson et al., "A Multifaceted Approach to Changing Handwashing Behavior," American Journal of Infection Control, vol. 25, Feb. 1997, pp. 3-10.

Larson, "APIC Guideline for Hand Washing and Hand Antisepsis in Health- Care Settings." APIC Guidelines Committee, Aug. 1995, Am J Infect Control, 23:251, 18 pp.
Lewis et al., "A Modified ATP Benchmark for Evaluating the Cleaning of Some Hospital Environmental Surfaces," Journal of Hospital Infection, vol. 69, May 12, 2008, pp. 156-163.
Malik et al., "Use of Audit Tools to Evaluate the Efficacy of Cleaning Systems in Hospitals," Am. J. Infect. Control, vol. 31, No. 3, p. 181-187, May 2003.
Mallow General Hospital, "Hygiene Services Assessment Scheme, Assessment Report," 38 pp., Oct. 2007.
Mangram et al., "Guideline for Prevention of Surgical Site Infection, 1999," Infection Control and Hospital Epidemiology, vol. 20, No. 4, Apr. 1999, pp. 247-278.
Mills et al., "Guidelines for Working with Rodents Potentially Infected with Hantavirus," Journal of Mammalogy, vol. 76, No. 3, Aug. 1995, pp. 716-722.
Munro et al., "Treating Exposure to Chemical Warfare Agents: Implications for Health Care Providers and Community Emergency Planning," Environmental Health Perspectives, vol. 89, Nov. 1990, pp. 205-2015.
Ophardt, Hygiene-Technik GmbH+ Co. KG, "Making the World a More Hygienic Place", Hygiene Compliance Solutions, 2009, 1 page.
Pittet et al., "Compliance with Handwashing in a Teaching Hospital," Annals of Internal Medicine, vol. 130, No. 2, Jan. 19, 1999, pp. 126-130.
Quattrin, MD. et al., "Application ofHazard Analysis Critical Control Points to Control Surgical Site Infections in Hip and Knee Arthroplasty," Orthopedics 31:132, 6 pp., 2008, (Applicant points out, in accordance with MPEP 609.04(a), that the year of publication, 2008, is sufficiently earlier than the effective U.S. filing date, so that the particular month of publication is not in issue.).
SaferCorp, LLC, "SaferCorp Life Advantage Solutions presents SaferHands™ Hospital Automated Hand Hygiene Monitoring System", retrieved electronically from http://www.guardianics.com/ on Dec. 15, 2010, 14 pp.
Sax et al., "My five moments for hand hygiene: a user-centered design approach to understand, train, monitor and report hand hygiene," Journal of Hospital Infection, vol. 67, Aug. 27, 2007, pp. 9-21.
Semmelweis, "The Etiology, Concept, and Prophylaxis of Childbed Fever," The University of Wisconsin Press, Sep. 15, 1983, pp. 46-59.
Steed et al., "Hospital Hand Hygiene Opportunities: Where and When (HOW2)? The HOW2 Benchmark Study," American Journal ofInfection Control, vol. 39, Feb. 2011, 8 pp.
Sturman et al., "Cornell University Hospitality Report: A New Method for Measuring Housekeeping Performance Consistency," CHR Reports, vol. 6, No. 11, Sep. 2006, 15 pp.
Swoboda et al., "Electronic Monitoring and Voice Prompts Improve Hand Hygiene and Decrease Nosocomial Infections in an Intermediate Care Unit," Crit Care Med, vol. 32, No. 2, Feb. 2004, pp. 358-363.
Taylor, An Evaluation of Handwashing Techniques- I, Nursing Times, vol. 74, Jan. 12, 1978, pp. 54-55.
Thompson et al., "Handwashing and Glove Use in a Long -Term-Care Facility," Infection Control and Hospital Epidemiology, vol. 18, No. 2, Feb. 1997, pp. 97-103.
Tibballs et al., "Teaching Hospital Medical Staff to Handwash," The Medical Journal of Australia, vol. 164, No.7, Apr. 1, 1996, pp. 395-398.
Van Ryzin et al., "Measuring Street Cleanliness: A Comparison of New York City's Scorecard and Results from a Citizen Survey," Public Administration Review 68(2), Mar./Apr. 2008, pp. 295-303.
Watanakunakorn et al., "An Observational Study of Hand Washing and Infection Control Practices by Healhcare Workers," Infection Control and Hospital Epidemiolgy, vol. 19, No. 11, Nov. 1998, pp. 858-860.
Yoshikura, "Workflow from Clean to Dirty, HACCP and Inclusiveness Principles in Effective Implementation of Hospital Infection Control," Jpn. J. Infect. Dis. 53, Jun. 6, 2000, 2 pp.

(56) References Cited

OTHER PUBLICATIONS

Zuhlsdorf et al., "Cleaning Efficacy of Nine Different Cleaners in a Washer-Disinfector Designed for Flexible Endoscopes," Journal of Hospital Infection, vol. 52, Oct. 9, 2002, pp. 206-211.
"Bentley WiNET Tag User Guide—FAS1503, DOC1036," UltraClenz, Jan. 25, 2011, 12 pp.
"ProGiene System Description for UL and CE Mark Approval," UltraClenz, Feb. 8, 2002, 5 pp.
Green, "Hand hygiene in 2015: 7 Findings," retrieved from http://www.beckershospitalreview.com/quality! hand-hygiene-in-20 15-7-findings.htm l?tm pl=component&print= 1 &layout=default &page=, Nov. 12, 2015, 1 pp.
"3M and Patient Care Technology Systems Collaborate on State of-the-Art Automated Hand Hygiene Solution to Improve Compliance," retrieved from http://news.3m.com/pt/press-release/company/3m-and-patient-care-technology, on Apr. 13, 2017, 2 pp.
Sahud et al., "An Electronic Hand Hygiene Surveillance Device: A Pilot Study Exploring Surrogate Makers for Hand Hygiene Compliance," Infection Control and Hospital Epidemiology, vol. 31, No. 6, Jun. 2010, 6 pp.
Swedberg, "RFID-based Hand-Hygiene System Prevents Health-Care Acquired Infections," RFID Journal, Jun. 10, 2010, 2 pp.
"Patient Safeguard System Healthcare Worker Badge User's Guide," DOC 1046 Revision 8, UltraClenz, Mar. 14, 2012, 21 pp.
Levchenko et al., "Embedded System for Hygiene Compliance Monitoring," IEEE Transactions on Automation Science and Engineering. vol. 7, No. 3, Jul. 2010, 4 pp.
SaferCorp, LLC, Guardian Automated Infection Control Systems (GAICS), Feb. 6, 2010, 4 pp.
Meengs et al., "Hand Washing Frequency in an Emergency Department," Annals of Emergency Medicine, vol. 23, No. 6, Jun. 1994, pp. 1307-1312.
Diversey, Diverlog-L Enhanced "DLE—Production Summary Reports," Apr. 1990, 5 pp.
Diversey, Diverlog-L Enhanced "DLE—Single Cycle Reports," Mar. 1990, 5 pp.
ECOLAB® Balancer, COM, MRE, Jun. 4, 1997, 4 pp.
ECOLAB® Inc., product brochure: "We'd like to make a couple of things perfectly Clear," 1998 (Applicant points out, in accordance with MPEP 609.04(a), that the year of publication, 1998, is sufficiently earlier than the effective U.S. filing date, so that the particular month of publication is not in issue), 4 pp.
NEXGEN SI, Inc., "InTouch Whiter Treatment Information Management Solution," Mar. 29, 1999, 59 pp.
Nova Controls, "Orion Liquid Laundry Supply Dispenser," Feb. 1989, 5 pp.
Nova Controls, Nova News, "Save Money and Gain Sales Features?" Aug. 12, 1992, 1 pg.
NOVALINK™ brochure: "Laundry Information System: Overview Reports," Dec. 13, 1995, 6 pp.
NOVALINK™ Laundry Information System, ControlMaster Version 2.0 for Windows User's Guide, 2000 (Applicant points out, in accordance with MPEP 609.04(a), that the year of publication, 2000, is sufficiently earlier than the effective U.S. filing date, so that the particular month of publication is not in issue) 39 pp.
NOVALINK™ OverView™ Program Pricing, cited in an IDS in U.S. Appl. No. 10/436,454 on May 20, 2005. 1 pg.
Persyst Inc., "Dial-A-Wash Automatic Laundry Room Attendant For Apartment and Complex Laundry Rooms," cited in an IDS in U.S. Appl. No. 10/436,454 on May 20, 2005, 2 pp.
Persyst Inc., "LDAS-2000 Remote Information Control and Management System for the Commercial Laundry and Vending Industry," cited in an IDS in U.S. Appl. No. 10/436,454 on May 20, 2005, 4 pp.
PowerPoint Presentation: "ECOLAB® Aramark Uniform Services Joining Forces for Service Excellence," 1998 (Applicant points out, in accordance with MPEP 609.04(a), that the year of publication, 1998, is sufficiently earlier than the effective U.S. filing date, so that the particular month of publication is not in issue) 69 pp.
Sample Reports, Novalink™ System, Jan. 1996, 9 pp.
Sample Reports, Nova Controls, Oct. 1997, 8 pp.
T-JET™ 2000 PC, "Wash-Aisle Productivity Manager Software Guide," ECOLAB® Textile Care Division, cited in an IDS in U.S. Appl. No. 10/436,454 on May 20, 2005, 29 pp.
Anonymous et al., "Hand Hygiene," Progressive Grocer, vol. 76, No. 8, Aug. 1997, pp. 111-112.
"Don't Get Caught Dirty Handed," ASM's Microbes Afterhours, Sep. 6, 2009, 11 pp.
Griffith, "Nosocomial infection: Are there lessons from the food industry?" The Biomedical Scientist, pp. 697-699, Aug. 2006.
"Hand Washing, Cleaning, Disinfection and Sterilization in Health Care," Infection Control Guidelines, Canada Communicable Disease Report, vol. 24S8, Dec. 1998 66 pp.
"Home Routines for iPhone, iPod touch, and iPad on the iTunes App Store," retrieved from the internet https:/litunes. apple.com/US/app/homeroutines/id353117370?mt-8, Sep. 5, 2013 3 pp.
Net/Tech to Unveil Patented Hygiene Guard Hand-Washing Monitoring System at the National Restaurant Show, BusinessWire, Apr. 3, 1997, 3 pp.
Tsai et al., "iMAT: Intelligent Medication Administration Tools," Aug. 2010, 8 pp.
Diversey, "Sealed Air's Diversey Business Introduces Mobile Application to Capture Facility Auditing Data," Diversey Inc., Oct. 18, 2011, 2 pp.
Diversey, Inc., "Diversey VerClean™ System Implementation and Support Guide," 2012, (Applicant points out, in accordance with MPEP 609.04(a), that the year of publication, 2012, is sufficiently earlier than the effective U.S. filing date, so that the particular month of publication is not in issue.)64 pp.
Prosecution History from U.S. Appl. No. 12/787,064, dated Dec. 6, 2012 through Apr. 8, 2013, 20 pp.
Prosecution History from U.S. Appl. No. 14/819,349, dated Apr. 5, 2019 through Nov. 30, 2020, 184 pp.
U.S. Appl. No. 14/819,349, filed Aug. 5, 2015, by Tokhtuev et al.
Final Office Action from U.S. Appl. No. 14/819,349, dated Jun. 16, 2020, 31 pp.
"ARC-T Network Protocol for the CompassNet Wireless IoT Network," Ecolab Healthcare Division, Jan. 14, 2017, 36 pp.
Johnson et al., "Dynamic Source Routing in Ad Hoc Wireless Networks," Mobile Computing, vol. 353, 1996 (Applicant points out, in accordance with MPEP 609.04(a), that the year of publication, 1996, is sufficiently earlier than the effective U.S. filing date, so that the particular month of publication is not in issue.), 18 pp.
International Search Report and Written Opinion of International Application No. PCT/US2019/067983, dated Mar. 20, 2020, 13 pp.
Office Action from U.S. Appl. No. 17/000,625, dated Apr. 12, 2021, 8 pp.
Amendment in Response to Office Action dated Nov. 3, 2020, from U.S. Appl. No. 14/819,349, filed Apr. 26, 2021, 11 pp.
Final Office Action from U.S. Appl. No. 14/819,349, dated Jun. 8, 2021,7 pp.
U.S. Appl. No. 17/383,689, filed Jul. 23, 2021, by Tokhtuev et al.
Response to Communication Pursuant to Rules 161(1) and 162 EPC dated Jul. 27, 2021, from counterpart European Application No. 19839755.6, filed Jan. 24, 2022, 21 pp.
International Preliminary Report on Patentability from International Application No. PCT/US2019/067983, dated Jul. 1, 2021, 9 pp.

\* cited by examiner

| DEVICE TYPE BYTE | ADDRESS BYTE 2 | ADDRESS BYTE 1 | ADDRESS BYTE 0 |
|---|---|---|---|

FIG. 3A

| 8 x n BITS | 2-BYTES | 1-BYTE | 1-BYTE TO 125-BYTES | 2-BYTES | 1-BYTE | 1-BYTE |
|---|---|---|---|---|---|---|
| PREAMBLE BITS 1010...1010 | SYNC WORD | LENGTH FIELD | DATA FIELD | CRC-16 | RSSI | LQI |

FIG. 3B

| 1-BYTE | HEADER 4-BYTES | 4-BYTES | 1-BYTE | 1-BYTE | 1-BYTE | PAYLOAD 0-BYTES TO 125-BYTES | 1-BYTE | ROUTE DATA 0-BYTES TO 10 BYTES | CHECKSUM 2-BYTES |
|---|---|---|---|---|---|---|---|---|---|
| MESSAGE TYPE | DESTINATION ADDRESS | SOURCE ADDRESS | NONCE | RSSI | PAYLOAD LENGTH | PAYLOAD DATA | NODE COUNT | NODE ADDRESSES | CRC-16 |

| LED COLOR | STATUS LEVEL | STATE | ACTION |
|---|---|---|---|
| GREEN | CLEAN | 0 | HCW HAS RECENTLY USED A MONITORED SOAP OR SANITIZER DISPENSER AND MAY COMPLIANTLY ENTER A PATIENT ZONE. |
| GREEN | COMPLIANT PATIENT CONTACT | 1 | HCW HAS RECENTLY USED A MONITORED SOAP OR SANITIZER DISPENSER AND IS CURRENTLY INSIDE A PATIENT ZONE |
| GREEN AND YELLOW | COMPLIANT PATIENT RE-CONTACT | 1 | HCW HAS RECENTLY EXITED A PATIENT ZONE. THE HCW MAY RE-ENTER THE SAME PATIENT ZONE WITHOUT PERFORMING HAND HYGIENE |
| YELLOW | CUE TO CLEAN | 1,4 | HCW MUST PERFORM HAND HYGIENE BEFORE ENTERING A PATIENT ZONE. IF HCW HAS RECENTLY EXITED A PATIENT ZONE, PERFORM HAND HYGIENE IMMEDIATELY |
| RED | NON COMPLIANT | 2,3,5 | HCW HAS NOT PERFORMED HAND HYGIENE EITHER AFTER EXITING A PATIENT ZONE OR WHEN MOVING BETWEEN DIFFERENT PATIENT ZONE ENTRIES. HAND HYGIENE SHOULD BE PERFORMED IMMEDIATELY |

| | BIT 7 | BIT 6 | BIT 5 | BIT 4 | BIT 3 | BIT 2 | BIT 1 | BIT 0 |
|---|---|---|---|---|---|---|---|---|
| | HAND HYGIENE COMPLIANCE NETWORK CONFIGURATION DATA PACKET (5 BYTES) | | | | | | | |
| BYTE 0 | PIEZO ENABLE 1 | PIEZO ENABLE 2 | | | STATE 3 GRACE PERIOD | | STATE 5 TIMEOUT | |
| BYTE 1 | BED ATTACH TIME | | | | | | | |
| BYTE 2 | STATE 5 TIMEOUT (CONTINUED) | | | | STATE 4 TIMEOUT | | | |
| BYTE 3 | LED ENABLE 1 | LED ENABLE 2 | | | | | STATE 0 GRACE PERIOD | |
| BYTE 4 | | | | STATE 2 GRACE PERIOD | | | | |

FIG. 54

*LED ENABLE BITS TRUTH TABLE

| LED ENABLE 1 | LED ENABLE 2 | DESCRIPTION |
|---|---|---|
| 0 | 0 | 0 - LEDS ALWAYS OFF (ALL STATES) |
| 0 | 1 | 1 - LEDs ONLY ON FOR NONCOMPLIANT STATES |
| 1 | 0 | 2 - LEDS ALWAYS ON (ALL STATES) |
| 1 | 1 | 3 - POWER SAVE MODE |

FIG. 55

**PIEZO ENABLE BITS TRUTH TABLE

| LED ENABLE 1 | LED ENABLE 2 | DESCRIPTION |
|---|---|---|
| 0 | 0 | 0 - PIEZO ALWAYS OFF (ALL STATES) |
| 0 | 1 | 1 - PIEZO ONLY ON FOR NONCOMPLIANT STATES |
| 1 | 0 | 2 - PIEZO ALWAYS ON (ALL STATES) |
| 1 | 1 | 3 - RESERVED |

ADAPTIVE ROUTE, BI-DIRECTIONAL NETWORK COMMUNICATION

CROSS REFERENCE TO RELATED APPLICATIONS

This application claims the benefit of U.S. Provisional Application No. 62/782,991 filed Dec. 20, 2018, which is incorporated herein by reference in its entirety.

BACKGROUND

The number of devices connected to the Internet has grown significantly in recent years. Such devices may include not only computing devices such as laptops, smartphones and tablets, but may also include traditional standalone devices and everyday objects. Such networks of connected sensors and devices, also referred to as Internet of Things (IoT) networks, have made large amounts of data available for many consumer, commercial, and industrial applications.

SUMMARY

In general, the present disclosure is directed to bi-directional communication in an adaptive route wireless network.

In one example, the disclosure is directed to a wireless sensor network system, comprising a gateway computing device, a plurality of cluster host computing devices, and a plurality of end computing devices, each end computing device including a sensor that detects event data, each end computing device further configured for wireless bi-directional communication with one of the plurality of cluster-host computing devices; the plurality of cluster host computing devices forming a route between each of the plurality of end devices and the gateway, each cluster host computing device storing a next downstream network address; wherein each of the plurality of cluster host computing devices forming part of the route from one of the plurality of end computing devices to the gateway further modifies a downstream network message received from a previous cluster host computing device, and further: appends a network address of the previous cluster host obtained from a source address field of a downstream network message to an appended addresses field of the downstream network message; sets a source address field of the downstream network message to a network address of the current cluster host computing device; and sets the destination address field of the downstream network message to the next downstream network address stored by the current cluster host computing device; and wherein the current cluster host computing device further wirelessly transmits the modified downstream network message to the next downstream network address contained in the destination field of the modified downstream network message.

The downstream network message may further include a message payload field including event data corresponding to an event detected one of the end computing device. The downstream network message may further include a node count field containing a node count corresponding to a number of nodes between the current cluster host computing device and an originating computing device of the downstream network message, and wherein the current cluster host computing device further increments the node count in the node count field of the downstream network message. The downstream network message may further include a message payload field including a factory address of the originating computing device. The wireless network comprises a cluster-tree network.

The system may further include a server computing device configured to receive downstream network messages from the gateway computing device; the server computing device further configured to update a portion of a route table corresponding to an originating end computing device, the portion of the route table including a factory address of the originating end computing device, appended network addresses contained in the appended addresses field of the modified downstream network message, and a node count contained in the node count field of the modified network message.

The server computing device may be further configured to generate an upstream network message to be transmitted to the originating computing device, the upstream network message including a payload field containing the factory address of the originating computing device, an appended addresses field containing the appended network addresses stored in the portion of the route table corresponding to the originating computing device, and a node count field containing the node count stored in the portion of the route table corresponding to the originating computing device.

In another example, the disclosure is directed to a method of wireless communication between a first computing device, a second computing device, and a third computing device in a wireless network, comprising storing, by the second computing device, a network address of a third computing device, the third computing device being a next downstream node along a route through the wireless network from the second computing device to a gateway computing device; wirelessly receiving, by the second computing device, a downstream network message from the first computing device, the downstream network message including a source address field containing a network address of the first computing device, a destination address field containing a network address of the second computing device, and an appended address field; modifying, by the second computing device, the downstream network message, comprising appending, by the second computing device, the network address of the first computing device to the appended addresses field of the downstream network message; setting, by the second computing device, the source address field of the downstream network message to the network address of the second computing device; and setting, by the second computing device, the destination address field of the downstream network message to the network address of the third computing device stored by the second computing device; and wirelessly transmitting, by the second computing device, the modified downstream network message to the network address of the third computing device as contained in the destination field of the modified network message.

The downstream network message may further include a node count field containing a node count corresponding to a number of nodes between the first computing device and an originating computing device of the downstream network message, and wherein modifying the downstream network message further comprises incrementing, by the second computing device, the node count in the node count field of the downstream network message. The downstream network message may further include a message payload field including event data corresponding to an event detected at the originating computing device. The downstream network message may further include a message payload field including a factory address of the originating computing device. The wireless network may include a cluster-tree network.

The method may further include receiving, by a server computing device and from the gateway computing device, the modified network message; updating, by the server computing device, a portion of a route table corresponding to the originating computing device, the portion of the route table including a factory address of the originating computing device, appended network addresses contained in the appended addresses field of the modified network message, and the node count contained in the node count field of the modified network message.

The method may further include generating, by the server computing device, an upstream network message to be transmitted to the originating computing device, the upstream network message including a payload field containing the factory address of the originating computing device, an appended addresses field containing the appended network addresses stored in the portion of the route table corresponding to the originating computing device, and a node count field containing the node count stored in the portion of the route table corresponding to the originating computing device.

The method may further include receiving, by the second computing device, the upstream network message; modifying, by the second computing device, the upstream network message, comprising setting, by the second computing device, the source address field of the downstream network message to the network address of the second computing device; and setting, by the second computing device, the destination address field of the upstream network message to a next hop network address contained in the appended addresses field of the upstream network message, the next hop network address corresponding to the network address of the first computing device; removing, by the second computing device, the next hop network address from the appended addresses field of the upstream network message; and wirelessly transmitting, by the second computing device, the modified upstream network message to the network address of the first computing device as contained in the destination address field of the modified upstream network message.

In another example, the disclosure is directed to a method comprising wirelessly receiving, by a server computing device and from a gateway computing device, a network message originating from one of a plurality of end computing devices, the network message including event data corresponding to an event detected at the originating end computing device, the network message further including a list of one or more appended network addresses corresponding to one or more cluster host computing devices forming a wireless communication route between the originating end computing device and the gateway computing device, the network messages further including a node count corresponding to the number of cluster host computing devices forming the wireless communication route between the originating end computing device and the gateway computing device; and maintaining, by the server computing device, and based on the received network message, a portion of a route table corresponding to the originating end computing device, the portion of the route table including the list of one or more appended network addresses and the node count.

The network message may further include a factory address of the originating end computing device, and the portion of the route table further includes the factory address of the originating end computing device.

The method may further include generating, by the server computing device, an upstream network message intended for a destination one of the plurality of end computing devices, the upstream network message including the list of one or more appended network addresses from the portion of the route table corresponding to the destination end computing device, and including the node count from the portion of the route table corresponding to the destination end computing device.

In another example, the disclosure is directed to a method comprising wirelessly receiving, by a current cluster host computing device and from a previous cluster host computing device, a network message originating from one of a plurality of end computing devices, the network message including event data corresponding to an event detected at the originating end computing device; and wirelessly transmitting, by the current cluster host computing device, the network message, the transmitted network message including the event data, a list of one or more appended network addresses corresponding to one or more previous cluster host computing devices forming a wireless communication route between the originating end computing device and the current cluster host computing device, and a node count corresponding to the number of cluster host computing devices forming the wireless communication route between the originating end computing device and the current cluster host computing device.

In another example, the disclosure is directed to a hand hygiene compliance network, comprising a plurality of end computing devices, each of the plurality of end computing devices associated with a different one of a plurality of hand hygiene product dispensers and configured to detect dispense events; and a server computing device configured to wireless receive, from a gateway computing device, a downstream network message originating from one of the plurality of end computing devices, the downstream network message including dispense event data corresponding to a detected dispense event, the downstream network message further including a list of one or more appended network addresses corresponding to one or more cluster host computing devices forming a wireless communication route between the originating end computing device and the gateway computing device, the downstream network message further including a node count corresponding to the number of cluster host computing devices forming the wireless communication route between the originating end computing device and the gateway computing device, the server computing device further configured to maintain based on the received downstream network message, a portion of a route table corresponding to the originating end computing device, the portion of the route table including the list of one or more appended network addresses and the node count; the server computing device further configured to analyze the dispense event data and to monitor hand hygiene compliance based on the analysis.

The details of one or more examples are set forth in the accompanying drawings and the description below. Other features and advantages will be apparent from the description and drawings, and from the claims.

BRIEF DESCRIPTION OF DRAWINGS

FIG. 3A illustrates an example device address format of a type that may be used in the adaptive route network protocol in accordance with the present disclosure.

FIG. 3B illustrates an example packet format of a type that may be used in the adaptive route network protocol in accordance with the present disclosure.

FIG. 3C illustrates an example network message format of a type that may be used in the adaptive route network protocol in accordance with the present disclosure.

FIG. 30 shows example network messages at each hop along the route shown in FIG. 28.

FIG. 48 shows a Table summarizing example badge status levels, states, and corresponding status indicator colors.

FIG. 53 shows an example hand hygiene compliance network configuration data packet.

FIG. 54 shows an example LED enable bits truth table.

FIG. 55 shows an example piezo enable bits truth table.

DETAILED DESCRIPTION

The present disclosure describes a wireless network topology and bi-directional communication protocol with the ability to support multiple gateways, dynamically discover the best route between an end device and a gateway, dynamically discover a new route between an end device and a gateway if a link is broken, and/or support bi-directional communication between and end device and a gateway. Due to its ability to dynamically adapt to a changing environment, the network and network protocol in accordance with the present disclosure is referred herein to as an adaptive route wireless network (or simply, "network").

Each computing device along a route to a gateway appends the previous node's network address to downstream messages as they are transmitted along the route from an originating computing device to the gateway. The list of appended network addresses thus records the route taken by the downstream network message through the adaptive route network. A server computing device maintains a route table including the list of appended network addresses received with each downstream message. To send unsolicited upstream messages to any computing device on the wireless network, the server generates an upstream network message that includes the appended network address(es) from the portion of the route table corresponding to the destination computing device. The upstream route to the destination computing device is thus contained in the list of appended network addresses within the network message.

This so-called adaptive route wireless network provides a flexible system that is designed to be easier for users and service technicians to use and maintain. The adaptive route wireless network is a stand-alone network that does not consume network traffic on an enterprise's wired or wireless network(s). The ability to support multiple gateways increases the number of end devices that can be supported as compared to networks that only permit one gateway per building, and thus the size of the customer, and the number of end devices, is not limited in that respect. The bi-directional communication protocol allows information to be transmitted from the end devices to a local or remote computing devices and/or data repository (on or off-site) for analysis, and also allows transmission of information to be transmitted down to the end device(s) from the server, or from local or remote computing devices, such as updates settings or firmware.

The adaptive route network does not require each device or node in the network to maintain large route tables in their own local memory that store routes from itself to every other device in the network, thus simplifying their design and lowering cost. The network also reduces or eliminates the network traffic required to keep such route tables up to date, as route addresses are sent within messages themselves, rather than requiring separate route maintenance messages to be sent throughout the network.

Figure 1A:
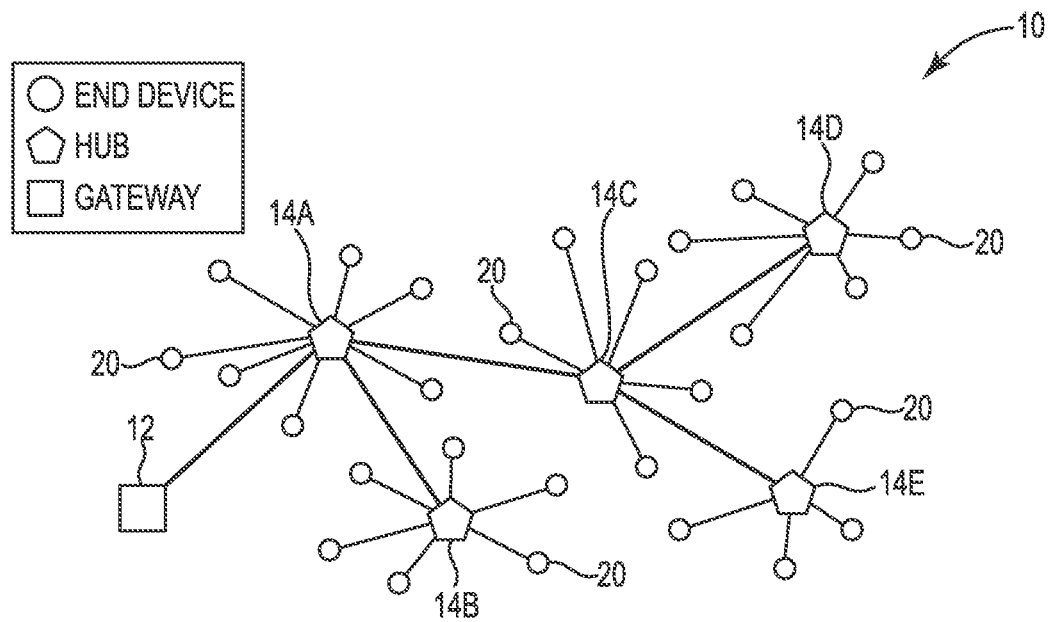
FIG. 1A shows an example cluster-tree network topology that uses the adaptive route bi-directional communication protocol in accordance with the present disclosure.
Figure 1B:
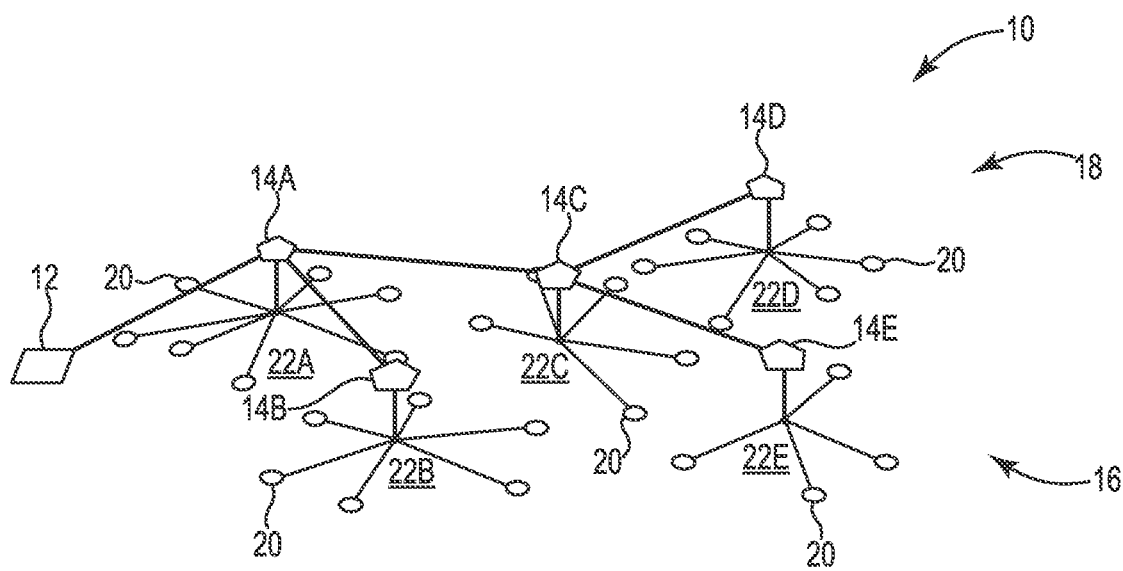
FIG. 1B shows the adaptive route network of FIG. 1A visually represented in two separate tiers.

FIG. 1A depicts an example cluster-tree network topology 10 that uses the adaptive route wireless network protocol in accordance with the present disclosure. Network 10 is configured as a two-tier self-organizing wireless cluster-tree network 10. Network 10 includes a plurality of end devices 20, a plurality of network hubs 14 (14-A-14E in this example) and a plurality of gateways 12 (only one of which is shown in FIGS. 1A and 1B). In addition to being configured for bi-directional communication with hubs 14, gateway 12 is configured for bi-directional communication to one or more local or remote computing devices (not shown in FIG. 1A). All messages generated by an end device 20 will be sent to a corresponding hub 14 hosting its cluster. The message will then continue along a route of hubs 14 that will eventually link to one of gateways 12.

FIG. 1B shows the adaptive route network 10 of FIG. 1A visually represented in two separate tiers, a first tier 16 and a second tier 18. The first and lowest tier 16 is composed of the plurality of end devices 20 that self-organize into clusters 22 by forming links with a neighboring network hub 14. In this example, end devices 20 are organized into cluster 22A corresponding to hub 14A, cluster 22B corresponding to hub 14B, cluster 22C corresponding to hub 14C, cluster 22D corresponding to hub 14D, and cluster 22E corresponding to hub 14E. The second and highest tier 18 is a self-organizing network of hubs 14 with each hub 14 analyzing its nearest neighbor and then linking together in the most effective way to form routes to gateway 12.

Although a single gateway 12 is shown in this example for simplicity of illustration, it shall be understood that network 10 may include one or more gateways 12, and that the invention is not limited in this respect. In addition, it shall be understood by those of skill in the art that each gateway 12 may include a different number of hubs and end devices, that any number of gateways 12, hubs 14 and end devices 20 may exist on network 10, and that the disclosure is not limited in this respect.

In addition, although network 10 is shown and described herein as a cluster-tree network, it shall also be understood that this is for purposes of illustration only, that the disclosure is not limited in this respect, and that the adaptive route bi-directional communication protocols described herein may also be applied to other network topologies known in the art. For example, the adaptive route network protocol may (by default) support a star network topology composed of a single gateway 12 and a single hub 14 if all end devices are within range of the single hub 14 (i.e., a single cluster). Other network topologies may also be used, and the disclosure is not limited in this respect.

In some applications, wireless network 10 may be subjected to a constantly changing environment of RF noise and multipath interference. Also, one or more of the end devices 20 may be mobile in the sense that they may be moved around from place to place within the environment. To accommodate such interference and physical changes to the network structure itself, each of the devices in network 10 (e.g., gateways, hubs, and end devices) is configured such that end devices may adaptively discover new and/or more efficient routes to a gateway when these movements occur. In addition, it is possible for a hub 14 to unexpectedly lose power or be physically removed. In this way, the routes between an end device 20 to hubs 14 and to gateways 12 that are set up at one moment in time may change, degrade, or completely disintegrate as devices are moved into, around or out of the network environment or experience technical problems. To prevent loss of data, the adaptive route wireless network protocol of the present disclosure may ask some or all devices (including gateways 12, hubs 14 and/or end devices 20) on the network to independently evaluate the quality of their links or routes on a regular basis. In these examples, when the quality of a link or route is below an acceptable threshold, there will be an attempt to establish a new link or route. Attempts will continue until a new link or route of acceptable quality has been established.

Figure 2:
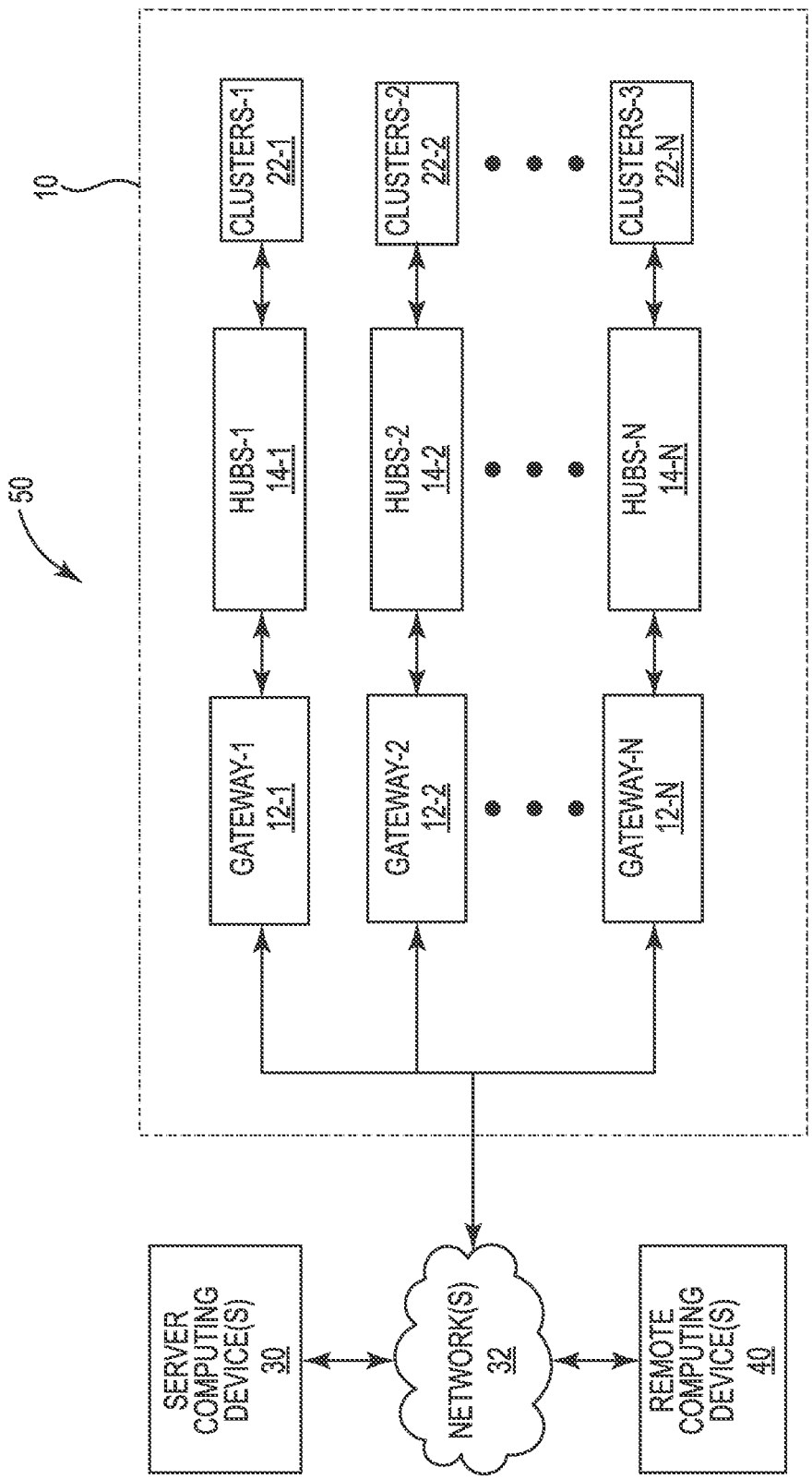
FIG. 2 is a block diagram illustrating an example computing system 50 including the adaptive route network 10 in accordance with the present disclosure.

FIG. 2 is a block diagram illustrating an example computing system 50 including the adaptive route network 10 in accordance with the present disclosure. System 50 includes adaptive route network 10 that provides for adaptive route, bi-directional wireless communication between devices 12, 14, and 20 with one or more local server computing device(s) 30 and/or remote computing device(s) 40. The communication may be via one or more local and/or remote computing network(s) 32, such as the internet. Bi-directional communication as provided by adaptive wireless route network 10 allows the system 50 to remotely update settings or firmware on any of devices 12, 14, and/or 20 results in a more flexible and easier system for users and/or service people to install and maintain.

FIG. 3A illustrates an example device address format including a 1-byte device type and a unique 3-byte address. Each device, including each gateway 12, each hub 14, and each end device 20, on adaptive route network 10 is assigned a unique device address in order for the system to distinguish one device from another. The device address further includes a device type (e.g., gateway, hub, or end device). In some examples, the end devices 20 are all the same type of end device. In other examples, end devices 20 may include one or more different types of end devices, each including its own device type. To this end, the adaptive route network addressing scheme assigns each device a unique address which further defines what type of device it is. In this example, the 1-byte device type is combined with the 3-byte address to form a 4-byte address, in big-endian format, with the device type being the most significant byte (MSB) of the address In the example of FIG. 3A, the device type is a 1-byte value from 0 to 255. The 1-byte device type thus supports up to 256 different device types. The 3-byte address is a value from 0 to 16,777,215. The combined 4-byte device address allows a total of 4,294,967,295 unique addresses. The device type address byte will break the address space into 256 blocks with each block having 16,777,215 unique addresses available. Each block is assigned to a specific type of device that will reside on the network such as a network device (e.g., a hub 14 or a gateway 120 or an end device 20.

In some examples, some or all of the gateways 12, hubs 14, and/or end devices 20 may have their 4-byte address programmed by the factory at the time of manufacture. In such examples, this 4-byte factory address is permanent and cannot be changed. In other examples, some or all of the gateways 12, hubs 14, and/or end devices 20 may have their 4-byte addresses programmed at a time when the end device is added to the network, and the addresses may be changed, added or removed as necessary.

The adaptive route network protocol of the present disclosure is a packet-based protocol. Each packet is a self-contained entity without reliance on earlier exchanges as there is no connection of fixed duration between devices. In some examples, all devices residing on an adaptive route wireless network may use an RF transceiver to communicate, such as a Texas Instruments CC1120 (or compatible) narrow band RF transceiver, or any other wireless transceiver.

FIG. 3B shows an example packet format. The optional Length Field, CRC-16 and Status Bytes (RSSI and LQI) will be appended to the packet by the wireless transceiver upon transmission. The optional Address Field will not be appended as it is only 1-byte and of no practical use. The maximum packet size is 128-bytes. When a packet is received, the wireless transceiver will remove the Preamble Bits, Sync Word and CRC-16 from the packet when writing the packet to its RX buffer. However, the Length Field and Status bytes will remain and consume 3-bytes of the maximum packet size leaving a maximum of 125-bytes for the Data Field.

The Data Field will contain a network message placed there by the transmitting device. Only the message (Data Field) will be passed on to the gateway and server. The other parts of the packet are only for wireless network communication and will be removed.

In the examples shown and described herein, all data is described as binary (no ASCII characters, and the message and all multi-byte structures will be in big-endian format (most significant byte (MSB) first).

FIG. 3C shows an example downstream network message transmitted by an end device to a hub 14, a hub to a gateway 12 or from a gateway 12 to another network, a server or another computing device. In this example, network messages consist of four (4) parts: Header, Payload, Route Data and Checksum. The maximum message size is 125-bytes.

The Header includes a 1-byte Message Type value from 0 to 255 that defines the structure and meaning of the payload data, i.e., the type of message being transmitted. Examples of the various message types are described herein below. The Header further includes a Destination Address, which is the address of the device the message is being transmitted to. For example, an end device sending a message to a hub (cluster host) will use the recipient hub's 4-byte factory address. A network hub (route node) sending a message to another network hub (route node) will use the recipient hub's 1-byte network address. The higher order address bytes including the device type will be 00h. In this example, the 1-byte network address is assigned to each hub by the server when a hub joins the network. It is used instead of the 4-byte factory address to reduce the number of bytes (by 75%) per message required to map the route a message takes through the network.

The Source Address is the address of the device the message is being transmitted from. For example, an end device sending a message to a hub (cluster host) will use the transmitting end device's 4-byte factory address. A hub (route node) sending a message to another hub (route node) will use the transmitting hub's 1-byte network address as the least significant byte (LSB). The higher order address bytes including the device type will be 00h.

Nonce is a 1-byte modulo 256 value from 0 to 255 that serves as a message ID. It will start at zero (0) and increment by one (1) with each subsequent message. The receive signal strength indicator (RSSI) is a 1-byte signed value from −128 to 127. It represents the signal strength (measured in dBm) of the last message received by the device transmitting the current message. Payload Length refers to the number of bytes in the Payload section of the message. It will be a value from 0 to 100. 100-bytes is the maximum size for the payload section in this example.

The Payload portion of a network message shown in FIG. 3C includes data relevant to the message type. Its structure will be defined by the message type and the maximum payload length is 100-bytes.

The Route Data portion of a network message may be thought of as containing a map of the route (via network devices) a downstream message has taken from an end device to the gateway. The route data therefore also defines the route, in reverse, an upstream message must take from the gateway to a device. Node Count is a 1-byte value from 0 to 10 that is the count of the number of network hubs (route nodes) a message must travel through to reach its destination. For end devices, the node count will always be zero (0) as the end devices are the starting point for a downstream message. Node Addresses includes an ordered list of 1-byte network addresses belonging to the network hubs (nodes) a downstream message must travel through to reach its destination at the respective gateway device. Up to ten (10) network addresses may be listed. Further description of the messaging protocol and generation of the Route Data is described in more detail herein below.

The Checksum portion of a network message includes a 2-byte cyclic redundancy check (CRC-16) used to verify the integrity of the message.

Referring again to FIGS. 1A and 1B, clusters 22 are groups of end devices 20 that wirelessly link to a hub 14 physically located within RF (or other wireless) range of the end device 20. Each hub 14 effectively becomes a cluster host with each end device 20 of the associated cluster being like a spoke in a wheel radiating out from the cluster host.

In some examples, end devices 20 are battery-powered. To conserve the finite power available, end device wireless transceivers may be used only when necessary. Conversely, cluster hosts (hubs 14) may be powered externally and their wireless transceivers receiver may be continuously enabled to listen for incoming messages. Therefore, in the examples described herein, end devices 20 initiate all downstream communications with a cluster host hub 14.

Each message from an end device 20 will be addressed to the current cluster host hub factory address. In some examples, each message is transmitted from an end device as events occur or are detected; that is, each message includes the data/information concerning a single event detected or sensed by the end device and is transmitted at the time of the event. In addition, or alternatively, the end device 20 may store one or more messages (such as in a buffer), and the stored messages may be transmitted periodically, after detection of a predetermined number of events, upon request of another computing device (such as the current cluster host hub) and/or upon a request entered by a user from a remote or local computing device. The current cluster host hub 14 will reply to each message received by transmitting an ACK if received successfully or a negative-acknowledgment message (NAK) if the received message is corrupt or incomplete.

As discussed above with respect to FIG. 1B, the first level or tier of the adaptive route network/protocol is the cluster. Clusters, e.g., clusters 22A-22E of FIG. 1B, are groups of end devices, e.g., end devices 20 of FIG. 1B, that wirelessly link to a hub 14 physically located within wireless (RF) range. The hub 14 becomes the so-called "cluster host computing device" with each linked end device 20 being like a spoke in a wheel radiating out from the hub/cluster host 14.

FIGS. 5-15 illustrate an example adaptive route network 92 in which end devices attempt to discover a cluster host, select a cluster host, and join a cluster. Upon introduction to a network, or at any time an end computing device 20 does not belong to a cluster, the end device may attempt to discover a cluster host by executing the example cluster host discovery process (40) shown in FIG. 4A. Once a suitable cluster host has been identified, the end device will join its cluster.

Figure 4A:
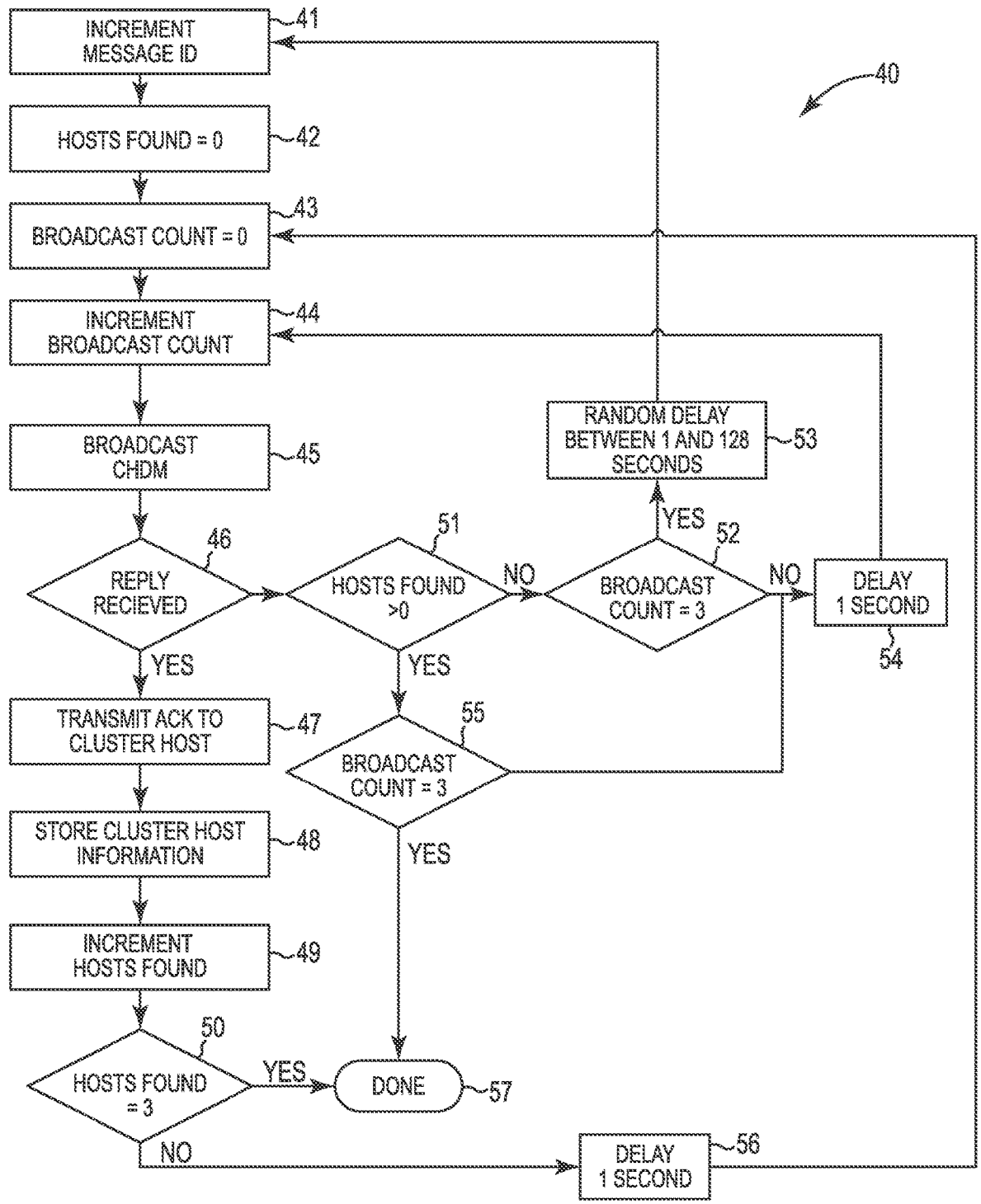
FIGS. 4A and 4B are flowcharts illustrating an example cluster host discovery process by which a computing device, such as an end computing device attempting to join an adaptive route network, may discover a cluster hub host and join a cluster in accordance with the present disclosure.

The example cluster host discovery process (40) of FIG. 4A is a self-contained set of operations that will discover and return information for up to three (3) cluster hosts. This information will include the cluster host's address, number of hops to the gateway, and link quality information including both the link between the end device and host as well as the cluster host's route to the gateway. This information will be evaluated by the end computing device to determine which cluster to join if more than one (1) cluster host was discovered.

Figure 5:
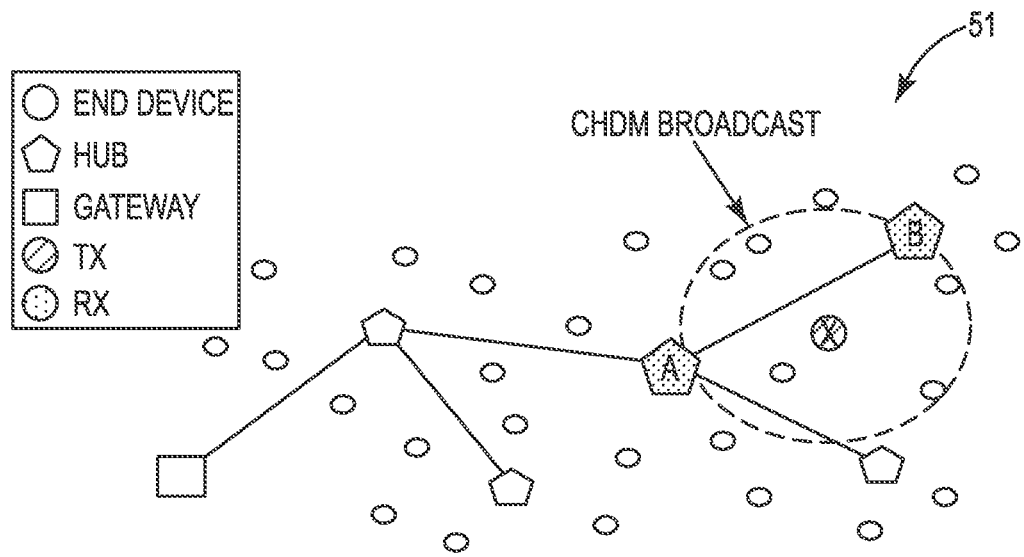
FIGS. 5-15 illustrate an example adaptive route network in which end devices attempt to discover a cluster host, select a cluster host, and join a cluster.

In accordance with example cluster host discovery process (40), to discover a cluster host, an end computing device broadcasts a cluster host discovery message (CHDM) (45). This message may be received by any cluster host within wireless range of the end device. FIG. 5 depicts an example adaptive route network 92 in which none of the end devices have yet joined a cluster. A single end device labeled X is broadcasting a CHDM. In this example, two (2) cluster hosts labeled A and B are within range of the CHDM and receive the broadcast. The end device's factory (4-byte) address is included in the CHDM message so any cluster host within range will reply directly to the specific end device responsible for the broadcast. All other end devices within range will ignore the cluster host replies, as the CHDM reply will not include their factory address.

Figure 6:
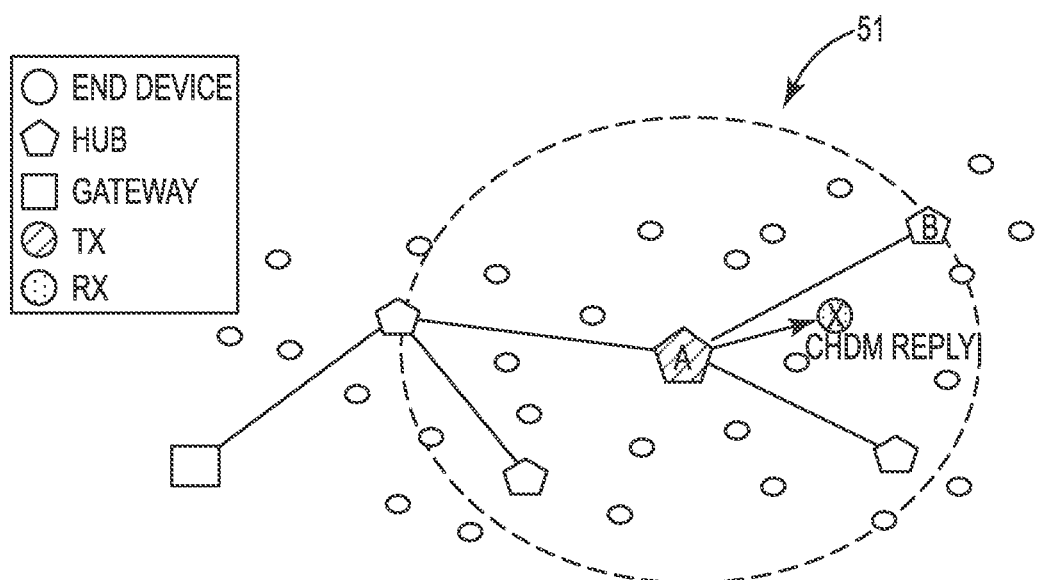

In some examples, since more than one (1) cluster host may receive the CHDM broadcast at the same time, each cluster host may implement an anti-collision broadcast reply algorithm by randomly selecting a time slot in which to transmit its reply. In the example of FIG. 6, cluster host A has transmitted a reply to the CHDM before cluster host B.

The end device will respond with an acknowledged message (ACK) to the first valid CHDM reply it receives. As per the example cluster host discovery process (40) of FIG. 4A, the end device will then broadcast up to three (3) CHDMs, at predetermined intervals, after each reply received to determine if another cluster host is available. Replies from up to three (3) different cluster hosts will be accepted. If there is no reply after three (3) consecutive CHDM broadcast attempts, the end device will assume there are no more available cluster hosts within its wireless range.

While an end device is executing the cluster host discovery process (40), each CHDM broadcast will have the same message ID (8-bit nonce). When an ACK is received by the cluster host in response to its CHDM reply, the cluster host will store the broadcasting end device's address and message ID in a buffer. The buffer will contain a predetermined number of the most recent unique addresses and message IDs for end devices that have recently transmitted a CHDM. Therefore, when an end device rebroadcasts a CHDM in an effort to locate every cluster host within wireless range, any cluster host that has already replied and received an ACK will ignore any subsequent broadcasts from the same end device.

Figure 7:
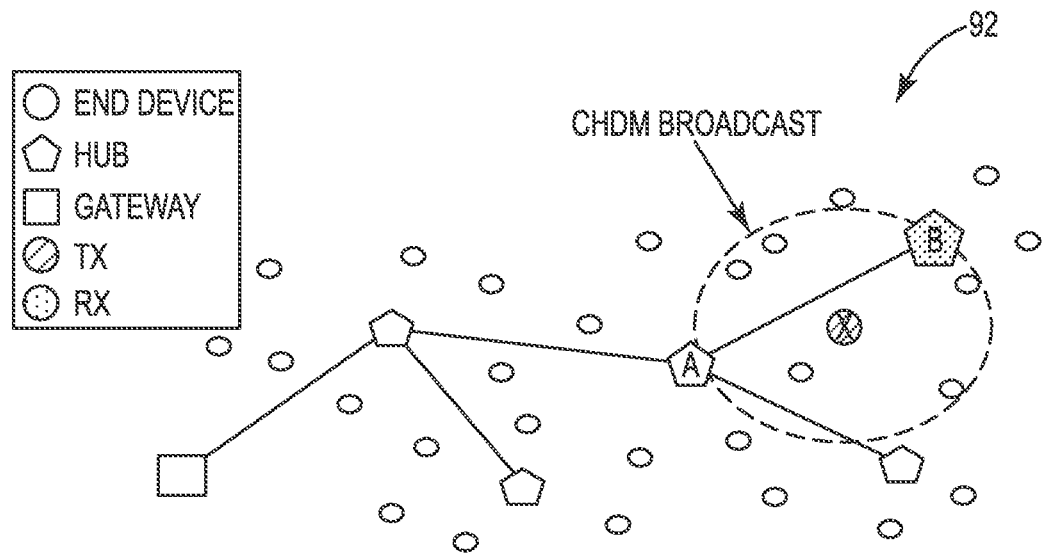

In FIG. 7, cluster host A has received an ACK for its reply to end device X's CHDM. As the current CHDM is from the same end device and has the same message ID as the previous broadcast, cluster host A will ignore the broadcast. However, cluster host B did not receive an ACK and will therefore transmit a reply.

Figure 8:
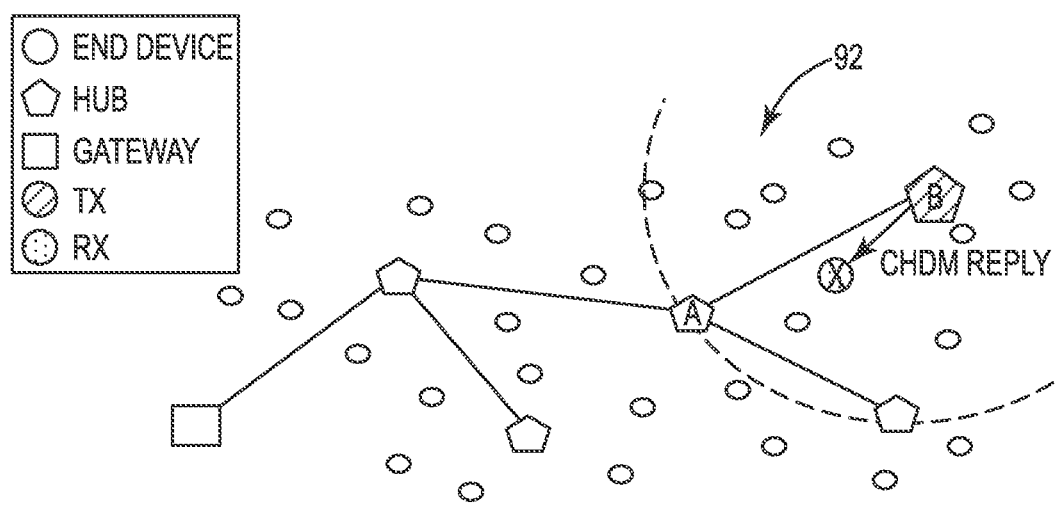

As shown in FIG. 8, cluster host B will reply to end device X's second CHDM broadcast. The end device will then transmit an ACK to cluster host B which will record the end device address and message ID in its buffer.

Figure 9:
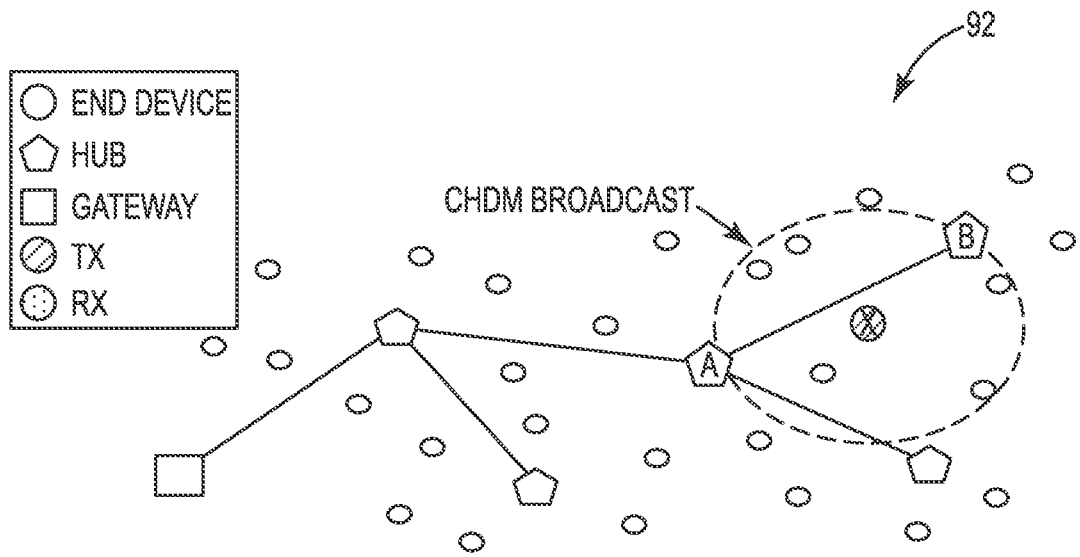

In FIG. 9, the end device X will send 3 more CHDMs but they will go unanswered as only cluster host A and B are within wireless range in this example. Both cluster host A and B have replied to the CHDM and received an ACK from the end device. Therefore, they will ignore any further CHDM broadcasts from end device X with the same message ID. End device X will now exit the cluster host discovery process (40) as one (1) to three (3) cluster hosts have been discovered (two in this case). However, if end device X was unable to discover any cluster hosts and three (3) consecutive CHDM broadcasts go unanswered, the CHDA will delay for a random period (e.g., between 1 and 128 seconds in this example) and then repeat the cluster host discovery process. This will continue indefinitely until at least one (1) cluster host is discovered.

The CHDM reply from each cluster host will include the host's address, number of hops to the gateway and link quality information including both the link between the end device and host as well as the host's route to the Gateway. Only cluster hosts with a route to a gateway will reply to a CHDM.

Figure 10:
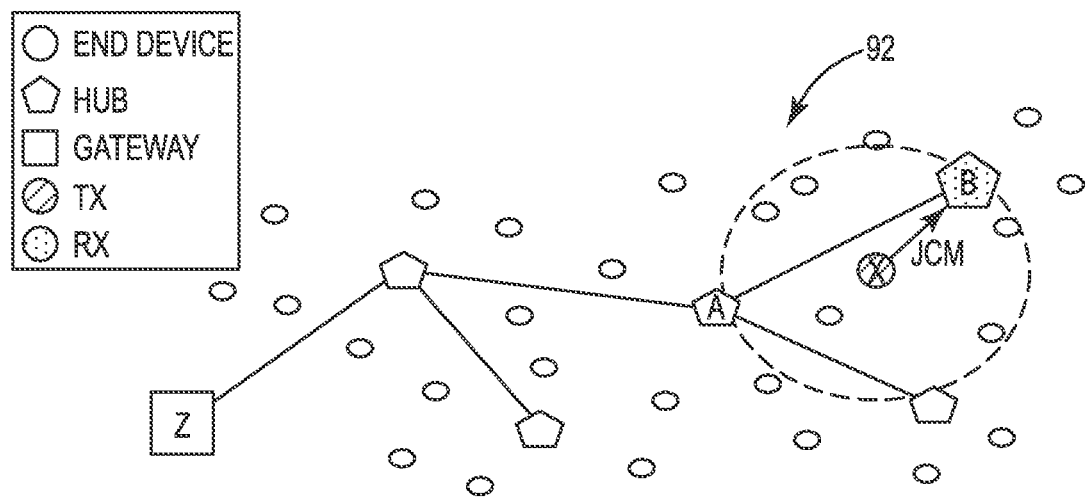

Once all replies have been received and acknowledged, amend computing device will evaluate the information returned by each cluster host and select the host which provides the best overall link quality. As shown in FIG. 10, end device X will transmit a Join Cluster Message (JCM) to the selected cluster host, which is cluster host B in this example. This message will be acknowledged by the selected cluster host and then passed on to the Server. The Server will use this message to keep track of each beacon's (cluster hub) current cluster membership.

Figure 11:
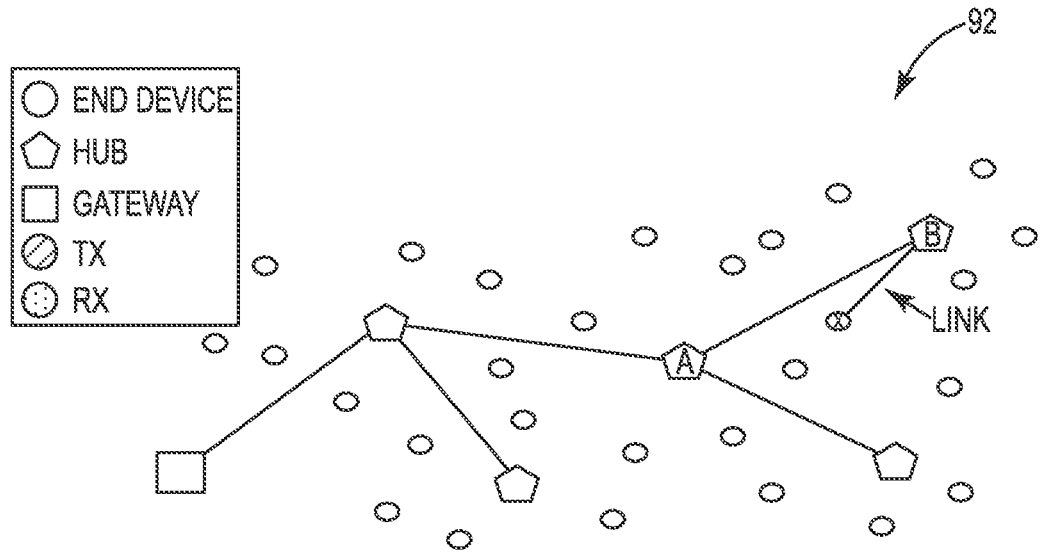

End device X will now address all messages to the selected cluster host B thus forming a link to cluster host B as shown in FIG. 11. This link will remain active unless cluster host B becomes unavailable or the end device X discovers that a better link is available during cluster maintenance. Once a downstream end device message has been delivered to and acknowledged by the cluster host, that message is no longer the end device's responsibility. It is then the cluster host's responsibility to deliver the end device's message to the respective gateway along the route to the server.

In some example adaptive route networks in accordance with the present disclosure, end devices, such as end devices 20 as shown in FIGS. 1A, 1B, may be battery-powered. To conserve the finite power available, end device wireless communication units (e.g., RF radios or other communication units capable of providing wireless communication) are used only when necessary. Conversely, cluster hosts may be powered externally, and in those examples, a cluster host wireless receiver is always enabled to listen for incoming messages. Therefore, in some examples, end devices initiate all downstream communications with a cluster host.

Each end device includes one or more sensors for detecting one or more events. The type of event(s) will depend upon the type of application in which the adaptive route network is being used. For example, in a hand hygiene compliance network, one type of end computing device may include a hand hygiene product dispenser, which detects a "dispense event" each time it senses actuation of the hand hygiene product dispenser. Another type of end computing device in a hand hygiene compliance network may include a bed beacon which generates a patient zone around a patient bed and detects an "entry event" each time a healthcare worker wearing an electronic identification badge enters and/or leaves the patient zone. The sensors and devices may include any type of device and/or sensor that could be used in an Internet-of-Things type network. It shall therefore be understood that the sensors for detecting one or more events may encompass a wide range of different type of sensors and devices, and that the disclosure is not limited in this respect.

In the examples described herein, each message from an end device is addressed to the current cluster host's (4-byte) factory address and transmitted as events occur. The cluster host replies to each message received by transmitting an ACK if the message is received successfully or a negative-acknowledgment message (NAK) if the received message is corrupt or incomplete. If a NAK or no reply at all is received by the end device, the end device will retry transmitting the pending message. If all retry attempts have failed to yield a successful message delivery, the end device will assume the current cluster host is unavailable. The end device will then enter the cluster host discovery process (40) and remain there until a cluster host is discovered. All new events that occur, while the end device is searching for a cluster to join, will be stored in its buffer.

There will be times when a cluster host will receive a message from an end device but that end device will not receive an ACK reply from the host due to RF noise or network congestion. The end device will then retransmit its message. This may result in duplicate messages being received by the host. Rather than rely on the host and its limited resources (RAM, ROM, μC etc.) to detect and eliminate duplicate messages, each message is transmitted through the network along the route to a local or offsite server computing device. The server computing device(s) have virtually unlimited resources (at least as compared to the network devices) and is better suited to eliminate duplicate messages.

In another example, the cluster host computing device keeps the source address and time/date stamp of the last 10 messages in a circular queue. If the message is a duplicate, the cluster host computing device sends an ACK, but does not write it to the outgoing message buffer. This may help to reduce network traffic by reducing transmission of duplicate messages.

Cluster maintenance is required to maintain reliable communications between an end device and a cluster host. Each end device is responsible for maintaining its own link with a cluster host. If this link cannot be maintained, the end device must discover a new cluster to join. Factors such as dynamic RF noise levels and end device mobility may result in a need for an end device to discover a new cluster host. For example, in some applications, end devices may be moved around an environment as needed to suit the needs of the application. In a healthcare environment, for example, hospital beds may be moved from one location to another, and thus a bed beacon associated with a particular hospital bed may need to discover a new cluster host if the bed is moved to a new location.

The adaptive route network and protocol as described herein supports mobility of the end devices within the network. Each end device executes the cluster hub discovery process at periodic intervals (e.g., every 30 minutes or other appropriate time interval) to evaluate its link with the current cluster host or identify a better cluster host link if one is available. If a better link is identified, the end device will join that cluster and all messages will then be addressed directly to the new cluster host. Otherwise, it will remain in its current cluster. If an end device discovers that its current cluster host is no longer available, it will execute the cluster hub discovery process until a new cluster host is found.

Figure 12:
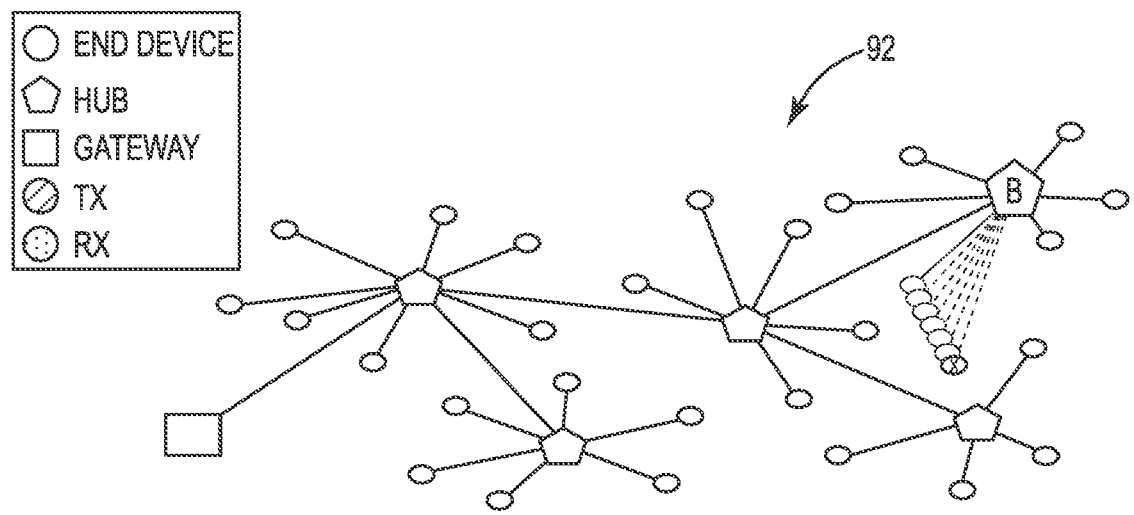

FIG. 12 shows an end device labeled X that is moving away from its original location. As it moves farther from its cluster host (cluster host B in this example), its link quality with original cluster host B will degrade and the link will be broken once the cluster host is beyond the end device's wireless range.

Figure 13:
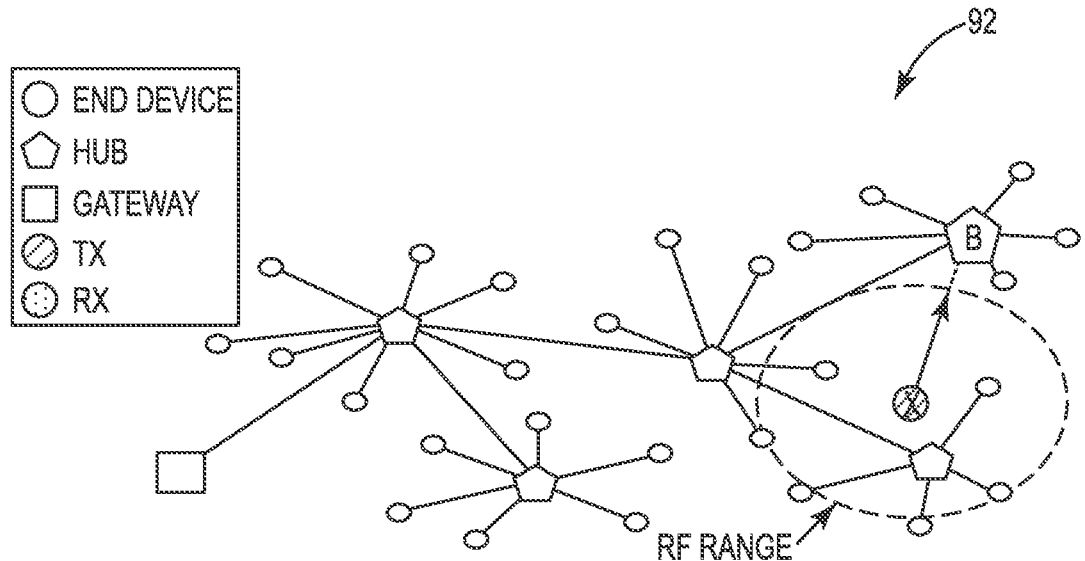

In FIG. 13, end device X has reached a new location. Sometime thereafter, the end device X transmits an event message to its cluster host, cluster host B. However, cluster host B is beyond the end device X's wireless range and cannot receive the message. As the end device X has not received an ACK from the cluster host B, it will retry transmitting the message a predetermined number of times (i.e., ten (10) or other appropriate number). However, cluster host B will not respond because it is too far away and therefore out of wireless communication range.

Figure 14:
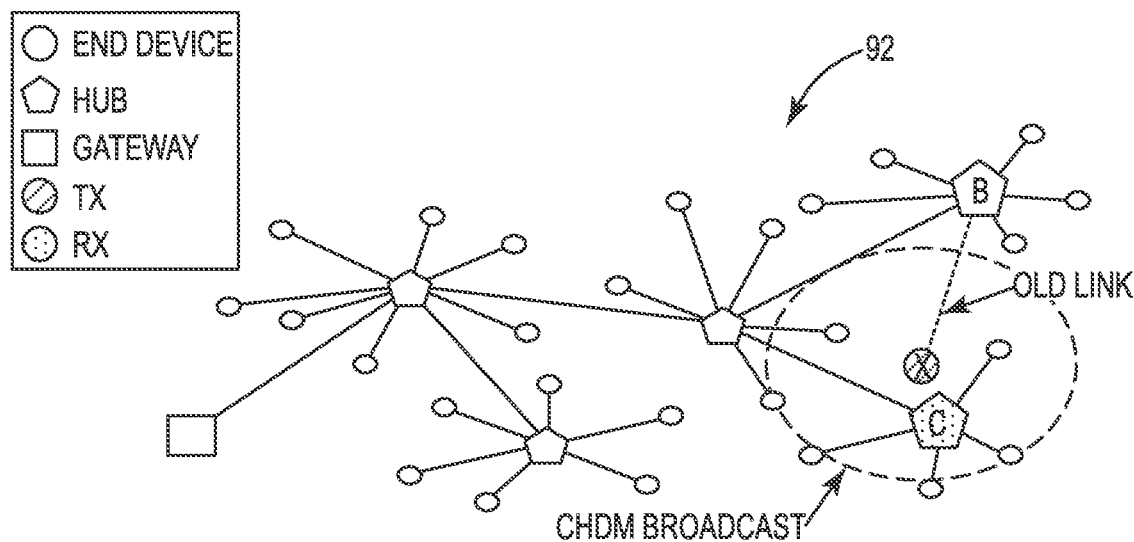

In FIG. 14, all retry attempts with cluster host B have failed, so end device X executes the cluster hub discovery process, and broadcasts a CHDM. A different cluster host, cluster host C, is within range of the relocated end device X and receives its CHDM.

Figure 15:
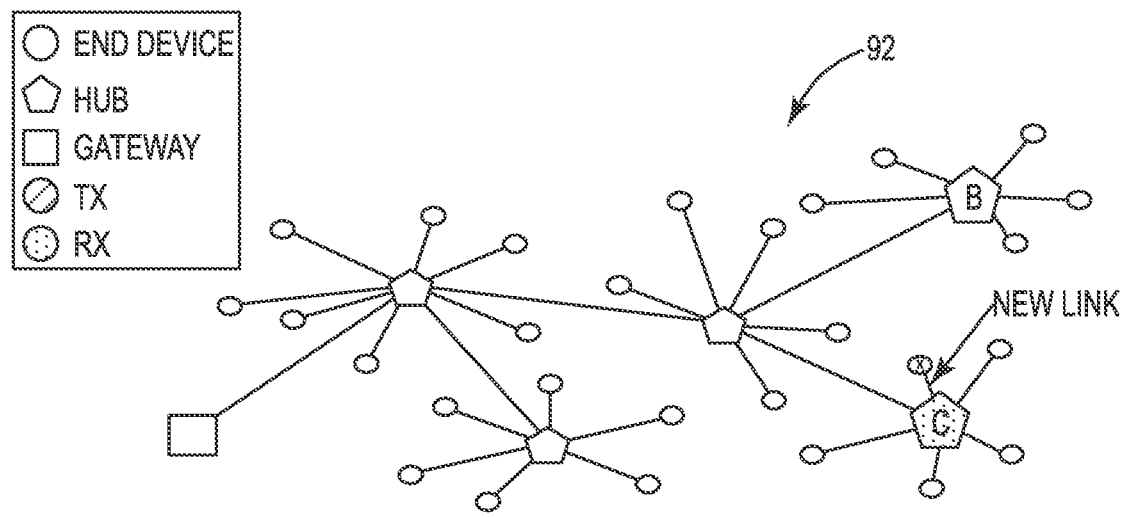

Cluster host C that is within range of the relocated end device X replies to the CHDM and the end device X replies back with an ACK message. End device X will then exit the CHDA and transmit a join cluster message, the cluster host C will reply with an ACK message, and the relocated end device X has become a member of a new cluster with cluster host C as shown in FIG. 15.

Each time an end device joins a cluster, its join cluster message (JCM) is sent to the server computing device, such as server computing device(s) 30 of FIG. 2. This allows the server computing device(s) to keep track of each end device's current cluster membership and update the portion of a route table corresponding to that end device. The server maintains this route table, which includes the addresses of each node along the current route between the server computing device(s) and each of the end computing device(s). Server computing device(s) may use this route information to transmit upstream messages from the server computing device(s) to any end device on the adaptive route network. These upstream messages may include responses to downstream messages from the end computing devices or cluster host computing devices. The upstream messages may also include unsolicited messages such as updates to settings or firmware.

Figure 29:
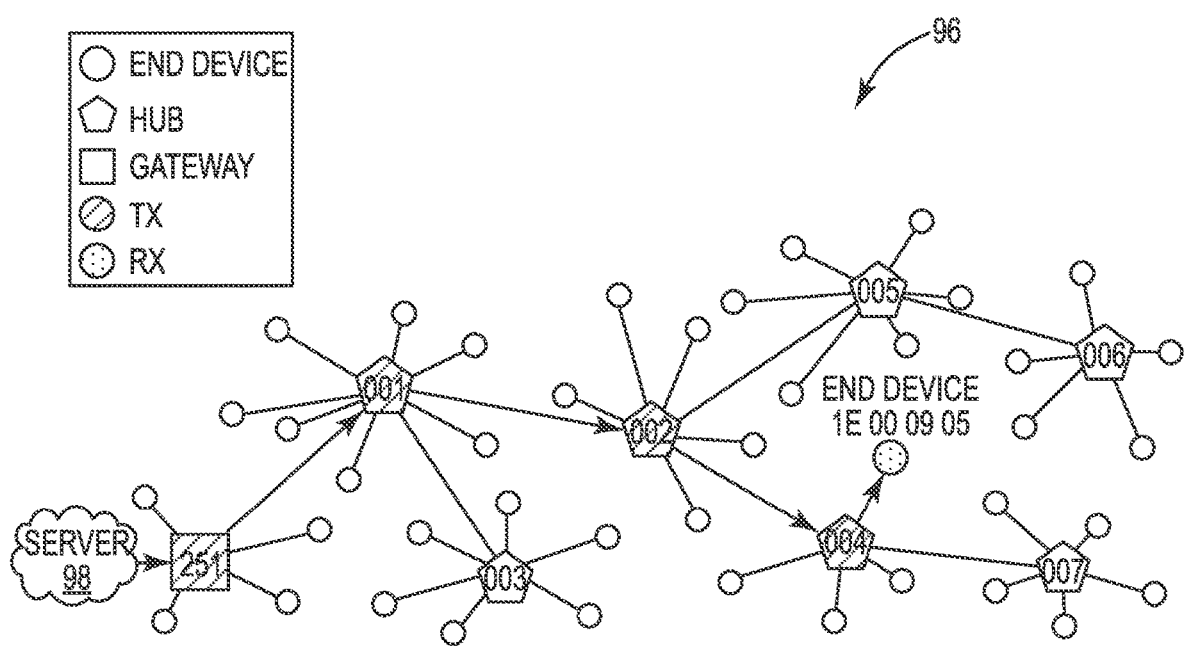
FIG. 29 shows the example adaptive route network of FIGS. 26 and 28, in which the gateway or server is sending an unsolicited message to an end device with a factory address of 1E000905h.

For example, a portion of a route table stored by a server computing device corresponding to the end computing device having the factory address of 1E000905h in the example of FIG. 29 may include the following:

| End Device Factory Addr | Node Count | Gateway | Route Node 1 | Route Node 2 | Route Node 3 |
|---|---|---|---|---|---|
| 1E 00 09 05 | 3 | 251 | 004 | 002 | 001 |

The route table maintained by the server includes similar entries for each computing device in the adaptive route network, including gateway computing devices, cluster host computing devices, and end computing devices. In this way, the server computing device maintains a route to each computing device in the network by which it may transmit downstream messages using the bi-directional communication protocol described herein. In addition, because the routes are updated each time a downstream message is received from an end computing device and/or cluster host computing device, the routes are maintained and updated at the server without having to transmit separate route maintenance messages throughout the network. This greatly reduces network traffic and simplifies the design of the cluster host and end computing devices, while also providing a simplified and highly accurate way to both maintain the route table and transmit upstream network messages from the server to the cluster host and/or end computing devices.

FIG. 4A is a flowchart illustrating an example cluster host discovery process (40). by which a computing device, such as an end computing device attempting to join an adaptive route network, may discover a cluster hub host and join a cluster in accordance with the present disclosure.

As shown in FIG. 4A, the end computing device may begin a cluster host discovery process by incrementing a message ID (41). While an end computing device is executing example process (40), each cluster host discovery message broadcast will have the same message ID (8-bit nonce). The end computing device may initialize the process by setting a cluster Hosts Found counter to zero (42) and setting a Broadcast Count to zero (43). End computing device may further, before or after broadcasting a cluster host discovery message (CHDM), increment a Broadcast Count (44). Thus, the first time through the cluster host discovery process (40), the broadcast count will be incremented to 1 (44).

The end computing device broadcasts an CHDM (45). The CHDM includes the end device's 255 4-byte factory address and message ID. This message may be received by any cluster host within wireless range of the end device. Cluster hosts that are not currently route nodes (i.e., are not joined to a route to a gateway) will ignore the CHDM. If more than one cluster host is within range, all of the cluster hosts within range will receive the CHDM broadcast. Each cluster host that receives the CHDM (the so-called discovered cluster hosts) will respond to the CHDM with an CHDM reply. The CHDM reply will include the discovered cluster host's 4-byte factory address. The CHDM reply will also include the discovered cluster host's number of hops to the respective gateway for that route (0 if the route node is a gateway), and link quality information including both the link between the end computing device and the discovered cluster host as well as quality information concerning the cluster host's route to the gateway.

If one or more CHDM replies are received (46), the end computing device responds with an ACK message to the first valid CHDM reply it receives (47). The end computing device stores the cluster host information corresponding to the discovered cluster host address received in the CHDM reply (48) and increment the number of route nodes found (49). If the number of cluster hosts found/discovered satisfies a threshold (50) (three in this example), the process (40) is complete (57). If the number of cluster hosts found/discovered does not satisfy the threshold (50) (less than three in this example) the end computing device may further broadcast additional CHDMs, at predefined intervals (56) (1 second intervals in this example), after each CHDM reply is received to determine if any additional cluster hosts are within range. Replies from up to three (3) different cluster hosts will be accepted in this example.

If no replies are received (46) to an CHDM message, the end computing device will determine if the number of cluster hosts found is greater than zero (that is, at least one cluster host within range has been found) (51). If so, the end device will determine whether the broadcast count satisfies a threshold (55) (whether the broadcast count equals three in this example). If the broadcast count satisfies the threshold, the cluster host discovery process is complete (57). This means that the end computing device has found at least one cluster host within range and has tried at least three times to discover additional route nodes.

If the number of cluster hosts found is not greater than zero (that is, no cluster hosts have been found) (51), and the broadcast count does not satisfy the threshold (52) (broadcast count is less than three in this example) the end computing device will delay for a predefined period of time (54) (one second in this example) and then rebroadcast another CHDM with the same message ID (44, 45) in an attempt to discover at least one cluster host.

If the number of cluster hosts found is not greater than zero (that is, no cluster hosts have been found) (51), and the broadcast count satisfies a threshold (52) (broadcast count equals three in this example, meaning that the end computing device has broadcast the same CHDM at least three times with no response) the end computing device will delay for a random period (53) (e.g., between 1 and 128 seconds in this example) and then repeat the cluster host discovery process (40) with a new message ID (41). End computing device repeatedly executes process (40) indefinitely until at least one cluster host has been discovered.

Figure 4B:
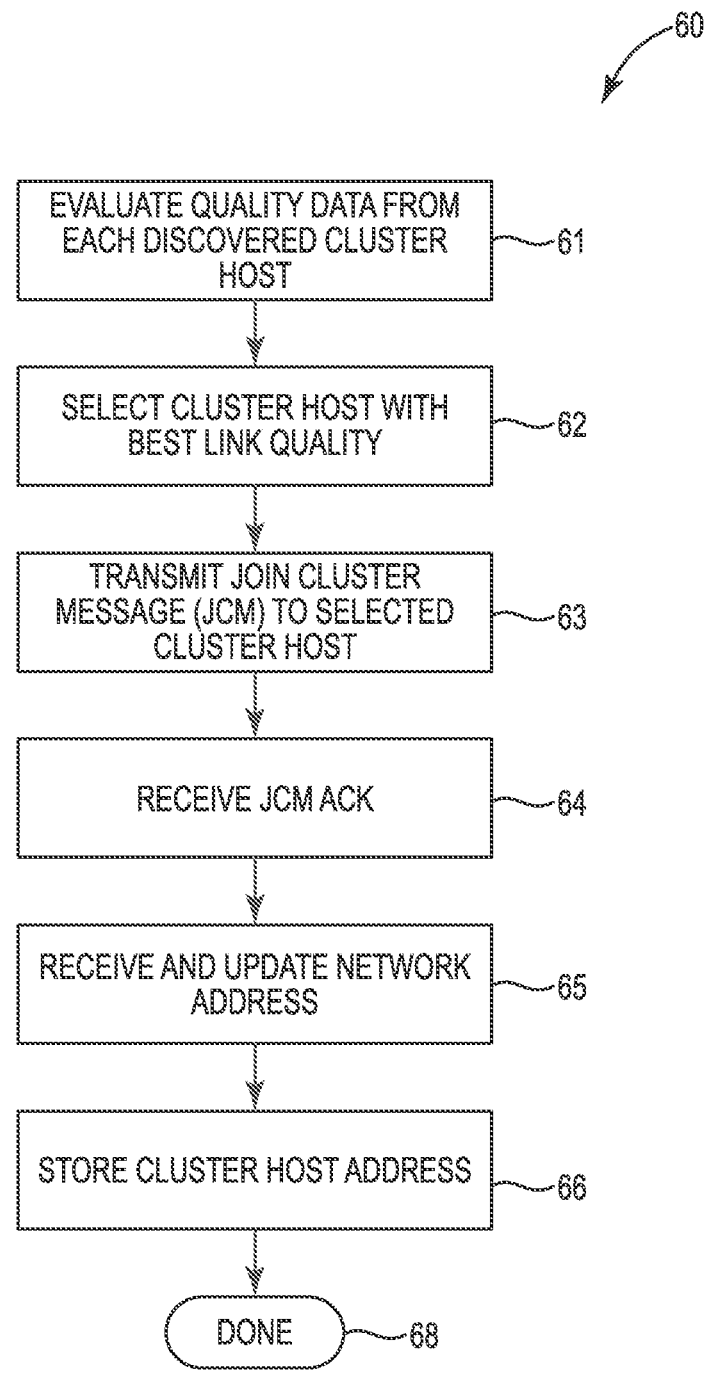

Once all replies have been received and acknowledged, the end computing device exits the example cluster host discovery process (40), evaluates the information returned by each cluster host, and selects the cluster host which provides the best overall link quality as shown in FIG. 4B.

FIG. 4B is a flowchart illustrating an example process (60) by which a computing device, such as an end computing device attempting to discovery and join a cluster in an adaptive route network, may evaluate information returned by each discovered cluster host and select a cluster to join in accordance with the present disclosure.

An end computing device seeking to join a cluster in an adaptive route network evaluates the discovered cluster host information returned by each responding cluster host (61). The end computing device selects the cluster host which provides the best overall link quality (62). End computing device transmits a Join Cluster Message (JCM) to the selected cluster host (63). In FIG. 10, for example, end computing device X transmits a JCM to selected cluster host B. The JCM contains the factory address (4-byte) of the end device. When the selected cluster host (route node B in the example of FIG. 10) receives the JCM, it replies to the originating end computing device with an ACK (JCM Reply). The end computing device receives the JRM ACK (64).

The selected cluster host (cluster host B in the example of FIG. 10) will then pass the JCM to the gateway (gateway Z in the example of FIG. 10) via the route previously stored in the selected cluster host (as described herein below). In the example of FIG. 10, the route to gateway Z from route node 001 includes three hops from cluster host B to gateway Z. Once the gateway receives the JCM, it will request that the server computing device assign end computing device a unique (that is, unique to the devices forming a route to that particular gateway) 1-byte network address. The gateway then transmits a JCM reply back to the end computing device via the same route.

After the end computing device receives the JCM reply from gateway, it stores the cluster host network address (66), and the process is complete (68). The end computing device is now a member of the cluster belonging to the cluster host network address and has become a member of the adaptive route network. As shown in the example of FIG. 11, end device X is now a member of the cluster associated with cluster host B with and includes a link with cluster host B.

Figure 16A:
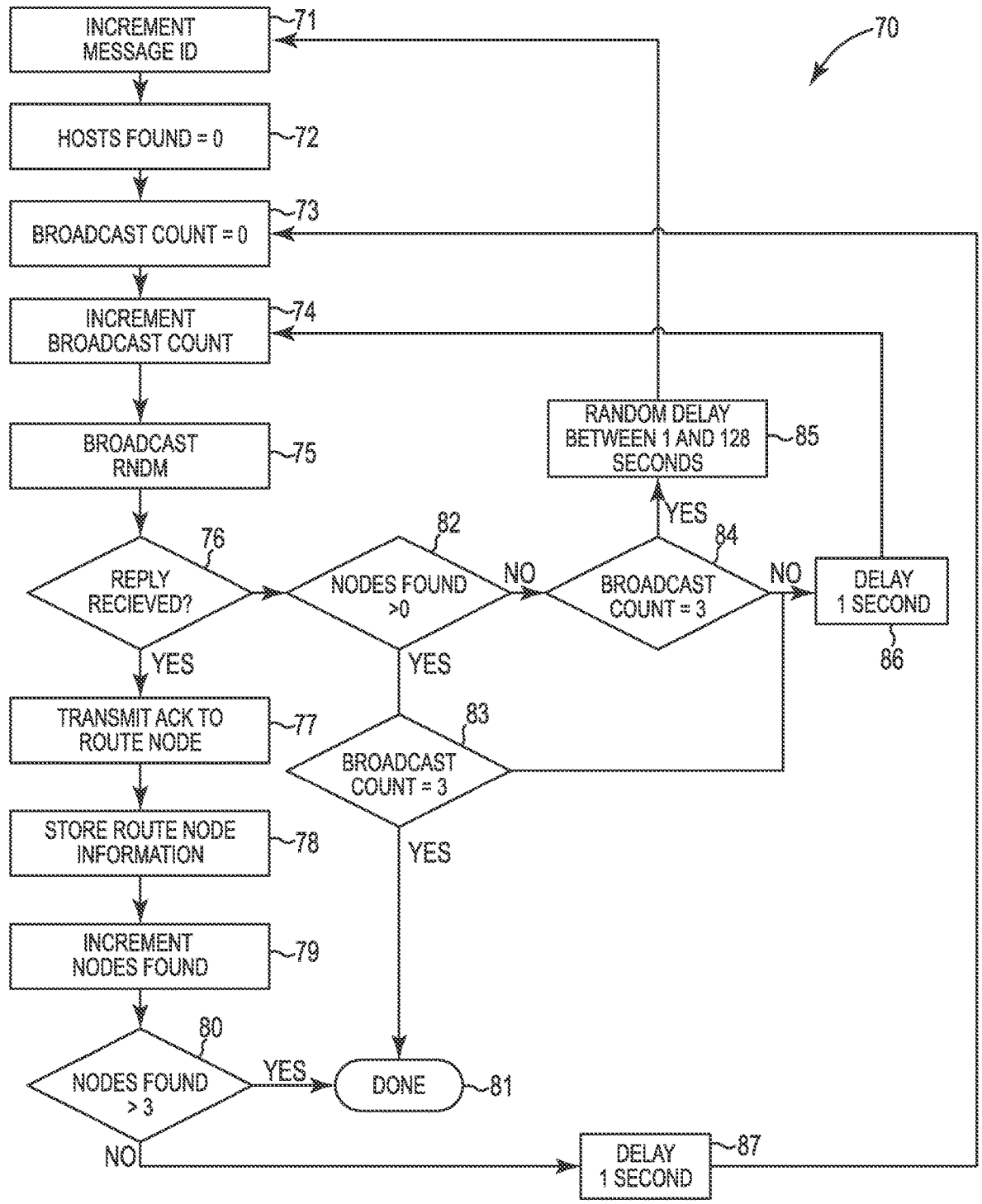
FIG. 16A is a flowchart illustrating an example route node discovery process by which a computing device, such as a hub computing device attempting to join an adaptive route network, may discover one or more route(s) to a gateway in accordance with the present disclosure.

FIGS. 17-25 show an example adaptive route network 94 and illustrate an example process by which a hub computing device may discover a route to a gateway using an example route discovery process 60 of FIG. 16A.

For purposes of the present description, a "route" in the adaptive route network is composed of "nodes" which link together to form a data path or route from an end computing device to a gateway computing device. The nodes may include hubs/cluster hosts and gateways. For example, in FIG. 1A, each hub computing device 14A-14E is a cluster host computing device and is a node on a route from the end devices in each of the associated clusters 22A-22E, respectively, to gateway 12. Gateway 12 is also considered a node. A gateway 12 will always be the first node of any route within its network. In FIG. 1A, the route from cluster host 14D to gateway 12 includes a first "hop" to cluster host 14C, a second hop to cluster host 14A, and a third hop to gateway 12. The route from cluster host 14B to gateway 12 includes a first hop to cluster host 14A and a second hop to gateway 12. The route from cluster host 14A to gateway 12 includes a single hop to gateway 12.

Figure 17:
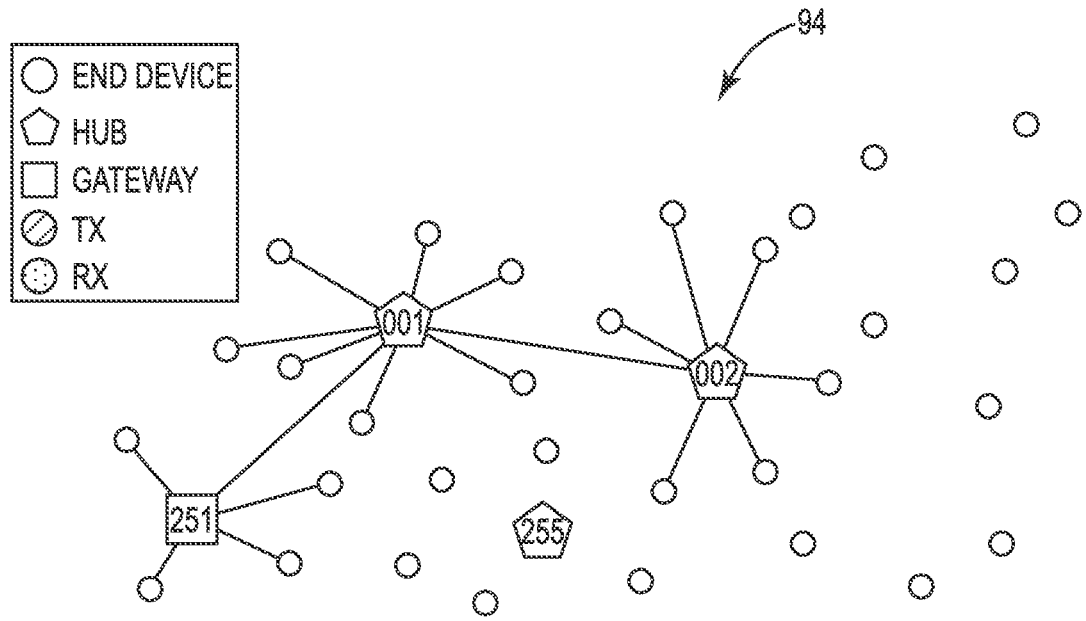
FIGS. 17-25 show an example adaptive route network and illustrate an example process by which a new hub computing device may discover one or more route(s) to a gateway.

FIG. 17 is a block diagram depicting an example adaptive route network 94 including a gateway 251 and route nodes 001 and 002 (cluster hosts), and into which a hub labeled 255 is not currently connected to a route. Hub 255 may be a new hub being introduced to adaptive route network 94, or it may be a hub that was formerly connected to a route but has lost connectivity for some reason. In order to join (or re-join) adaptive network 94, hub 255 must discover and join a route to gateway 251. To discover a route from hub 255 to a gateway 251, hub computing device 255 may execute the example route node discovery process (70) as shown in FIG. 16A, which is described in further detail herein below. Once a suitable route node has been identified, the hub 14 will link to that route node and also become a node of that route.

The example route node discovery process (70) is a self-contained set of operations that discovers and returns information for up to a predetermined number of route nodes (three (3) in the examples described herein) that are connected to a route. The discovered route nodes may belong to the same or different routes. The discovered route node information will include the route node's address, a number of hops to the gateway (0 if the route node is a gateway), and link quality information. The link quality information may include both the link between the hub 255 and route node as well as the node's route to the gateway 251. The discovered route node information will be evaluated by the hub (255 in the examples of FIGS. 17-25) to determine which route node to select and link to if more than one (1) node is discovered.

Until hub 255 has linked to an existing route node and then itself becomes a route node, it will not function as a cluster host. Therefore, it will ignore all messages from any end computing devices. The same is true if an existing link to a route node is broken. Any end devices that were a member of a cluster whose cluster host can no longer provide a route to a gateway (i.e., an unconnected hub) will be ignored (i.e., the unconnected hub will not transmit an ACK in response to any attempts by end devices to send a message, and the end devices will therefore not receive an ACK from the cluster host within an acceptable time limit or after a defined number of retry attempts) thus forcing the end devices to discover a new cluster host if one is available.

Figure 18:
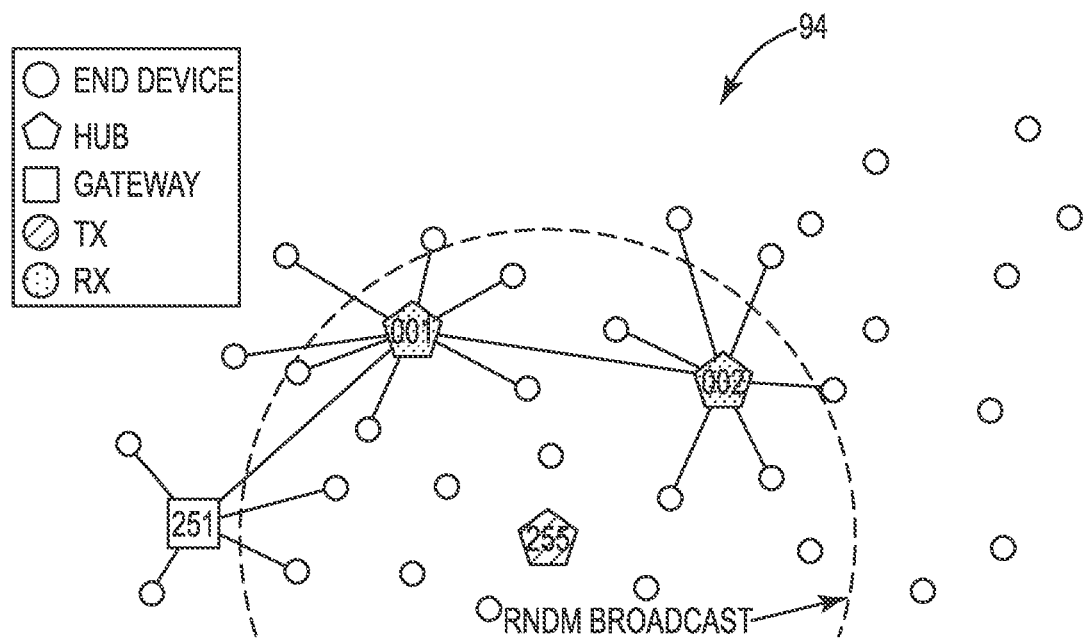

To discover a route to a gateway, a hub, such as hub 255 shown in FIG. 17, begins by broadcasting a route node discovery message (RNDM) which includes the hub's 255 4-byte factory address. This message may be received by any route node within wireless range of hub 255. Hubs that are not currently route nodes (do not have a route to gateway 251 in this example) will ignore the RNDM. In FIG. 18, hub 255 is broadcasting a RNDM. In this example, two (2) hub route nodes, hub route node 001 and hub route node 002 are within RF range and have received the broadcast.

Each route node that receives the RNDM will transmit an RNDM reply that includes the hub's 4-byte factory address. Since more than one (1) route node can receive the RNDM broadcast at the same time, in some examples each route node that receives the RNDM will implement an anti-collision broadcast reply algorithm by randomly selecting a time slot in which to transmit its reply. In the example shown in FIG. 19, route node 002 has received the RNDM before route node 001 and has transmitted a reply to the RNDM before route node 001. Hub 255 will respond with an ACK message to the first valid RNDM reply it receives (in this case, to route node 002). Because hub 255 receives the RNDM reply from route node 001 after it has received the RNDM reply from route node 002, hub 255 ignores the RNDM reply from route node 001.

Hub 255 will broadcast up to a predetermined number of RNDMs at predetermined intervals (e.g., three (3) RNDMs in 1 second intervals, or any other appropriate number or interval), after each RNDM reply is received to determine if any additional route nodes are available. Replies from up to a predetermined number (three (3) in this example) different route nodes will be accepted. If there is no reply after three (3) consecutive RNDM broadcast attempts, hub 255 will assume there are no more available route nodes within its wireless range.

Figure 19:
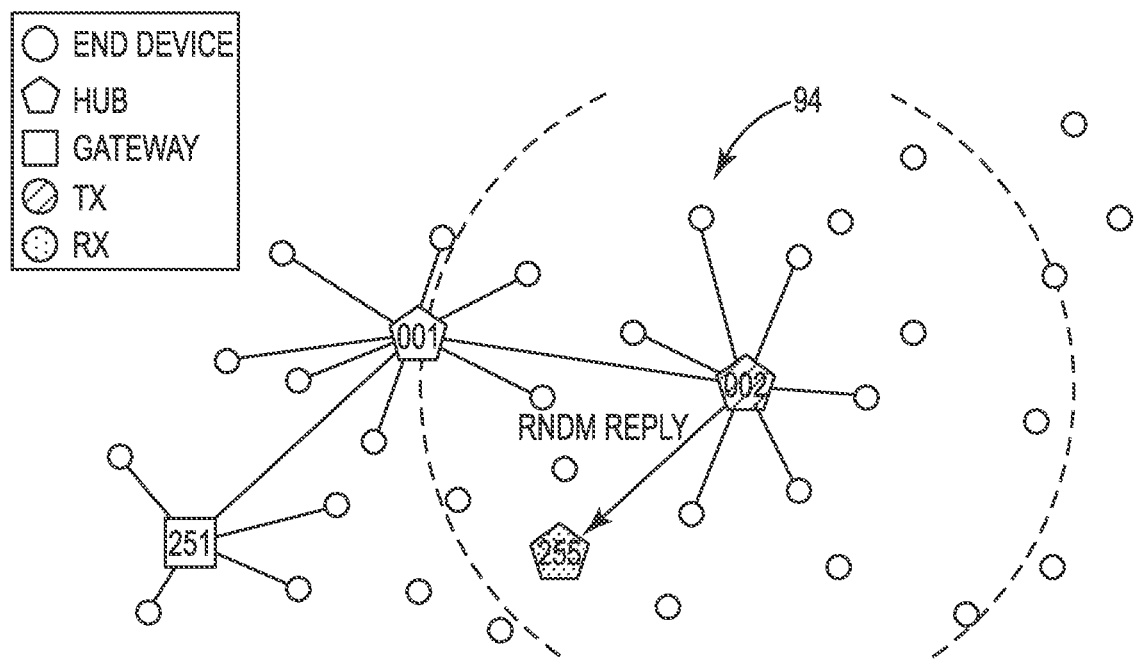

While hub 255 is executing the RNDA process (e.g., FIG. 16A, ref. num. 70), each RNDM broadcast will have the same message ID (8-bit nonce). When hub 255 receives an RNDM reply, it will transmit an ACK back to the replying route node (route node 002 in this example). When an ACK is received from hub 255 by route node 002 in response to its RNDM reply, route node 002 will store the factory address and message ID received from hub 255, for example in a circular buffer. The buffer will contain the last three (3) unique addresses and message IDs for hubs that have recently transmitted a RNDM. In this way, when a hub attempting to join adaptive route network 94 rebroadcasts a RNDM in an effort to locate every route node within wireless range, any route node that has already replied and received an ACK will ignore any subsequent broadcasts from the same hub. In the example of FIG. 19, this means that subsequent broadcasts by hub 255 from the same sequence of attempts to join network 94, which will all include the same message ID, will be ignored by route node 002.

Figure 20:
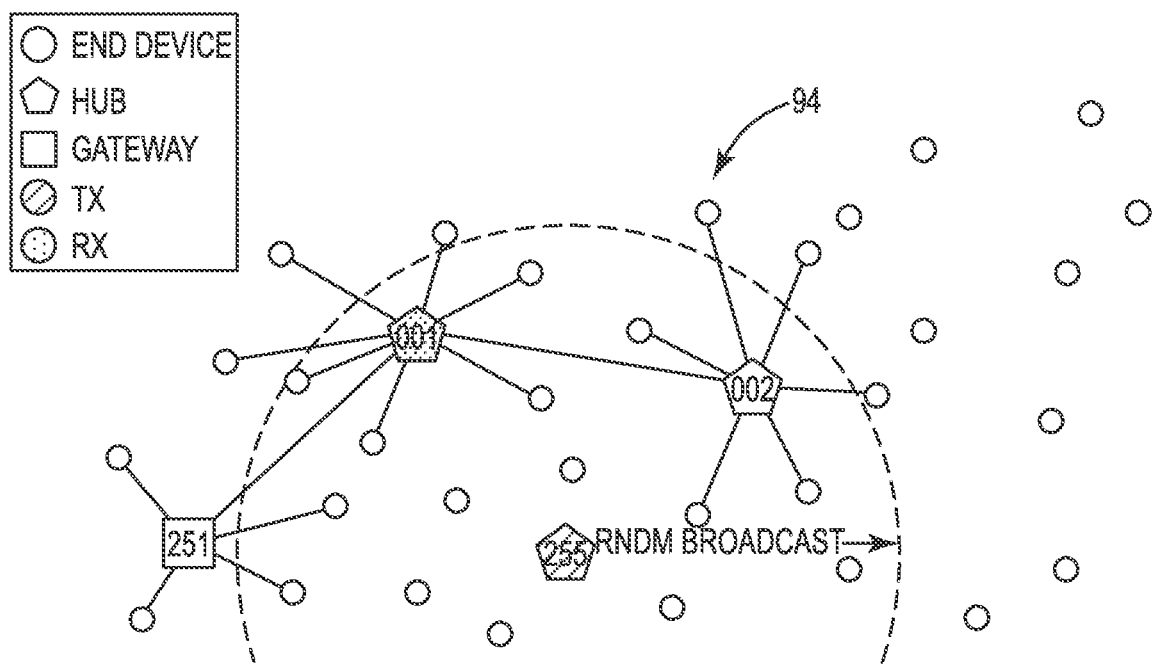
Figure 21:
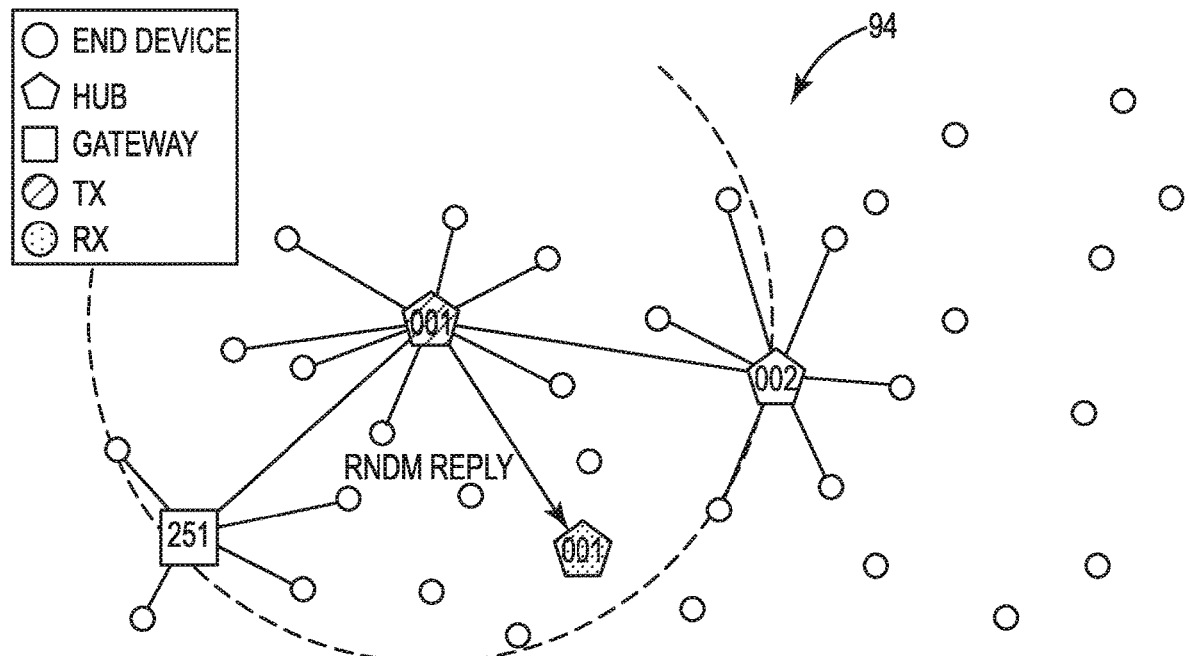

In FIG. 20, route node 002 has received an ACK for its reply to the RNDM broadcast by hub 255. Hub 255 continues to rebroadcast the RNDM having the same message ID in an attempt to locate any other route nodes within range. As the current RNDM is from the same hub 255 and has the same message ID as the previous broadcast, route node 002 will ignore the broadcast. However, route node 001 has not yet received an ACK from hub 255 and will therefore transmit an RNDM reply, as shown in FIG. 21. Hub 255 will then transmit an ACK to route node 001, which will record and store the factory address and message ID in the RNDM received from hub 255.

Figure 22:
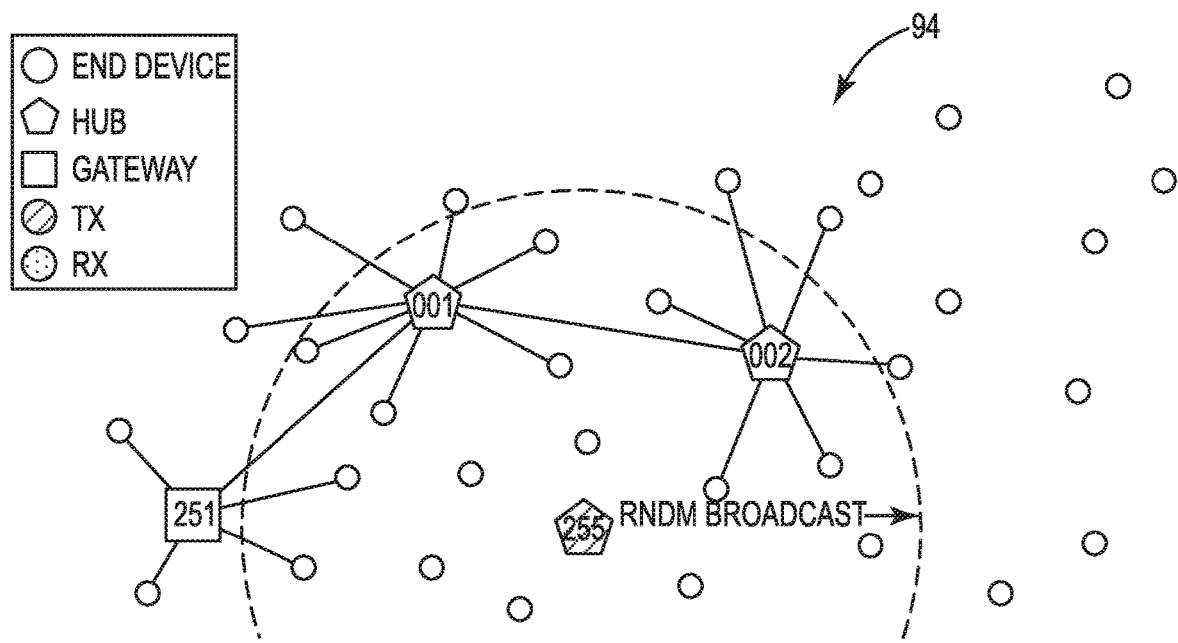

In FIG. 22, hub 255 continues to send up to a predetermined number (three (3) in this example) RNDMs, but they will go unanswered as only route nodes 001 and 002 are within RF range. Both route nodes 001 and 002 have replied to the RNDM and received an ACK from hub 255. Therefore, they will ignore any further RNDM broadcasts from hub 255 with the same message ID. Hub 255 will now exit the example route node discovery process (70) as at least one (1) and up to three (3) route nodes have been discovered (two in this case). However, if hub 255 was unable to discover any route nodes and a predetermined number of consecutive RNDM broadcasts go unanswered (see, e.g., FIG. 16A, ref nums. 82, 83, 84), the hub will delay for a random period (e.g., between 1 and 128 seconds) (85) and then repeat the example route node discovery process (70). Hub computing device repeatedly executes the example route node discovery process (70) until at least one (1) route node is discovered.

The RNDM reply (RNDMR) from each route node 001 and 002 to hub 255 will include the route node's number of hops to the respective gateway for that route (0 if the route node is a gateway), and link quality information including both the link between the hub and node as well as the node's route to the gateway. As discussed above, only hubs with a route to a gateway will reply to a RNDM. In this example, route node 001 has one (1) hop to gateway 251 and route node 002 has two (2) hops to gateway 251.

Once all replies have been received and acknowledged, hub 255 will exit the route node discovery algorithm (60). Hub 255 then evaluates the discovered route information returned by each responding route node and select the route node which provides the best overall link quality (see, e.g., FIG. 4B).

Figure 23:
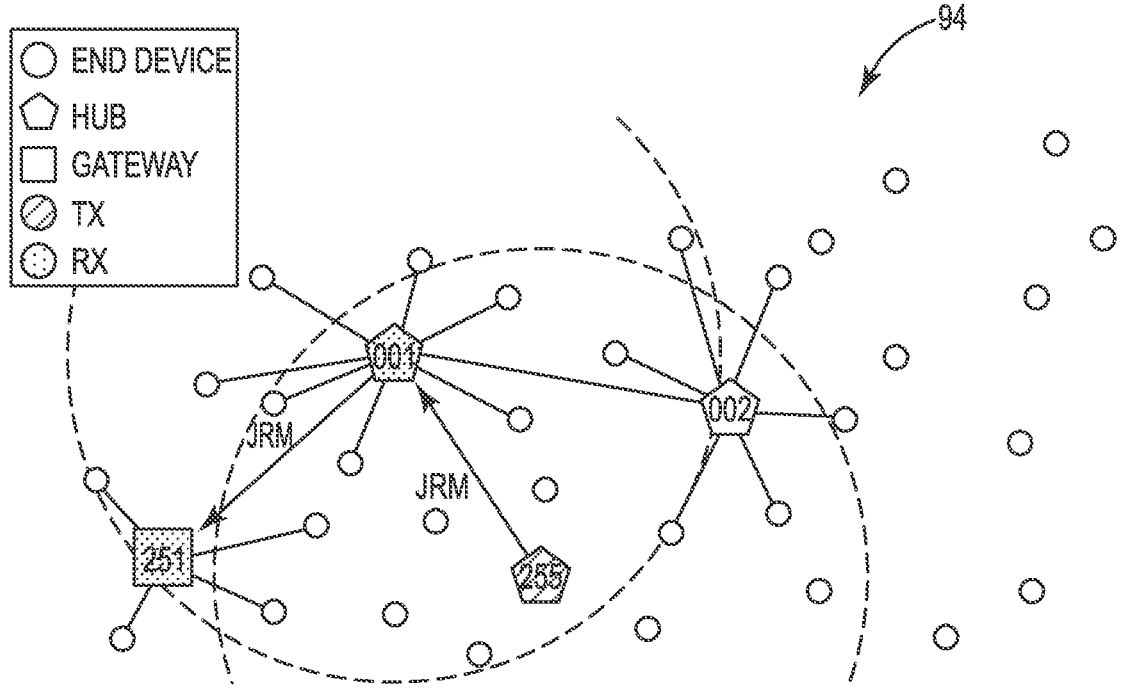

As shown in FIG. 23, hub 255 has determined that route node 001 provides the best overall link quality, and selects route node 001. Hub 255 transmits a Join Route Message (JRM) to the selected route node 001. The JRM will contain the factory address (4-byte) and network address (1-byte) for hub 255 (a default value if the hub was not previously a member of a route). When the selected route node (route node 001 in this example) receives the JRM replies to the hub 255 with an ACK (JRM Reply).

Figure 24:
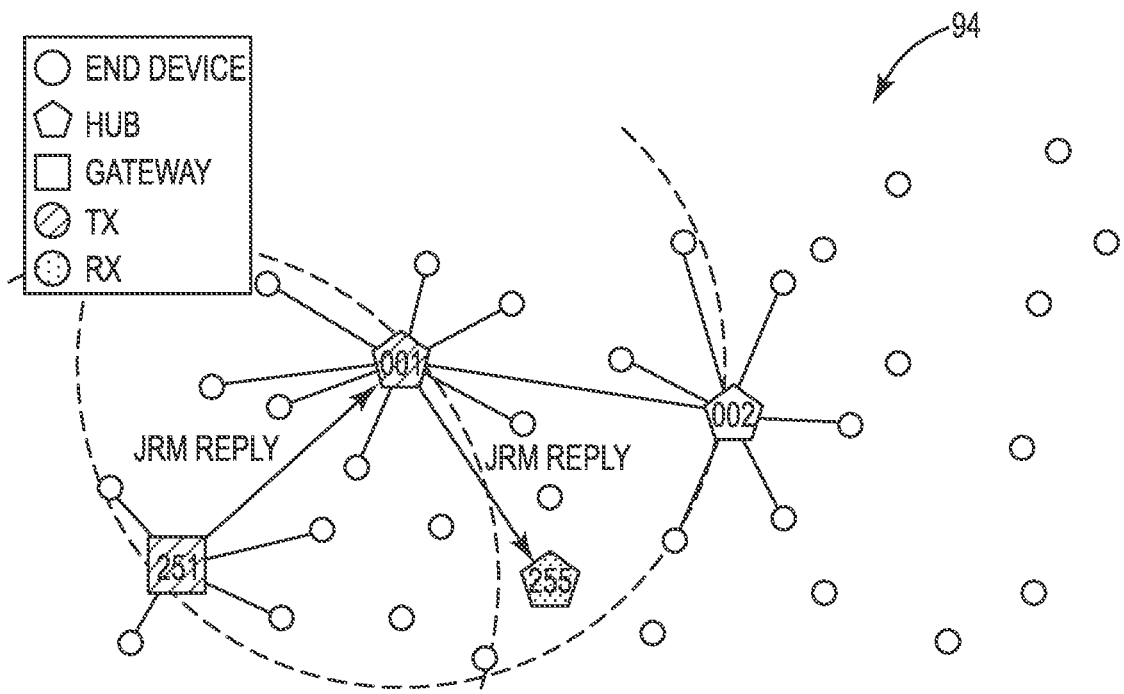

The selected route node (001 in this example) will then pass the JRM to gateway 251 via the route to the gateway previously determined during its own route node discovery process. In this example, the route to gateway 251 from route node 001 includes the single hop from route node 001 to gateway 251. Once gateway 251 receives the JRM, it will request that the server computing device assign hub 255 a unique 1-byte network address (unique to that gateway). As shown in FIG. 24, gateway 251 then transmits a JRM reply back to hub 255 via the route from gateway 251, to hub 001, and finally to hub 255. The JRM reply will contain the newly assigned network address for hub 255.

Figure 25:
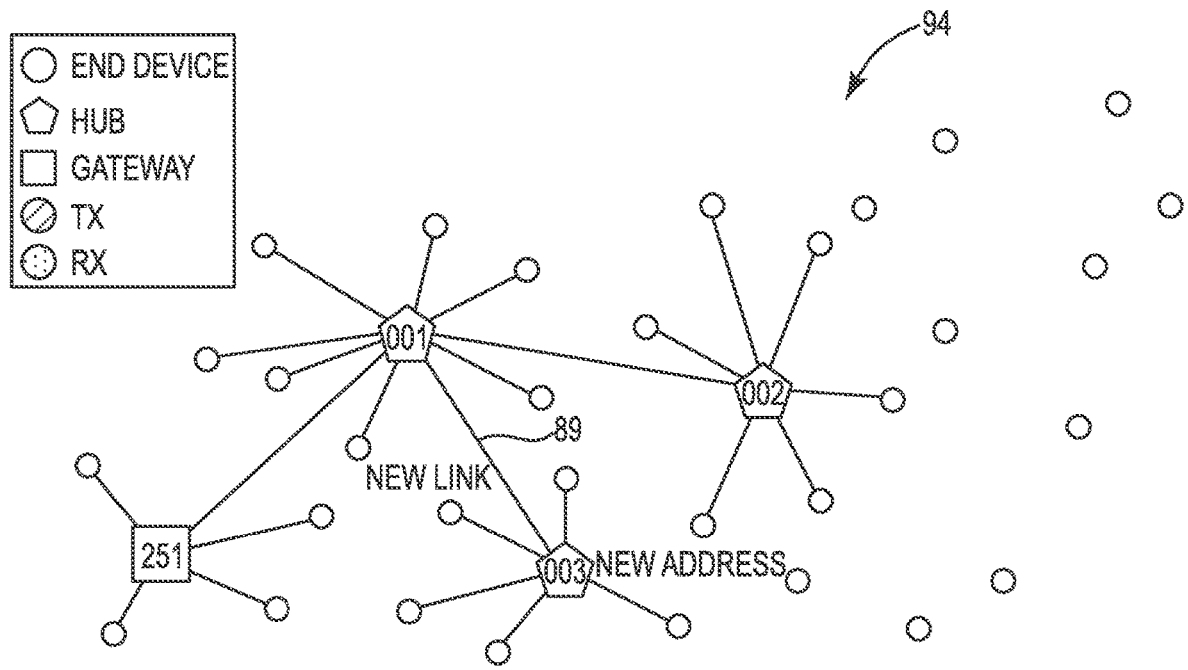

After hub 255 receives the JRM reply from gateway 251, it will update its 1-byte network address and become a member of the route. As shown in FIG. 25, hub 255 is now a route node with a network address of 003 and a link 54 to the next node (route node hub 001 in this example) along the route from route node 003 to gateway 251. Hub 003 (formerly hub 255) can now be a cluster host and may allow one or more end computing devices to join its cluster, as shown in FIG. 25.

FIG. 16A is a flowchart illustrating an example route node discovery process (70) by which a computing device, such as a hub computing device attempting to join an adaptive route network, may discover one or more route(s) to a gateway in accordance with the present disclosure.

As shown in FIG. 16A, the hub computing device may begin a route node discovery process by incrementing a message ID (71). While a hub is executing example process (70), each RNDM broadcast will have the same message ID (8-bit nonce). The hub computing device may initialize the process by setting a Nodes Found counter to zero (72) and setting a Broadcast Count to zero (73). Hub computing device may further, before or after broadcasting a route node discovery message (RNDM), increment a Broadcast Count (74). Thus, the first time through the route node discovery process (70), the broadcast count will be incremented to 1 (74).

The hub computing device broadcasts an RNDM (75). The RNDM includes the hub's 255 4-byte factory address and message ID. This message may be received by any route node within wireless range of the new hub. Hubs that are not currently route nodes (i.e., do not have a route to a gateway) will ignore the RNDM. If more than one route node is within range, all of the route nodes within range will receive the RNDM broadcast. Each route node that receives the RNDM (the so-called discovered route nodes) will respond to the RNDM with an RNDM reply. The RNDM reply will include the discovered route node's 4-byte factory address. The RNDM reply will also include the discovered route node's number of hops to the respective gateway for that route (0 if the route node is a gateway), and link quality information including both the link between the new hub computing device and the discovered route node as well as quality information concerning the route node's route to the gateway.

If one or more RNDM replies are received (76), the new hub computing device responds with an ACK message to the first valid RNDM reply it receives (77). The new hub computing device will store the route node information corresponding to the discovered route node address received in the RNDM reply (78) and increment the number of route nodes found (79). If the number of route nodes found/discovered satisfies a threshold (80) (greater than three in this example), the process (70) is complete (81). If the number of route nodes found/discovered does not satisfy the threshold (80) (less than three in this example) the new hub computing device may further broadcast additional RNDMs, at predefined intervals (87) (1 second intervals in this example), after each RNDM reply is received to determine if any additional route nodes are available. Replies from up to three (3) different route nodes will be accepted in this example.

If no replies are received (76) to an RNDM message, the new hub computing device will determine if the number of nodes found is greater than zero (that is, at least one node has been found) (82). If so, the hub will determine whether the broadcast count satisfies a threshold (83) (whether the broadcast count equals three in this example). If the broadcast count satisfies the threshold, the route node discovery process is complete (88). This means that the new hub computing device has found at least one route node and has tried at least three times to discover additional route nodes.

If the number of nodes found is not greater than zero (that is, no nodes have been found) (82), and the broadcast count does not satisfy the threshold (broadcast count is less than three in this example) the hub computing device will delay for a predefined period of time (86) (one second in this example) and then rebroadcast another RNDM with the same message ID (74, 75) in an attempt to discover at least one route node.

If the number of nodes found is not greater than zero (that is, no nodes have been found) (82), and the broadcast count satisfies a threshold (broadcast count equals three in this example, meaning that the hub computing device has broadcast the same RNDM at least three times with no response) the hub computing device will delay for a random period (85) (e.g., between 1 and 128 seconds) and then repeat the route node discovery process (70) with a new message ID (71). This process (70) repeats indefinitely until at least one route node has been discovered.

Figure 16B:
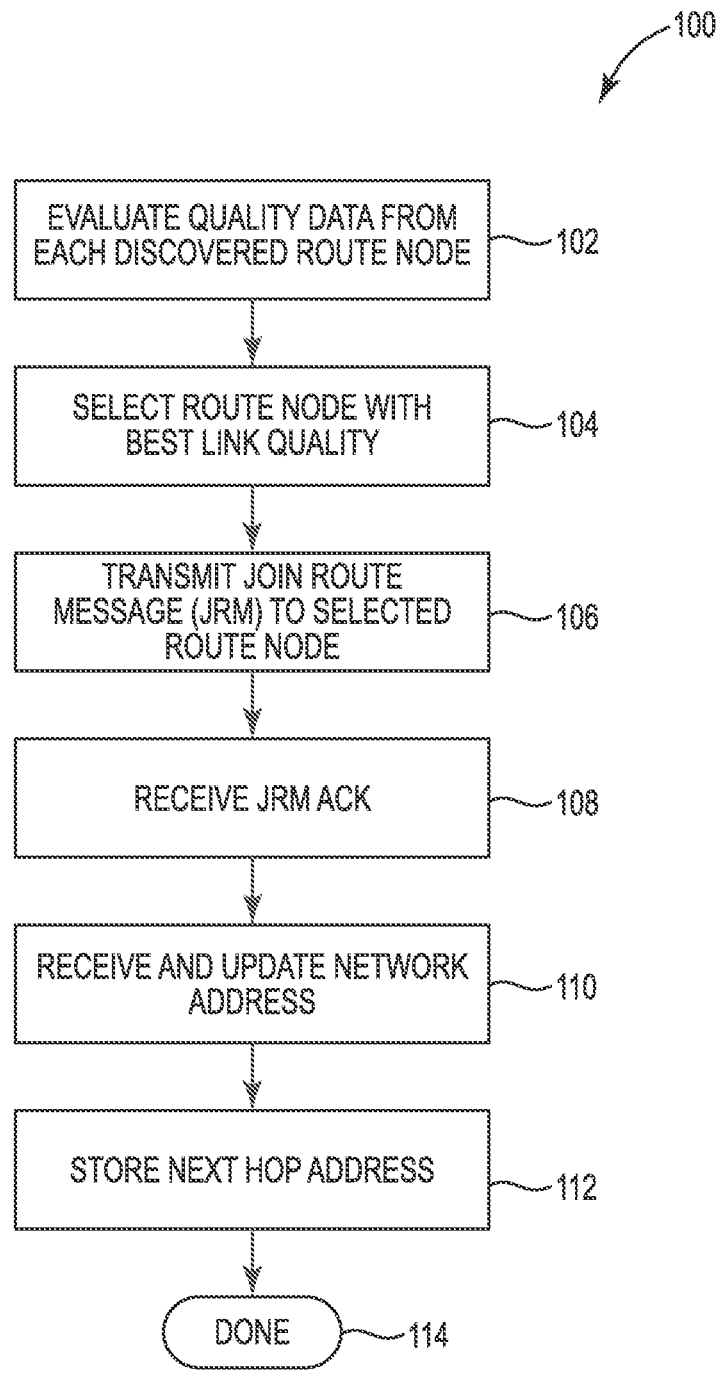
FIG. 16B is a flowchart illustrating an example process by which a computing device, such as a hub computing device attempting to join an adaptive route network, may select a route to a gateway in accordance with the present disclosure.

Once all replies have been received and acknowledged, the hub computing devices exits the example route node discovery process (70) and then evaluates the information returned by each route node and selects the route node which provides the best overall link quality as shown in FIG. 16B.

FIG. 16B is a flowchart illustrating an example process (100) by which a computing device, such as a hub computing device attempting to join an adaptive route network, may evaluate information returned by each discovered route node and select a route to a gateway in accordance with the present disclosure.

A hub computing device seeking to join an adaptive route network evaluates the discovered route information returned by each responding route node (102). The hub computing device selects the route node which provides the best overall link quality (104). Hub computing device transmits a Join Route Message (JRM) to the selected route node (106). In FIG. 23, for example, hub computing device 255 transmits a JRM to selected route node 001. The JRM will contain the 4-byte factory address and the current 1-byte network address, if any. If the hub computing device was not previously a member of the adaptive route network, its network address will be set to a default value. When the selected route node (route node 001 in the example of FIG. 23) receives the JRM, it replies to the originating hub computing device with an ACK. The hub computing device receives the ACK (108).

The selected route node (001 in this example) passes the JRM to the gateway (gateway 251 in the example of FIG. 23) via the route previously stored in the selected route node during its own route node discovery process. In the example of FIG. 23, the route to gateway 251 from route node 001 includes the single hop from route node 001 to gateway 251. Once the gateway receives the JRM, it will record the 4-byte factory address of the new hub computing device (255 in the example of FIG. 23) in a table and request that the server computing device assign the new hub a unique 1-byte network address. The gateway then transmits a JRM reply back to the new hub via the same route (in FIG. 24, the route is from gateway 251, to hub 001, and finally to hub 255). The JRM reply will contain the newly assigned network address for hub 255. As shown in the example of FIG. 25, the network address assigned to hub 255 is 003.

After the new hub computing device receives the JRM reply from the gateway, it updates its 1-byte network address (110), stores the next hop (downstream) address (112) and the process is complete (114). The new hub computing device is now a member of the adaptive route network and may respond to any join cluster messages from end computing devices and become a cluster host as described herein with respect to FIGS. 4A and 4B. As shown in the example of FIG. 25, hub 255 is now a route node with a network address of 003 and a link 89 to the next hop downstream address (route node hub 001 in this example) along the route from route node 003 to gateway 251.

Bi-Directional Communication

In some existing connected device networks, sending a message "downstream" from an end device to a gateway is straightforward. All routes in a connected device network converge on the gateway and each route node need only know the address of the next node along the route. However, sending a message "upstream" from the server computing device or from a gateway computing device to a specific route node or to an end computing device is more difficult. Many existing network protocols solve this problem by having each device in the network keep a table that stores a route from itself to every other device on the network. However, this method requires a large amount of memory and constant maintenance to keep the routes current. This method also vastly increases the amount of network traffic as route maintenance messages must be continually sent through the network in order to update the route tables at each node.

In the adaptive route network and protocol in accordance with the present disclosure, each computing device along a route appends the previous hop's network address to downstream messages as they are passed along the route from an originating computing device (either an end computing device or a cluster host computing device) to the gateway for ultimate transmission to the server. Once a downstream network message has traveled from an originating computing device to the gateway, the appended network addresses record the route taken by the downstream message as it travels from an originating computing device through the adaptive route network to the gateway computing device. The server computing device maintains a route table which includes the appended route node addresses received with each downstream message. Since memory is plentiful on the server, the server can maintain a table of routes to each cluster host and end computing device based on the received downstream messages. This will allow the server to generate unsolicited messages that can be sent upstream from the server to any computing device (gateway, cluster host, or end device) on the network. If the gateway or server needs to send a reply back to either a cluster host computing device or to an end computing device, or transmit updates to settings or firmware to a cluster host or an end computing device, it may do so by including the appended device address(es) from the previously received message into any upstream message going back onto the network.

One advantage of the adaptive route network and protocol in accordance with the present disclosure, in which the previous route node network addresses are appended to a downstream message at each hop along a route from an end device to a gateway, is that each device or node in the network does not need to maintain large route tables in their own local memory that store routes from itself to every other device in the network, thus reducing memory requirements, simplifying their design and lowering cost. Another advantage is that it reduces or eliminates the network traffic required to keep route tables at each node up to date, as route addresses are sent within event messages themselves, rather than requiring separate route maintenance messages to be continually sent throughout the network.

In accordance with the present disclosure, to reduce the number of bytes in a message packet, each device within the adaptive route network, including cluster host (hub) computing devices and end computing devices, is assigned a 1-byte network address by the server computing device at the time the route node joins the adaptive route network. The 1-byte network address is unique to each gateway; thus, each gateway may have up to 255 devices included within its portion of the overall adaptive route network.

In the examples described herein, all route nodes are assigned a unique 4-byte address at the factory (see FIG. 3A). It shall be understood, however, that other address sizes could also be used, and that the disclosure is not limited in this respect. The unique 4-byte factory address includes a device type and a unique address. If the adaptive route network protocol allows for up to 10 hops from an end device to a gateway, for example, then up to 10 1-byte addresses may be appended to each message. If the 4-byte factory addresses were used, then up to 10 4-byte addresses would be appended to each message, for a total of 40 bytes consumed by appended route node addresses. Assignment of a 1-byte network address by the server computing device thus reduces the total number of message bytes consumed by route addresses from 40 bytes to 10.

An example 1-byte route node network address space is shown in Table 1.

TABLE 1

| Route node network address space | |
|---|---|
| Address | Description |
| 000 (000h) | Broadcast to all route nodes |
| 001 (010h) ... 100 (64h) | Available for assignment to route nodes |
| 101 (65h) ... 250 (FAh) | Unused |
| 251 (FBh) | Gateway address |
| 252 (FCh) | Reserved |

TABLE 1-continued

| Route node network address space | |
|---|---|
| Address | Description |
| 253 (FDh) | Reserved |
| 254 (FEh) | Reserved |
| 255 (FFh) | Device with no address assigned |

The server maintains a table of network addresses like the example shown in Table 2. Four (4) bytes will be allocated in memory for each network address. The first three (3) bytes will contain a device's 4-byte factory address minus the device type byte. In this example, as only hubs may become route nodes, the most significant byte (MSB) of the factory address, which is the device type ID, will always be the same (0x01 in this example). Therefore, there is no need to store the MSB in this example. The fourth byte will be used to determine if the hub assigned to the corresponding network address is active.

TABLE 2

| Example Network Address Table | | |
|---|---|---|
| Network Address | Hub Factory Address (hex) 3-bytes | No Heartbeat Count |
| 001 | 01 00 01 31 | 0 |
| 002 | 01 00 01 1A | 0 |
| 003 | 01 00 01 1D | 1 |
| 004 | 01 00 01 2C | 0 |
| 005 | 01 00 01 1F | 1 |
| 006 | 01 00 00 00 | 255 |
| 007 | 01 00 01 2A | 0 |
| 008 | 01 00 00 00 | 255 |
| ... | ... | ... |
| 100 | 01 00 00 00 | 255 |

When a join route message (JRM) transmitted by a hub/cluster host is received by the gateway, the server assigns a network address and the hub's 4-byte factory address and assigned network address is recorded in the network address table. Once the assigned network address is received from the server, the gateway then transmits a JRM reply back to the hub which contains the assigned network address. When the hub receives the JRM reply, it becomes a route node and the newly assigned network address will be stored in its memory. The route node will then answer to this address or its 4-byte factory address until a different address has been assigned by the gateway.

Address reassignment will only occur if a route node has a network address of 255 (default) or a route node with a duplicate network address was introduced into the network for that gateway. In the latter case, when a JRM is transmitted to the gateway, the server will look up the received network address in that gateway's network address table. If the route node's unique 4-byte factory address matches the factory address recorded in the table, i.e., the device was reintroduced into the network, the server will return the same network address to the route node in the JRM reply and the route node will keep its current network address. Conversely, if the route node's 4-byte factory address does not match the factory address recorded in the table, i.e., a second device was introduced into the network with a duplicate address, the server will assign the next network address available in the table, record the route node's factory address and transmit a JRM reply with the newly assigned network address. When the route node receives the JRM reply, it will update its network address to the newly assigned address.

In some examples, to verify that a route node is active, each active route node (e.g., cluster host and/or end computing device) may regularly transmit heartbeat messages at periodic (e.g., one (1) hour) intervals, if no event messages have been sent during that time. If an event message is sent, the heartbeat timer may be restarted to reduce network traffic with unnecessary heartbeat messages. Once every hour, the server will increment the No Heartbeat Count for each assigned network address in the network address table. Each time the server receives a heartbeat message (or event message) from a route node, it will clear the No Heartbeat Count for that route node's corresponding network address in the network address table. The No Heartbeat Count belonging to the assigned address of an inactive route node will increment to a maximum count (e.g., a count of 24 after 24 hours) of not receiving any heartbeat (or event) messages. When this occurs, the server will assume the route node is no longer active and will free the network address for assignment to a new route node by clearing the hub Factory Address and setting the No Heartbeat Count to 255 (FFh) in the network address table. An example of this is shown for example network address 006 of Table 2, where address 006 is now available for assignment.

Figure 26:
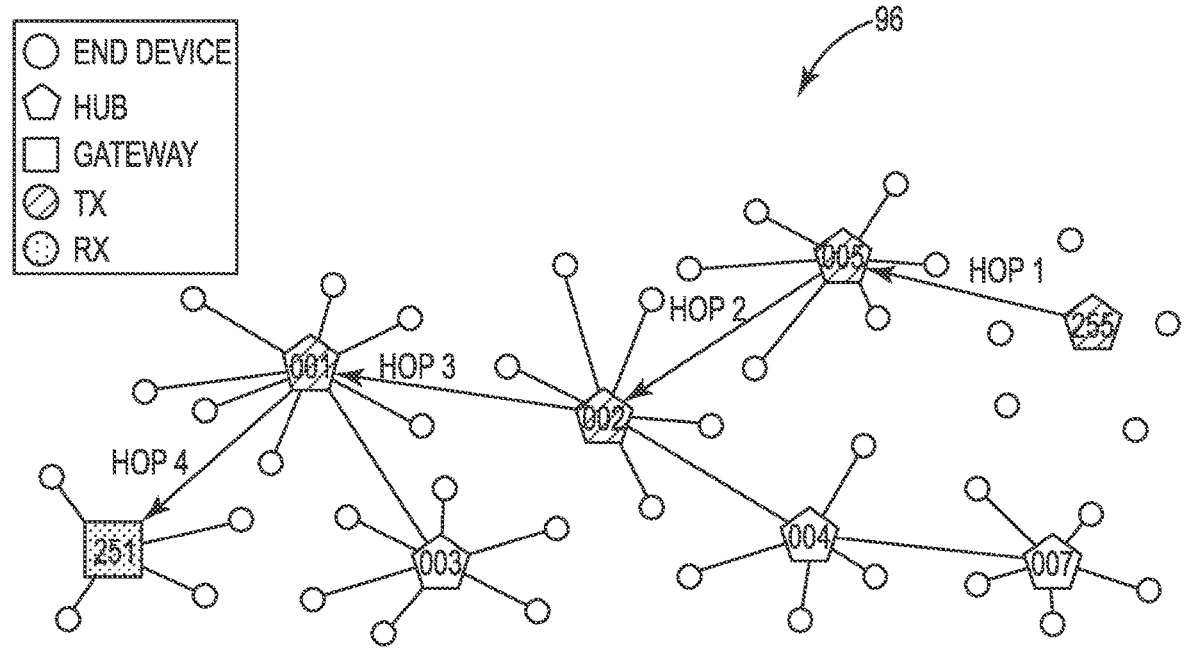
FIG. 26 shows another example adaptive route network.

FIG. 26 shows another example adaptive route network 96. When a hub computing device, such as hub 255, wants to join a route, it transmits a Join Route Message (JRM) to the route node it has selected during execution of the route node discovery process (see, e.g., FIG. 16B). The JRM is passed via the route to the gateway, gateway computing device 251 in this example. In FIG. 26, the JRM is transmitted from hub computing device 255 to route node 005. The JRM will be passed from one route node to the next along the route until it reaches the gateway, gateway 251 in the example of FIG. 26. A hop occurs each time a message is passed from one route node to another; i.e., the message is hopping from one route node to the next. In FIG. 26, there are four (4) hops from hub computing device 255 to the gateway 251.

In accordance with the present disclosure, all downstream messages in an adaptive route network, including join cluster messages, join route messages, and event messages include a record of the route taken to the gateway. This record is constructed by appending the network address (1-byte in the examples described herein) of the previous hop (source address) into the network message itself. Each node along the route appends the previous hop's network address onto the message before forwarding the message to the next hop in the route. In this way, when the message is received at the gateway, the message will include the network addresses for each node along the route from the end device to the gateway.

Figure 27:
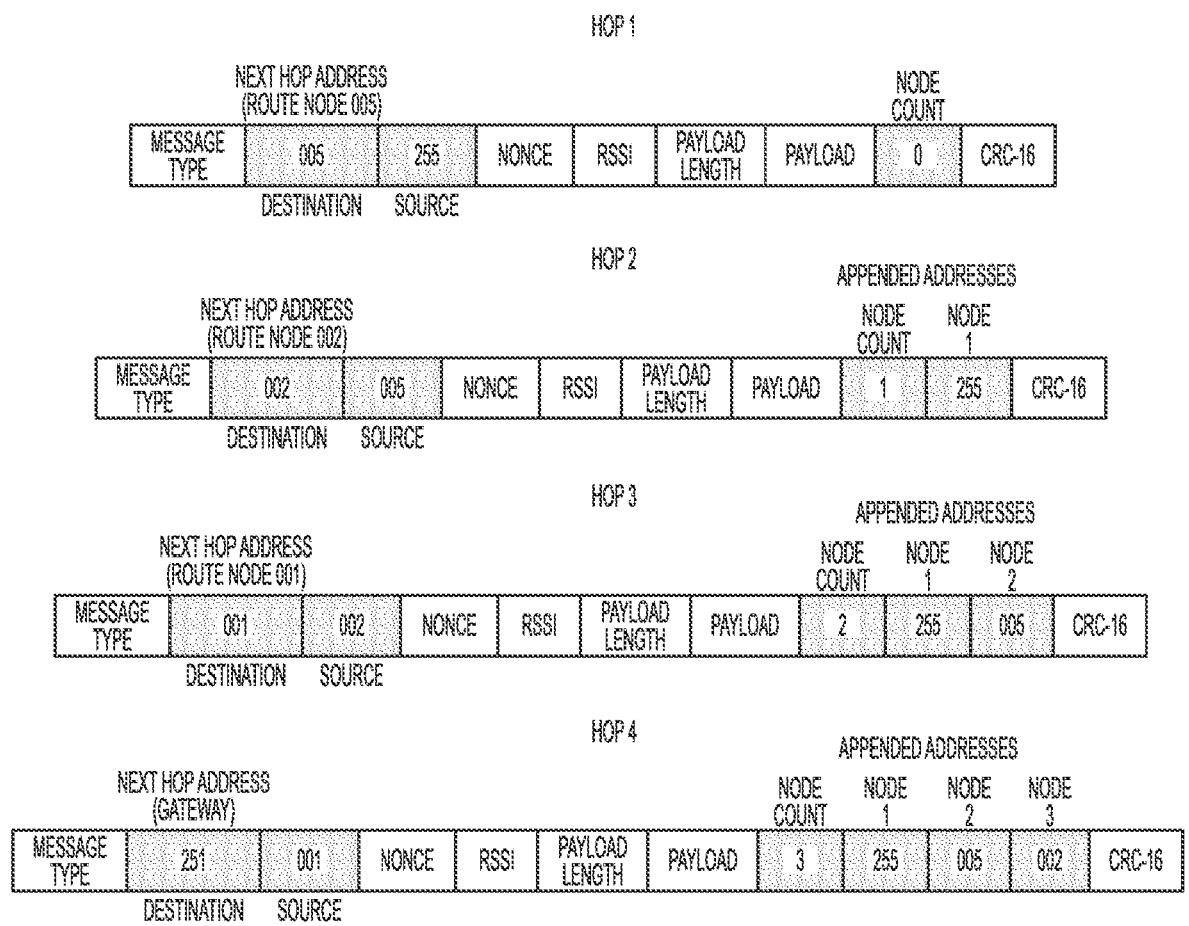
FIG. 27 shows example network messages at each hop along the route of FIG. 26.

FIG. 27 shows example network messages at each hop along the route shown in FIG. 26. The messages in FIG. 27 are in the network message format shown in FIG. 3C. Note the next hop address, node count and appended addresses for the message at each hop.

Each time a network message is received from an end computing device or a cluster host computing device, server computing device compares the route stored in the appended address field of the network message to the portion of the route table corresponding to that end device. If the route is different, that means that the route from that computing device to a gateway has changed since the last time the server received a message from the end device. The server then updates the route table corresponding to that computing device to reflect the new route.

Figure 28:
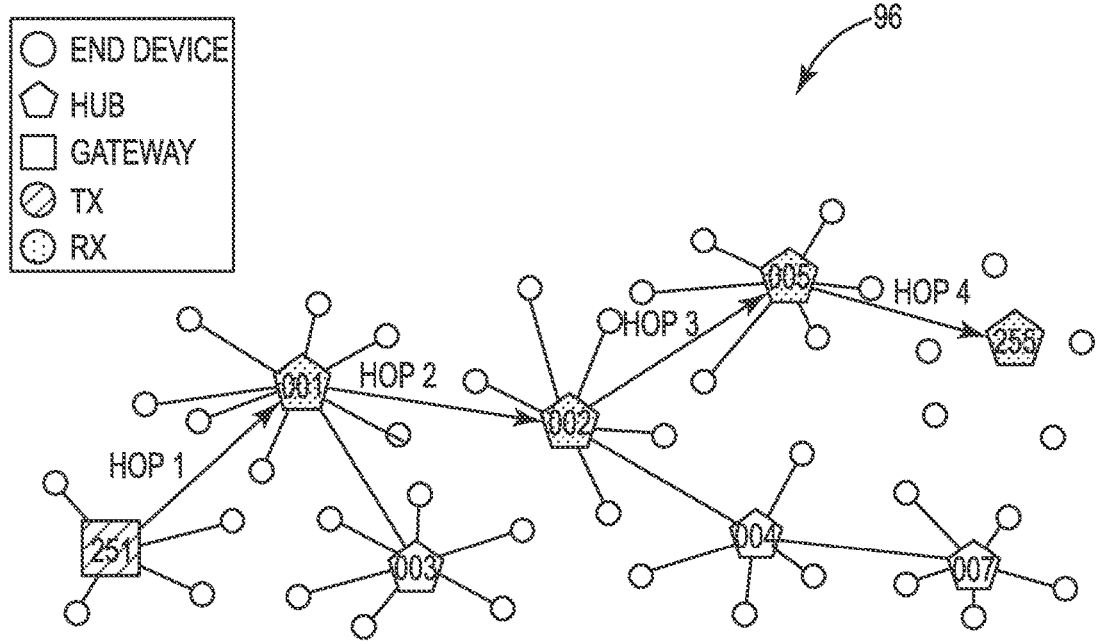
FIG. 28 shows the example adaptive route network of FIG. 26, in which the gateway or server is sending a reply message back to the message originator.

FIG. 28 shows the example adaptive route network 96 of FIG. 26, and in which the gateway or server is sending an upstream message back to the message originator (in this example, hub 255). As shown in FIG. 28, the gateway's JRM reply (or any other message requiring a reply from gateway 251 or server, or any message initiated by gateway 251 or server, such as updates to settings or firmware) will follow the same route back to the message originator that was initially taken from the originator to gateway 251.

Figure 30:
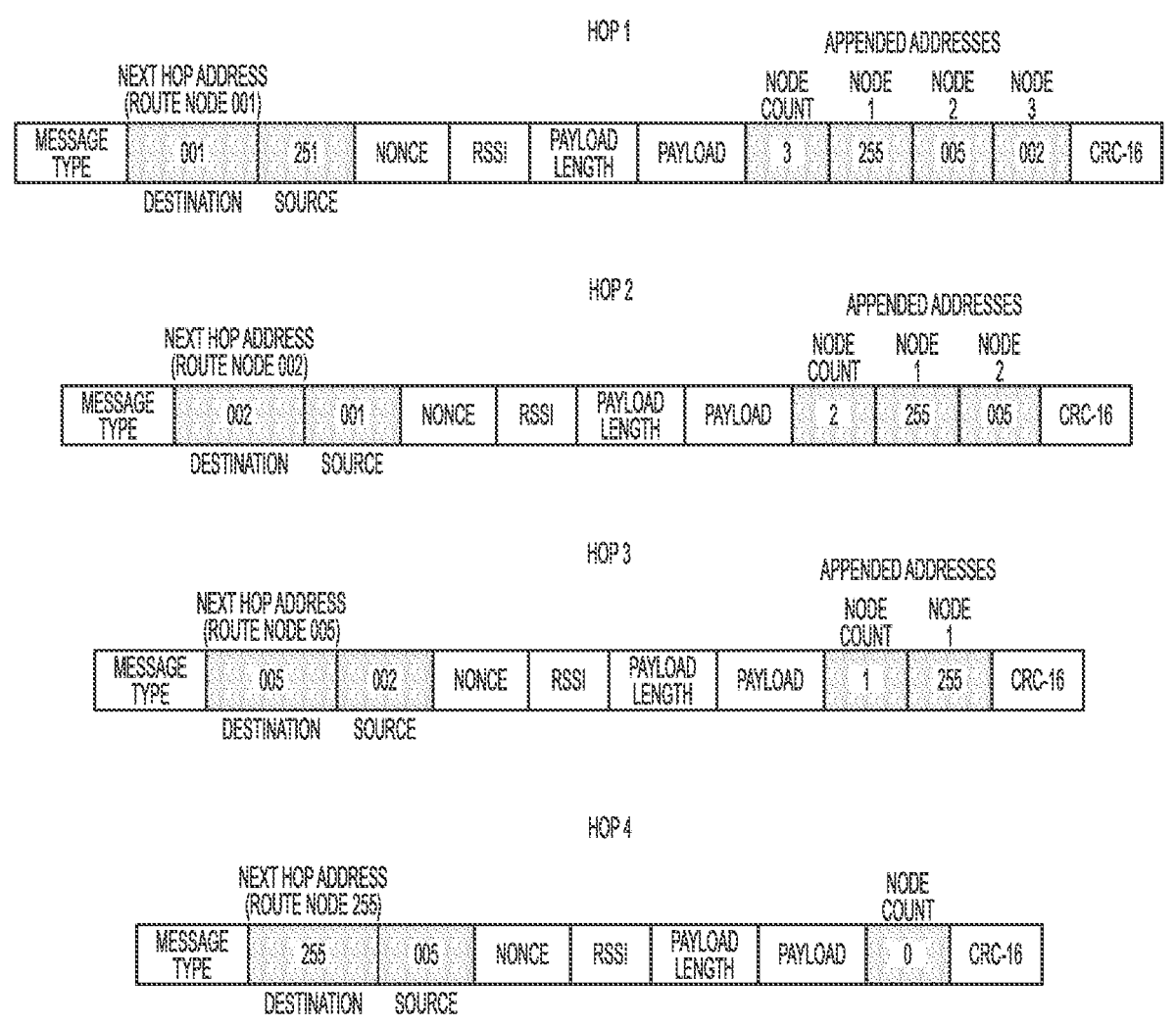

FIG. 30 shows example upstream network messages at each hop along the route shown in FIG. 28. Gateway 251 (or server) copies the appended route node addresses from the original message (as shown in FIG. 27) to the reply message. As the reply message travels along the route, each route node modifies the upstream message by removing the node address located at the end of the list of appended addresses, sets the removed node address as the destination address field of the upstream network message, sets the source address field to its own network address, and decrements the node count. By the time the reply message reaches the cluster host corresponding to the destination end computing device (route node 255), the node count is zero (0) and there will be no further appended addresses.

All downstream messages traveling along a route from a device (e.g., end device or cluster host) to the gateway (not just messages requiring a reply) will receive an appended route node address at each hop. The messages passed from the gateway to the server will retain the appended addresses. This will allow the server to see the route from the originating device and maintain a route table that is refreshed with each message received. When a hub joins a route and the server assigns it a 1-byte network address, the gateway will send a message to the server with both the hub's newly assigned network address and its 4-byte factory address. This allows the server to maintain a table to cross-reference between a route node's network and factory address when reporting status as only the factory address would be relevant to a user.

If the server needs to send an unsolicited message, such as updates to settings or firmware, to a route node or an end device, it will use its route table to construct the route within the message using the appended address structure. Only route node network addresses will be used for routing purposes in this example. The final destination end device's 4-byte factory address will be contained in the message payload and will be used by the device to verify that it is the intended recipient. This will apply to all final destination devices, both route nodes and end devices.

FIG. 29 shows the example adaptive route network 96 of FIGS. 26 and 28, in which a server computing device 98 is sending an unsolicited message to an end device with a factory address of 1E000905h. The unsolicited network message may include, for example, updates to settings or firmware for the end device. The unsolicited network message is constructed by the server, wrapped in a TCP/IP packet and sent to gateway 251. Once received, the gateway extracts the network message from the TCP/IP packet and transmits the message shown in FIG. 31 to the next hop upstream address specified in the message (hub 001 in this example).

For example, a portion of the route table stored by a server computing device corresponding to end device 1E000905h in the example of FIG. 29 may include the following:

| End Device Factory Addr | Node Count | Gateway | Route Node 1 | Route Node 2 | Route Node 3 |
|---|---|---|---|---|---|
| 1E 00 09 05 | 3 | 251 | 004 | 002 | 001 |

Figure 31:
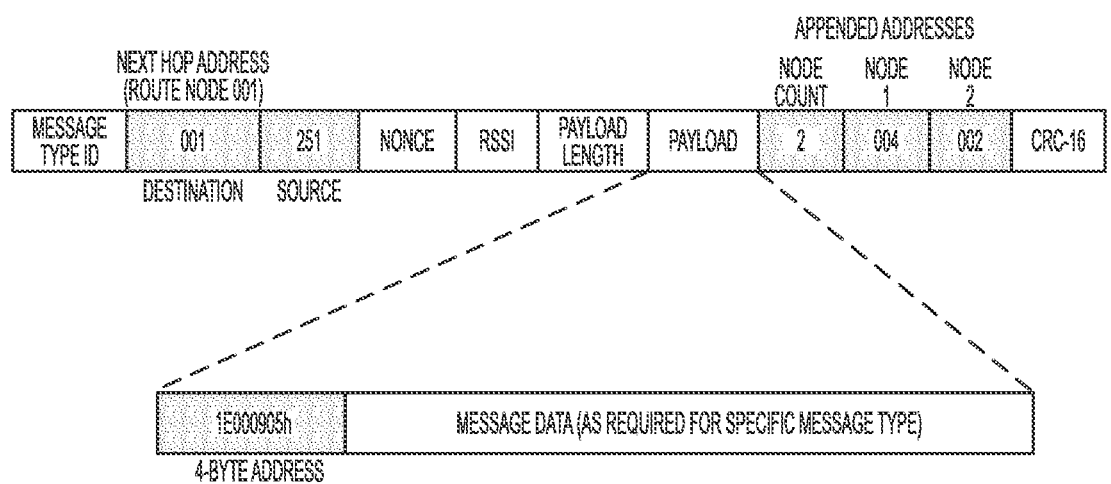
FIG. 31 shows an example network message, and the payload for that message, for the hop from the gateway to the first route node as shown in FIG. 29.

FIG. 31 shows the unsolicited upstream network message generated by server computing device and transmitted by gateway 251 to the first node along the route to end device 1E000905h, route node 001. The first four (4) bytes of the payload section contain the 4-byte factory address of the final destination device; i.e., the intended message recipient. This will be the case for any message originating from the server or gateway. The remaining payload bytes will contain data specific to the message type and will vary in length and content. In addition, the network message as received from the server includes the gateway network address as the Source address, the first upstream hop along the route as the Destination address (001) (in other words, the route node corresponding to the Node Count in the route table), the Node Count decremented by 1 (as compared to the Node Count in the route table), and the remaining nodes along the route (cluster hosts 002 and 004) as appended addresses in the Appended Address section of the network message.

When the message of FIG. 31 reaches route node 004, the message Node Count will be 0. This informs route node 004 that it is the last hop on the message's route; in other words, that the intended recipient is either itself or one of its cluster member end devices. The route node will then check the first four (4) bytes of the message payload to see if the message is addressed to it or to an end computing device. In this example, the message is for an end computing device (end computing device 1E000905h in this example) to which route node 004 then delivers the message.

In some examples, a route node cannot transmit an unsolicited message to an end computing device until that end device first transmits a message to the route node which is also the end device's cluster host. This is because, in some examples in order to save battery power, an end computing device's wireless receiver is only briefly enabled while waiting to receive a reply to a previously transmitted message. Therefore, the cluster host must hold the message until it receives a message from the intended recipient in order to help ensure that the end computing device can receive the message.

For example, when a message of any type (heartbeat, CHDM or end device event) is eventually received by the cluster host from the intended recipient of a pending end device message, the cluster host may reply with an ACK. The cluster host may set a status bit within the ACK message to indicate to the end device that there is a pending message waiting for delivery. Upon receiving the ACK, the end device may respond by transmitting a Deliver Pending Message Message (DPMM). The cluster host may then transmit the pending message to the intended recipient. Once received, the end device may reply with an ACK.

In FIG. 17 for example, cluster host 004 will not transmit the unsolicited message to end device 1E000905 until it receives a message from that device to ensure that end device 1E000905 is actively listening for messages. When a message is received by cluster host 004, cluster host may reply with ACK having the status bit set, indicating that there is a pending message waiting for delivery. Upon receiving the ACK, end device 1E000905 may respond by transmitting a DPMM, and cluster host 004 may then transmit the pending message to end device 1E000905.

Upon receipt of the message, end device (device 1E000905h in this example) may send an ACK back to the cluster host (cluster host 004 in this example). If an ACK is received by the cluster host, it may transmit a Pending Message Status Message (PMSM) back to the gateway (gateway 251 in this example) which will then send it on to the server. The PMSM will contain the message recipient's 4-byte factory address, the original message's nonce (message ID) and a status byte set to indicate that the message was received by the intended recipient (end device 1E000905h in this example). The PMSM provides feedback to the server indicating that the message was or was not delivered successfully to the intended recipient.

In some examples, the cluster host will only hold one (1) downstream message for each of its cluster member end devices at a time. In such examples, the server/gateway will buffer multiple messages and only send a new one once receiving confirmation that the previous message has been delivered. This may help to reduce memory requirements of cluster host/hub devices, simplifying the design and reducing costs. This communication protocol allows the adaptive route network of the present disclosure to efficiently deliver high volumes of messages downstream from the end devices to the gateway.

Figure 32:
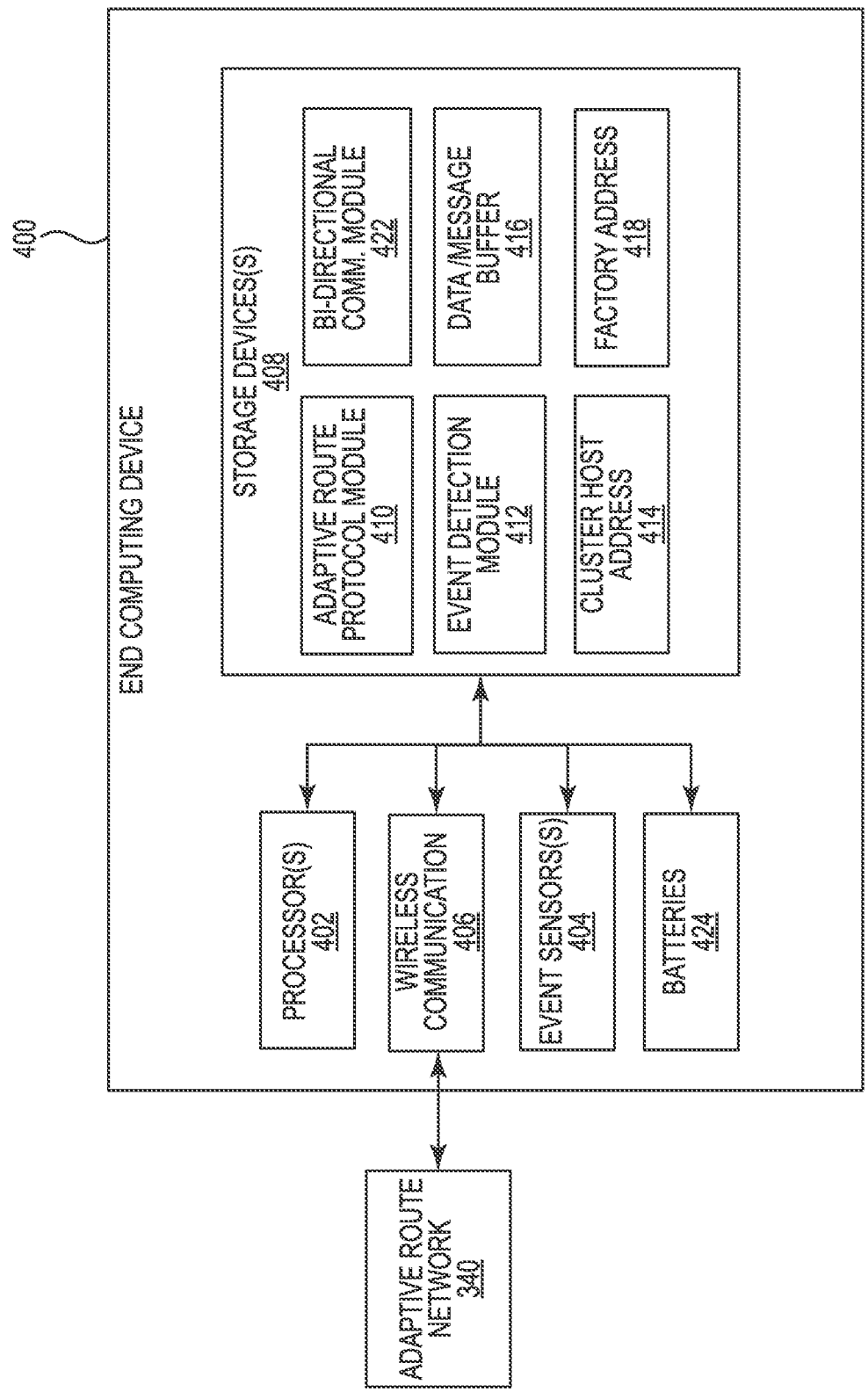
FIG. 32 is a block diagram of an example end computing device in accordance with the present disclosure.

FIG. 32 is a block diagram of an example end computing device 400 in accordance with the adaptive route network and protocol of the present disclosure. FIG. 32 illustrates only one example of end computing device 400, and many other examples of end computing device 400 may be used in other instances. End computing device 400 may include a subset of the components included in FIG. 32 or may include additional components not shown in FIG. 32.

End computing device 400 includes one or more processor(s) 402, a wireless communication unit 406, one or more event sensor(s) 404, and one or more storage device(s) 408. Storage device(s) 408 includes an adaptive route protocol module 410, a bi-directional communication module 422, an event detection module 12, a cluster host address 414, a factory address 418, and data storage/message buffer 416.

One or more wireless communication units 406 of end computing device 400 are configured to permit bi-directional wireless communication with one or more cluster host computing devices. Examples of communication units 406 include any device or technology capable of sending and receiving wireless communications. Such devices may include optical transceivers, radio frequency (RF) transceivers, infrared (IR) transceivers, satellite communication, cellular communication, etc.

One or more processors 402 may implement functionality and/or execute instructions associated with end computing device 400. Examples of processors 402 include application processors, microcontrollers, and any other hardware configured to function as a processor, a processing unit, controller, or a processing device.

For example, processors 402 may execute adaptive route protocol module 410 to execute a cluster host discovery process such as that shown and described herein with respect to FIGS. 4A and 4B. Processors 402 may further execute bi-directional communication protocol module 422 to transmit downstream message from the end computing device 408 to a gateway and/or to receive upstream messages transmitted from a gateway or server to end device 408. Processors 402 may further execute event detection module 412 to detect events and perform any corresponding analysis or communication regarding such detected events, depending upon the requirements of the application in which the end devices are being implemented.

Adaptive route protocol module 410, event detection module 412, and bi-directional communication module 422, as well as other functional modules not shown in FIG. 32, may be operable by processors 402 to perform various actions, operations, or functions of end computing device 400. For example, processors 402 of end computing device 400 may retrieve and execute instructions stored by storage components 408 that cause processors 402 to perform or execute the operations stored in modules 410, 412 and/or 422. The instructions, when executed by processors 402, may cause end computing device 400 to generate and/or store information within storage components 408, such as data storage/message buffer 416.

In some examples, storage device(s) 408 may include a temporary memory, meaning that a primary purpose of such as portion of storage device(s) 408 is not long-term storage. Storage device(s) 408 on end computing device 400 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device(s) 408, in some examples, may also include one or more computer-readable storage media. Storage device(s) 408 in some examples include one or more non-transitory computer-readable storage mediums. Storage device(s) 408 may be configured to store larger amounts of information than typically stored by volatile memory. Storage device(s) 408 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage device(s) 408 may store program instructions and/or information (e.g., data) associated modules 410, 412 and/or 422. Storage device(s) may include a memory configured to store data or other information associated with modules 410, 412, and 422, such as data storage/message buffer 416.

Storage device(s) 408 further include storage of a current cluster host network address 414 and factory address 418 assigned to end computing device 400 at the time of manufacture.

Event sensor(s) 404 may include any type of sensor(s), and the type of sensor(s) may depend at least in part upon the particular application in which the adaptive route network is to be deployed, and the type of event(s) which are to be detected. For example, sensor(s) 404 may include one or more sensors applicable in smart home, healthcare, artificial intelligence, transportation, government, automotive, commercial and/or industrial applications, among others. Event detection module 412 may include functionality that when executed by processor(s) 402, cause end computing device 400 to sense or detect one or more events, and/or perform any corresponding analysis or communication regarding such detected events, depending upon the requirements of the application in which the end devices are being implemented.

Transmission of certain types of messages by end computing device 400 are event triggered. For example, upon detection of an event by one of sensor(s) 404, processor(s) 402 may execute event detection module 412 to analyze the detected event data received from sensors 404, generate any corresponding data associated with the event (such as date and time stamps, etc.), and generate and transmit an event message including the event data and any corresponding data (all of which may be referred to herein simply as, "event data"). End computing devices 400 may include a message buffer 416 to buffer messages in the event they cannot be transmitted at the time of the event, or in those applications where events are transmitted on a batch basis, etc. In some examples, event detection module 412 may further include instructions that allow end computing device 400 to communicate with and/or analyze data received from other computing devices, such as electronic user identification badges, or with any other end devices computing devices (whether of the same type or a different type).

In a hand hygiene compliance network, for example, the system may include a plurality of compliance badges for monitoring of an individual user's hand hygiene practices. In some examples, each of a plurality of compliance badges is uniquely assigned to one of a plurality of users whose hand hygiene practices are to be monitored. The hand hygiene compliance system may further include dispenser module end computing devices, each of which detects dispense events at a hand hygiene product dispenser and communicates with compliance badges to associate each dispense event with a particular user. The system may further include zone module end computing devices, each of which generates a "zone" around an area to be monitored, and detects entry and/or exit events of compliance badges to/from the zone, such as a zone around a patient bed or other area to be monitored. To analyze compliance with hand hygiene procedures, the system includes one or more sets of compliance rules that define compliant and non-compliant hand hygiene practices. Upon sensing of a zone entry/exit event and/or dispense event, the sensing end device obtains badge identification information from the compliance badge associated with the zone entry/exit event and/or dispense event. The dispense event data and/or the zone entry/exit event data is transmitted from the end device(s) to the server, which analyzes the data in accordance with the compliance rules. In this way, individual compliance/non-compliance with hand hygiene procedures may be monitored and analyzed.

In accordance with the bi-directional communication protocols described herein, the event message will include the factory address 418 of end computing device 400. In some examples, the event message is transmitted to the current cluster host address 414 at the time of the occurrence of the event. Sending the event messages at the time of the event permits the server computing device to analyze the data and/or make decisions regarding the event in real time or near real time. This also helps to reduce memory requirements of each end computing device 400, as less memory is required to buffer or store large amounts of event data, thus increasing simplicity of design, reducing memory requirements, and reducing costs.

Figure 33:
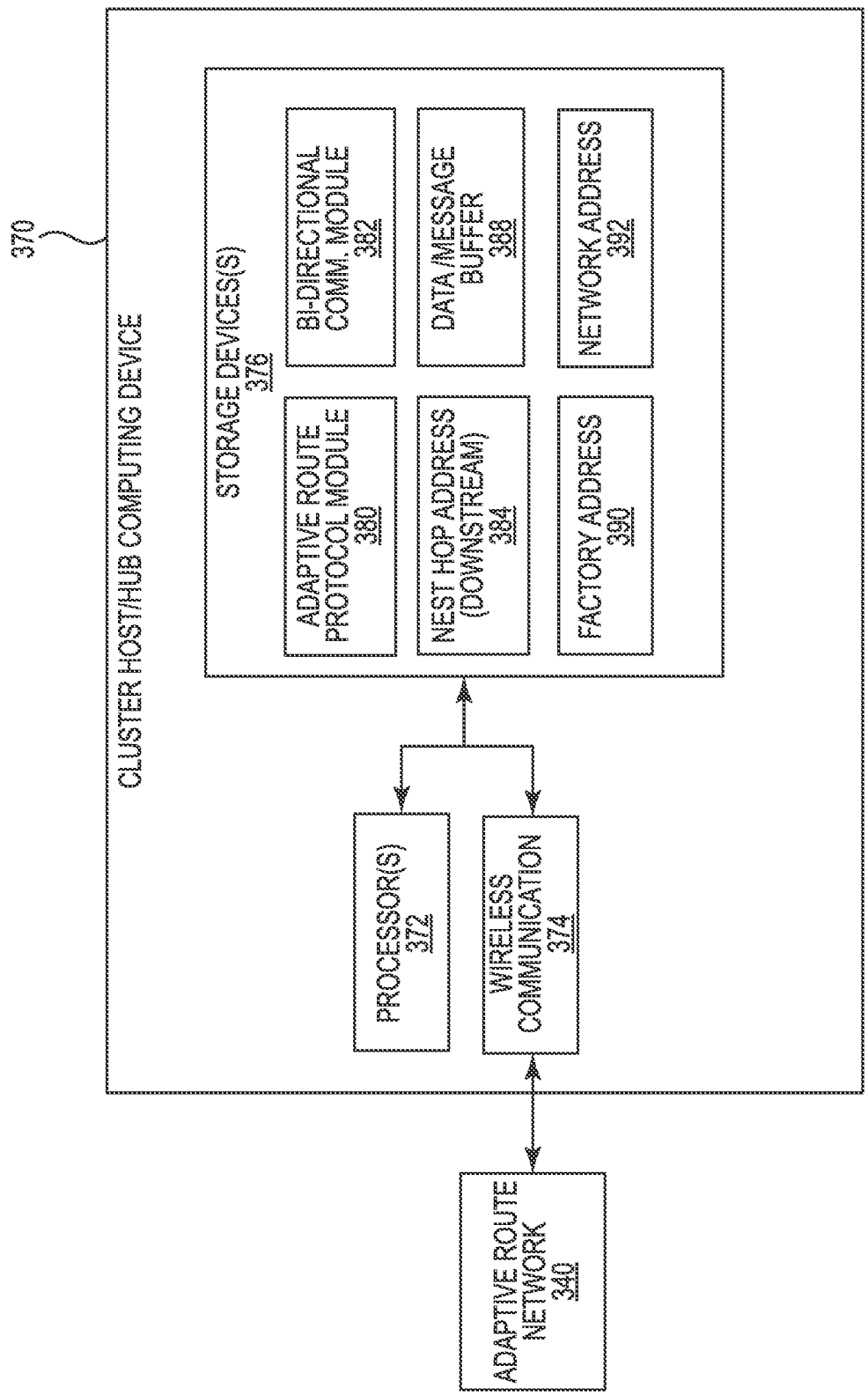
FIG. 33 is a block diagram of an example cluster host (or hub) computing device in accordance with the present disclosure.

FIG. 33 is a block diagram of an example cluster host (or hub) computing device 370 in accordance with the adaptive route network and protocol of the present disclosure. FIG. 33 illustrates only one example of cluster host computing device 370, and many other examples of cluster host computing device 370 may be used in other instances. Cluster host computing device 370 may include a subset of the components included in FIG. 33 or may include additional components not shown in FIG. 33.

Cluster host computing device 370 includes one or more processor(s) 372, a wireless communication unit 374, and one or more storage device(s) 376. Storage device(s) 376 includes an adaptive route protocol module 380, a bi-directional communication module 382, a next hop (downstream) address 384, a factory address 390, a network address 392, and data storage/message buffer 388. Cluster host computing device 370 does not need to store the next hop upstream address, as upstream communication is directed from the next hop addresses stored in the upstream message itself as described herein within respect to the bi-directional communication protocol. Cluster host computing device 370 further does not maintain or store a list of its cluster members, as the server maintains a route table that associates each end device factory address with a particular cluster host computing device within the network. All of this serves to reduce memory requirements and simplify the design of the cluster host computing devices 370.

One or more wireless communication units 374 of cluster host computing device 370 are configured to provide bi-directional wireless communication with other cluster host computing devices, a gateway, and/or one or more end computing devices associated with its cluster. Examples of communication units 374 include any device or technology capable of sending and receiving wireless communications. Such devices may include optical transceivers, radio frequency (RF) transceivers, infrared (IR) transceivers, and devices for satellite communication, cellular communication, etc.

One or more processors 372 may implement functionality and/or execute instructions associated with cluster hub computing device 400. Examples of processors 372 include application processors, microcontrollers, and any other hardware configured to function as a processor, a processing unit, controller, or a processing device.

For example, processors 372 may execute adaptive route protocol module 380 to execute a join route discovery process such as that shown and described herein with respect to FIGS. 16A and 16B. Processors 372 may further execute bi-directional communication protocol module 382 to receive and/or transmit downstream messages along a route from an end device to a gateway computing device, and to receive and/or transmit upstream messages along a route from a gateway computing device to an end device).

In some examples, storage device(s) 376 may include a temporary memory, meaning that a primary purpose of such as portion of storage device(s) 376 is not long-term storage. Storage device(s) 376 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device(s) 376, in some examples, may also include one or more computer-readable storage media. Storage device(s) 376 in some examples include one or more non-transitory computer-readable storage mediums. Storage device(s) 376 may be configured to store larger amounts of information than typically stored by volatile memory. Storage device(s) 376 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage device(s) 376 may store program instructions and/or information (e.g., data) associated with modules 380 and 382. Storage device(s) 276 may include a memory configured to store data, buffer upstream and/or downstream messages, or store any other information associated with modules 380, 382, such as data/message buffer 388.

Storage device(s) 376 further include storage of a factory address 390 assigned to cluster host computing device 370 at the time of manufacture, and a network address 392 assigned to it by the server upon joining a route in an adaptive route network. Storage device(s) 376 further stores a next hop address (downstream) 384 that is used during execution of bi-directional communication module 376 to generate and/or transmit downstream messages.

Data/message buffer 388 may further include a message buffer that stores one or more upstream messages in the event that cluster host computing device 370 is not able to immediately transmit upstream messages intended for an end device belonging to its cluster or intended for another cluster host computing device upstream from the current cluster host computing device. Cluster host computing device 370 determines whether an upstream message is intended for an associated end device by checking the Node Count byte in the network message. If the Node Count byte is equal to zero, that means the current cluster host computing device 370 is the last hop in the route before the end device. Cluster host computing device 370 then checks the payload of the upstream message for the factory address of the end device. As discussed herein, to save battery life in the end devices, a cluster host computing device cannot transmit an unsolicited message to an end computing device until that end device first transmits a message to the cluster host. This is because, in some examples in order to save battery power, an end computing device's wireless receiver is only briefly enabled while waiting to receive a reply to a previously transmitted message. Therefore, the cluster host must hold the unsolicited upstream message in the message buffer 388 until it receives a message from the intended recipient in order to help ensure that the end computing device can receive the message. The cluster host responds with an ACK having a status bit set indicating that there is a pending message waiting for delivery. Upon receiving the ACK, the end computing device may respond by transmitting a Deliver Pending Message Message (DPMM), and cluster host may then transmit the pending message to the end computing device 1E000905.

Cluster host computing device 370 generates and transmits downstream messages (that is, messages initiated by an end computing device for transmission along a route to an associated gateway) by execution of bi-directional communication module 382. For example, upon receipt of an event message from an end computing device via wireless communication unit 374, processor(s) 372 may execute bi-directional communication module to generate and transmit the received messages to the next hop along the associated route. In accordance with the bi-directional communication protocols described herein, processor(s) 372 will append its own network address 392 to the appended address portion of the received message and transmit the new message to the next hop address 382 as stored in its memory 276. Processor(s) 372 will also increment the node count portion of the message by one (1) to indicate the number of hops from cluster host computing device 370 to the next downstream cluster host (or gateway if there are no intervening cluster hosts). This process repeated by each cluster host computing device along the route until the message is received by the gateway computing device associated with the route.

Figure 34:
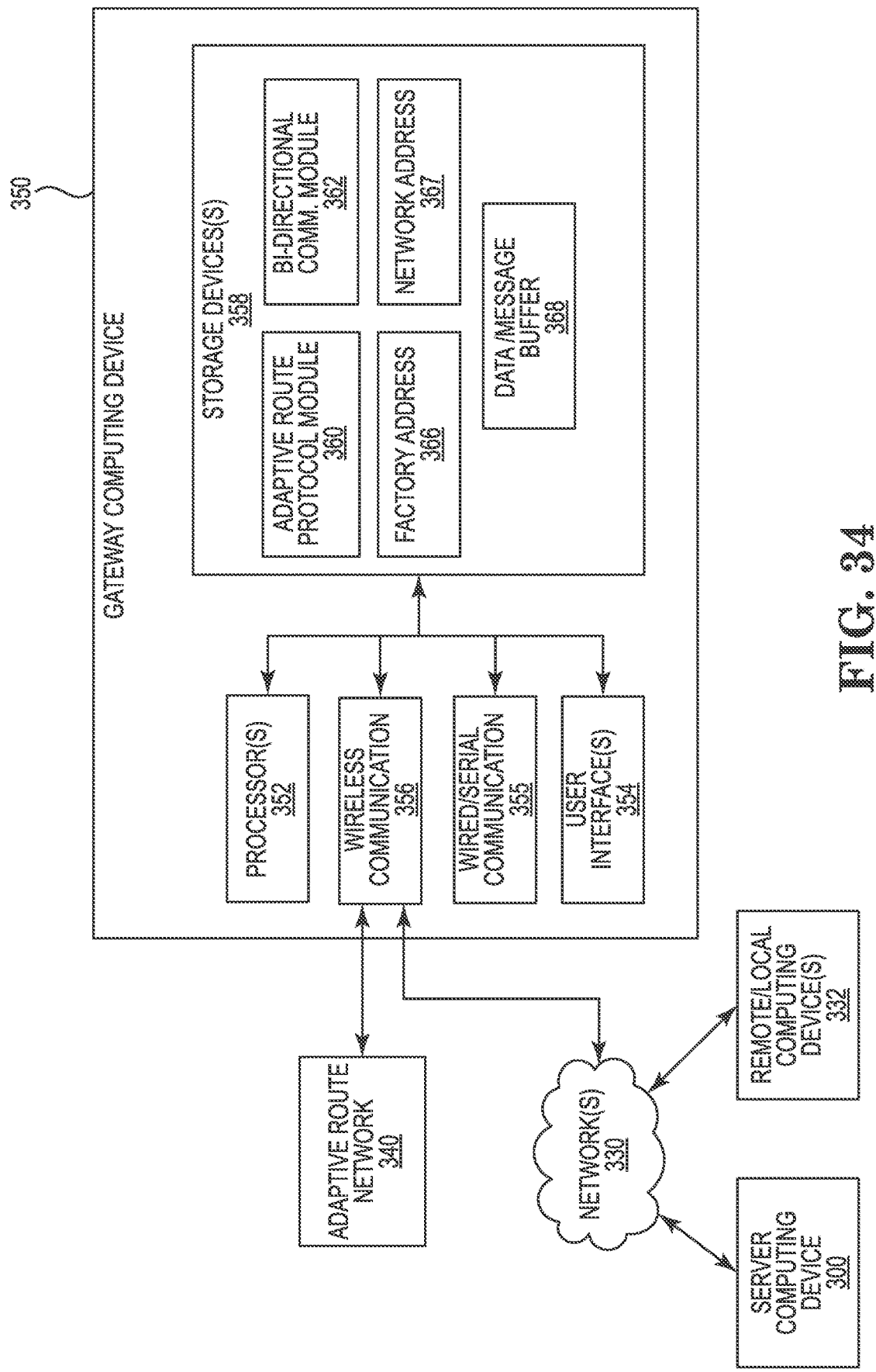
FIG. 34 is a block diagram of an example gateway computing device in accordance with the present disclosure.

FIG. 34 is a block diagram of an example gateway computing device 350 in accordance with the adaptive route network and protocol of the present disclosure. FIG. 34 illustrates only one example of gateway computing device 350, and many other examples of gateway computing device 350 may be used in other instances. Gateway computing device 350 may include a subset of the components included in FIG. 34 or may include additional components not shown in FIG. 34.

Gateway computing device 350 includes one or more processor(s) 352, one or more wireless communication unit(s) 356, one or more wired/serial communication unit(s) 355, and one or more storage device(s) 358. Storage device(s) 358 includes an adaptive route protocol module 360, a bi-directional communication module 362, a factory address 366, a network address 367, and data storage/message buffer 368. In some examples, the downstream portion of the message buffer 368 may be quite large, such as 1M bytes, for example. Since the gateway computing device communicates with the server computing device(s) over a serial connection, much larger messages may be from the gateway to the server than those that are transmitted on the adaptive route network.

Gateway computing device 350 is configured for wireless communication with one or more devices in an adaptive route network 340. Gateway computing device 350 is further configured to wirelessly communicate with one or more server computing device(s) 300 and/or one or more local/remote computing device(s) 332 via other network(s) 330. Gateway computing device 350 is configured for wired and/or wireless communication with any of one or more server computing device(s) 300 and/or one or more local/remote computing device(s) 332 via network(s) 330. Network(s) 330 may include, for example, one or more of a dial-up connection, a local area network (LAN), a wide area network (WAN), the internet, a wireless or Wi-Fi network, a cell phone network, satellite communication, or other means of electronic communication. The communication within network(s) 330 may be wired or wireless. Remote/local computing device(s) 332 may include, for example, one or more of a server computing device, a desktop computing device, a laptop computing device, a tablet computing device, a mobile computing device (such as a smart phone) a personal digital assistant, a pager, or any other type of computing device.

Wireless communication units 356 of gateway computing device 350 may wirelessly communicate with cluster host computing devices that form a part of an associated route in adaptive route network 340. Wireless communication units 356 of gateway computing device 350 may also wirelessly communicate one or more of server computing device 300 and/or remote/local computing device(s) 332 via networks 330. Examples of wireless communication unit(s) 356 include any device or technology capable of sending and receiving wired or wireless communications. Such wireless devices may include optical transceivers, radio frequency (RF) transceivers, infrared (IR) transceivers, and devices for satellite communication, or cellular communication. One or more wired/serial communication unit(s) 355 of gateway computing device 350 may communicate with server computing device(s) 300 and/or local/remote computing device(s) 332 using, for example RS-485, Ethernet, or other communication interfaces or connections to the network 330.

Server computing device(s) 300 are configured to maintain route information defining routes to/from the gateways to the end computing devices in any associated adaptive route network(s), generate and transmit updates to settings or firmware to the gateways, cluster hosts, and/or end computing devices in the adaptive route networks, analyze the event data received from sensors in the adaptive route network(s), generate reports concerning the event data received from the sensors in the adaptive route network(s), etc.

One or more processors 352 may implement functionality and/or execute instructions associated with gateway computing device 350. Examples of processors 352 include application processors, microcontrollers, and any other hardware configured to function as a processor, a processing unit, controller, or a processing device.

For example, processors 352 may execute adaptive route protocol module 360 to execute the gateway side of a cluster host discovery process such as that shown and described herein with respect to FIGS. 4A and 4B, or execute the gateway side of a join route discovery process such as that shown and described herein with respect to FIGS. 16A and 16B. Processors 352 may further execute bi-directional communication protocol module 362 to receive downstream messages (from an end device to a gateway) and/or to send upstream messages (from a gateway to an end device or other device in the adaptive route network).

In some examples, storage device(s) 358 may include a temporary memory, meaning that a primary purpose of such as portion of storage device(s) 358 is not long-term storage. Storage device(s) 358 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device(s) 358, in some examples, may also include one or more computer-readable storage media. Storage device(s) 358 in some examples include one or more non-transitory computer-readable storage mediums. Storage device(s) 358 may be configured to store larger amounts of information than typically stored by volatile memory. Storage device(s) 358 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage device(s) 358 may store program instructions and/or information (e.g., data) associated with modules 360 and 362. Storage device(s) 358 may include a memory configured to store data or other information associated with modules 360 and 362, such as data 374.

Storage device(s) 358 further include storage for the gateway network address itself 367 and a factory address 366 assigned to gateway computing device 350 at the time of manufacture.

Gateway computing device 350 receives downstream messages from the adaptive route network (that is, messages originating from an end computing device or a cluster host computing device) and transmits them to server 300 by execution of bi-directional communication module 362. For example, upon receipt of an event message from a cluster hub computing device 370 via wireless communication unit 356, processor(s) 352 may execute bi-directional communication module 362 to transmit the received event messages to the server 300 via network(s) 330. As another example, if server 300 or gateway 350 needs to send an unsolicited upstream message to one or more devices on adaptive route network 340 (such as updates to settings or firmware), processor(s) 352 may execute bi-directional communication module 362 to transmit the unsolicited upstream message(s) to the appropriate destination device (e.g., cluster host or end computing device).

Figure 35:
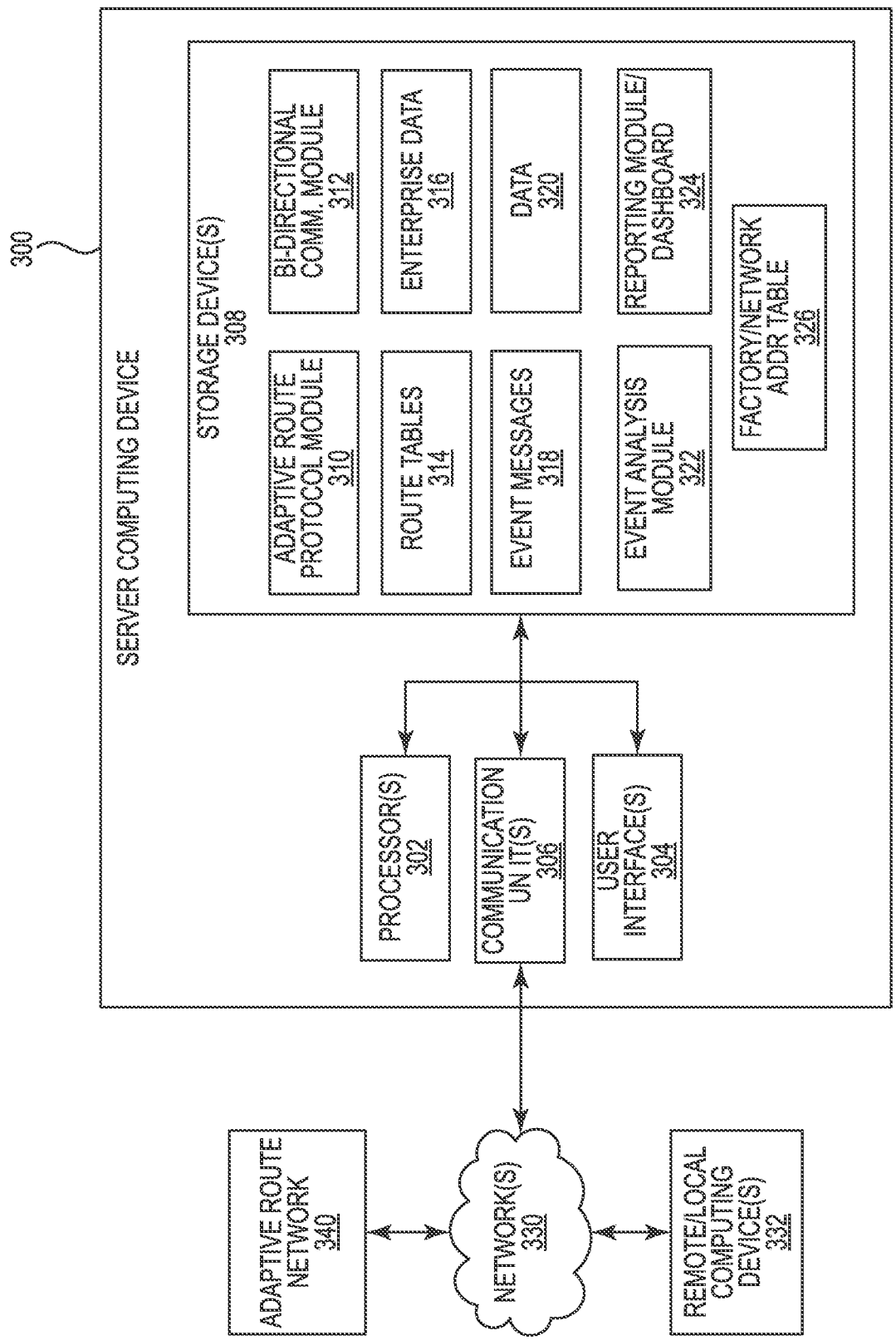
FIG. 35 is a block diagram of an example server computing device in accordance with the present disclosure.

FIG. 35 is a block diagram of an example server computing device 300 in accordance with the adaptive route network and protocol of the present disclosure. FIG. 35 illustrates only one example of server computing device 300, and many other examples of server computing device 300 may be used in other instances. Server computing device 350 may include a subset of the components included in FIG. 35 or may include additional components not shown in FIG. 35.

Server computing device 300 includes one or more processor(s) 302, one or more communication unit(s) 306, one or more user interface(s) 304, and one or more storage device(s) 308. Storage device(s) 308 includes an adaptive route protocol module 310, a bi-directional communication module 312, route tables 314, factory/network address table 326, enterprise data 316, event messages 318, data 320, event analysis module 322 and reporting module/dashboard 324.

Server computing device 300 is configured to communicate with one or more gateway computing devices in an adaptive route network 340. Server computing device 300 is further configured to communicate with one or more other remote or local computing device(s) 300 via network(s) 330. Network(s) 330 may include, for example, one or more of a dial-up connection, a local area network (LAN), a wide area network (WAN), the internet, a wireless or Wi-Fi network, a cell phone network, satellite communication, or other means of electronic communication. The communication within network(s) 330 may be wired or wireless. To that end, communication unit(s) 306 may include one or more wired and/or wireless communication unit(s). Remote/local computing device(s) 332 may include, for example, one or more of a server computing device, a desktop computing device, a laptop computing device, a tablet computing device, a mobile computing device (such as a smart phone) a personal digital assistant, a pager, or any other type of computing device.

Server computing device(s) 300 is configured to maintain route information (e.g., route tables 314) defining routes to/from the gateways to each of the end computing devices in one or more associated adaptive route network(s) 340. Server computing device(s) 300 also maintain factory/network address table 326 that stores the factory address and the associated assigned network address for each cluster host and end computing device in an adaptive route network. Server computing device(s) 300 may also generate and transmit upstream messages including updates to settings or firmware to the gateways, cluster hosts, and/or end computing devices in the adaptive route networks 340.

Server computing device(s) 300 may further, upon execution of the event analysis module 322 by processor(s) 302, analyze event data received from end computing devices in the adaptive route network(s) 340, and generate reports concerning the event data received from the sensors in the adaptive route network(s), etc.

One or more processors 302 may implement functionality and/or execute instructions associated with server computing device 300. Examples of processors 302 include application processors, microcontrollers, and any other hardware configured to function as a processor, a processing unit, controller, or a processing device.

For example, processors 302 may execute adaptive route protocol module 310 to execute the server side of a cluster host discovery process or a join route discovery process, and to store the relevant factory and network addresses of any end device joining a cluster or cluster hub joining a route in route tables 314. Processors 302 may further execute bi-directional communication protocol module 362 to receive downstream event messages (e.g., messages originating at an end device and transmitted to a gateway and then to the server) and/or to generate and transmit upstream reply messages or unsolicited upstream network maintenance messages from the server to an end device.

In some examples, storage device(s) 308 may include a temporary memory, meaning that a primary purpose of such as portion of storage device(s) 308 is not long-term storage. Storage device(s) 308 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device(s) 308, in some examples, may also include one or more computer-readable storage media. Storage device(s) 308 in some examples include one or more non-transitory computer-readable storage mediums. Storage device(s) 308 may be configured to store larger amounts of information than typically stored by volatile memory. Storage device(s) 308 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage device(s) 308 may store program instructions and/or information (e.g., data) associated with modules 310, 312, 322, and/or 324. Storage device(s) 308 may include a memory configured to store data or other information associated with modules 310, 312, 322, and/or 324, such as data 320.

Enterprise data 316 may include data that uniquely identifies or is associated with the respective facility or enterprise with which the adaptive route network(s) 340 are associated. As such, enterprise data 316 may include, for example, enterprise identification information, employee information, management information, accounting information, business information, pricing information, information concerning those persons or entities authorized to access the reports generated by server computing device(s) 300, location information, and any other enterprise-specific information. In addition, enterprise data 316 may further include data corresponding to more than one unique enterprise, in the event that server computing device(s) 300 provides data analysis and reporting services to one or more enterprises implementing the adaptive route network(s) 340.

Event analysis module 322 includes instructions that, when executed by processor(s) 302, cause processor(s) 302 to analyze event data received from end computing device(s). For example, if the adaptive route network 340 is used in a hand hygiene compliance system, event analysis module 322 may cause processor(s) to monitor and analyze hand hygiene compliance at a hospital or other healthcare facility. In such an example, reporting module 324 may include instructions that, when executed by processor(s) 302, cause processors to generate one or more reports concerning hand hygiene compliance at a hospital or other healthcare facility. Reporting module/dashboard 324 may further generate and cause to be presented on any one or more of local/remote computing device(s) 332 a user interface or dashboard that allows a user to enter commands, generate and view reports, perform event analysis, and otherwise interact with the data obtained from or transmitted to the computing devices on the adaptive route network, the enterprise data, information or data entered by a user, and/or any other data or information associated with the adaptive route network or the environment in which it is implemented.

For example, server computer 300 may analyze the hand hygiene event data to monitor hand hygiene compliance by individual healthcare worker, type of healthcare worker (e.g., nurses, doctors, environmental services (EVS), etc.), individual departments, type of department, individual hospital, type of hospital, across multiple hospitals, over one or more specified timeframes, or by various other selected parameters. Server computer 300 may generate a variety of reports and transmit those report(s) to one or more remote or local computing device(s) 332 to provide users local to each hospital or remote users with both qualitative and quantitative data regarding hand hygiene compliance at their hospital, to compare data over time to determine whether improvement has occurred, and/or to benchmark hand hygiene compliance at multiple hospitals or other healthcare facilities. Relevant reports may be generated for any application or environment in which the adaptive route network is implemented, and it shall be understood that the disclosure is not limited in this respect.

Figure 36:
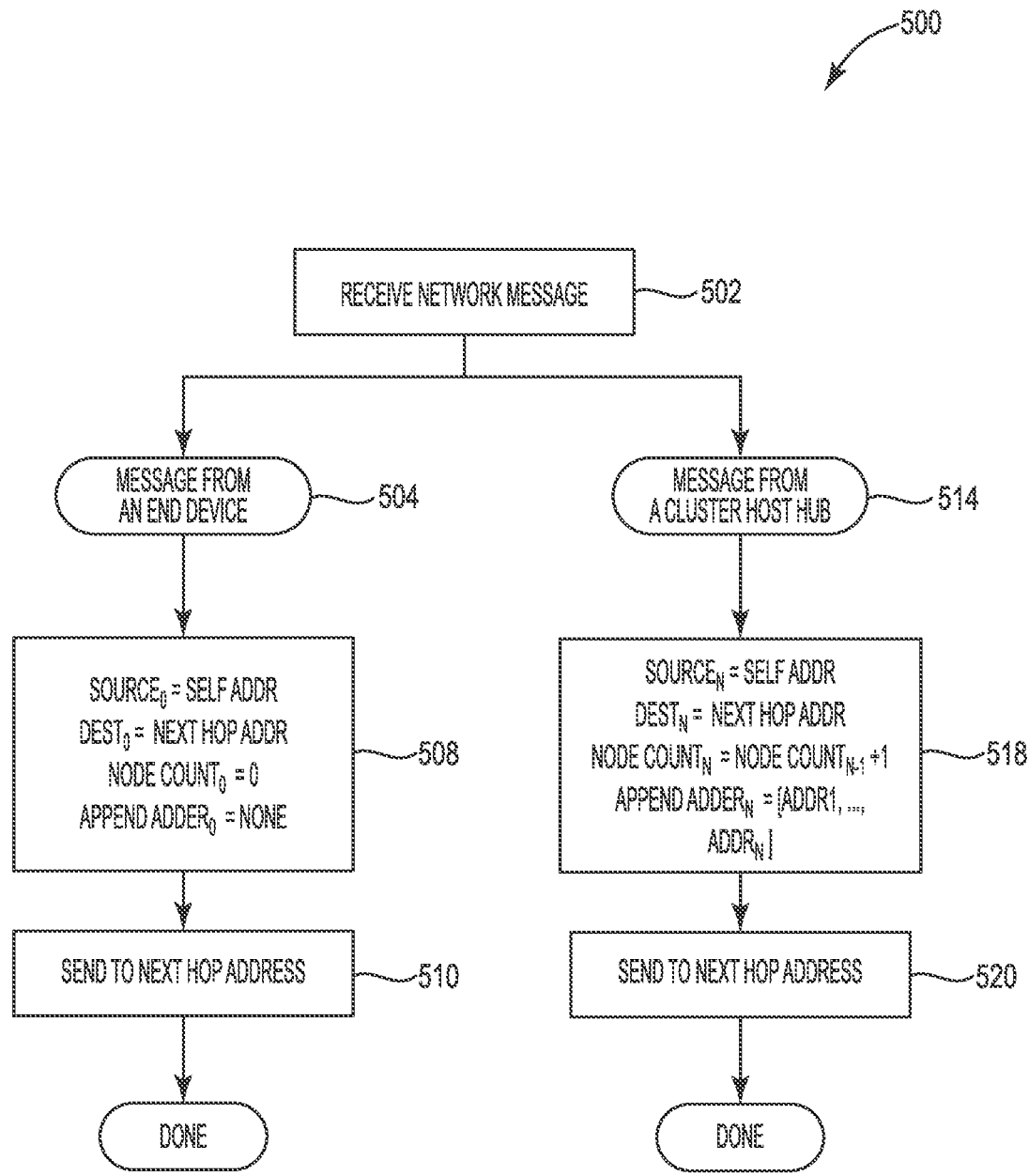
FIG. 36 is a flowchart illustrating an example process by which a cluster host computing device may receive and transmit a downstream message in accordance with the present disclosure.

FIG. 36 is a flowchart illustrating an example process (500) by which a cluster host computing device may receive and transmit a downstream message in accordance with the present disclosure. Reference may also be made to the example downstream network messages at each hop along a route illustrated in FIG. 27.

A cluster host computing device will be a first node in a route to the gateway if the downstream message is received from an end computing device (504). If the message is received from an end device (504), cluster host computing device generates a new network message, and in doing so sets the Source Address field in the network message to its own network address; sets the Destination address field in the network message to its next hop address (see, e.g., Next Hop Address 384 in FIG. 33); sets the Node Count field in the network message to zero (as this is the first node in the route from the end device to the gateway); and does not append any addresses to the Appended Address list field of the network message (508). See, e.g., Hop 1, FIG. 27. The cluster host then transmits the network message to the next hop address indicated in the Destination field of the network message.

If the message is received from another cluster host computing device (514), cluster host computing device sets the Source address field in the network message to its own network address (SELF ADDR); sets the Destination Address field in the network message to its next hop address (see, e.g., Next Hop Address 384 in FIG. 33); increments the Node Count field in the network message by one (1); and appends the received Source Address (ADDR$_N$) in the received network message to the Appended Address field of the network message (518) (see, e.g., Hop 2, FIG. 27). In this way, the Appended Address field of the network message will include a list of all node addresses that the downstream message has taken along the route to the current node.

The cluster host then transmits the network message to the address indicated in the Destination field of the newly generated network message. Each successive cluster host along the route executes the same process (502, 514-522) (see, e.g., Hop 3 and Hop 4, FIG. 27) until the Destination field address is a gateway address (see, e.g., Hop 4, FIG. 27).

In this way, the Appended Address field of the network message will include a list of all node addresses that the downstream message has taken along the route to the gateway.

Figure 37:
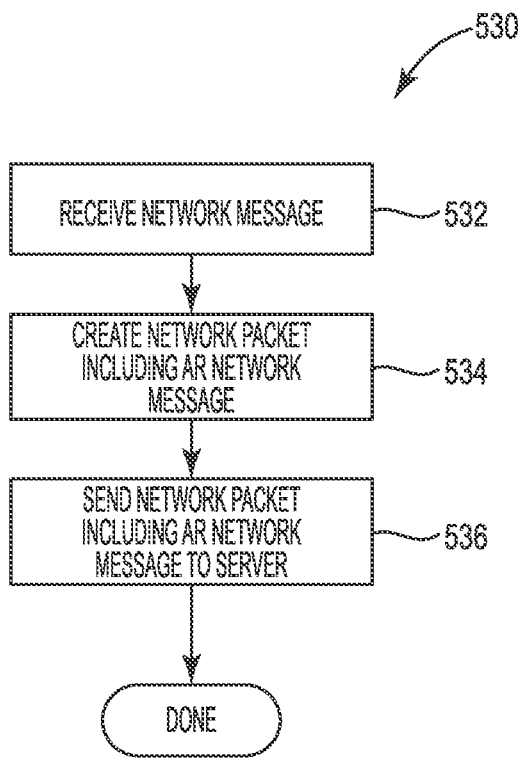
FIG. 37 is a flowchart illustrating an example process by which a gateway computing device may receive and transmit a downstream message to a server in accordance with the present disclosure.

FIG. 37 is a flowchart illustrating an example process (530) by which a gateway computing device may receive and transmit a downstream adaptive route (AR) network message to a server in accordance with the present disclosure. Gateway computing device receives the AR network message from an associated cluster host (532). The gateway computing device extracts the AR network message and creates a TCP/IP network packet including the AR network message as its payload (534) and transmits the network packet to the server (536). In some examples, the gateway computing device may buffer multiple AR network messages to transfer in a single network packet to the server.

Figure 38:
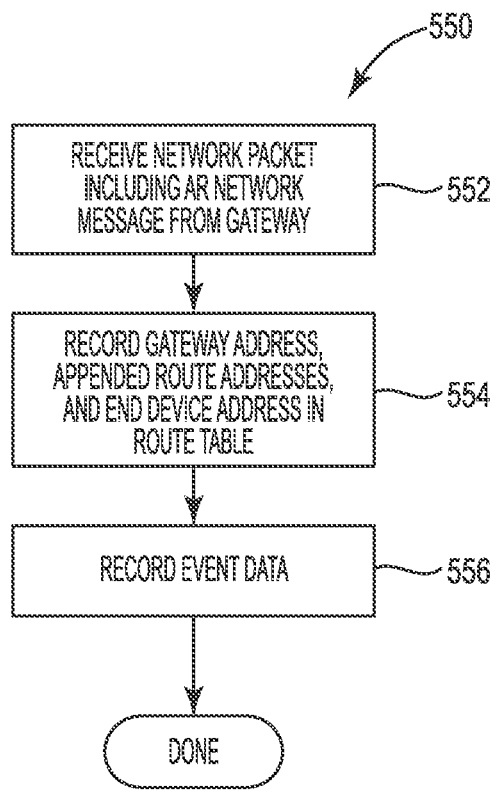
FIG. 38 is a flowchart illustrating an example process by which a server computing device may receive downstream message from a gateway computing device in accordance with the present disclosure.

FIG. 38 is a flowchart illustrating an example process (550) by which a server computing device may receive a downstream message from a gateway computing device in accordance with the present disclosure. Server computing device receives the network packet (552), extracts the AR network message from the network packet, and records the gateway network address, appended route addresses in the Appended Address field of the AR network message, and the end device factory address in a route table (554). In this way, the route table at the server is updated each time a downstream message (including event messages, join cluster messages, and join route messages) is received by the server. If the AR network message is an event message, the server also stores the event data (556).

Figure 39:
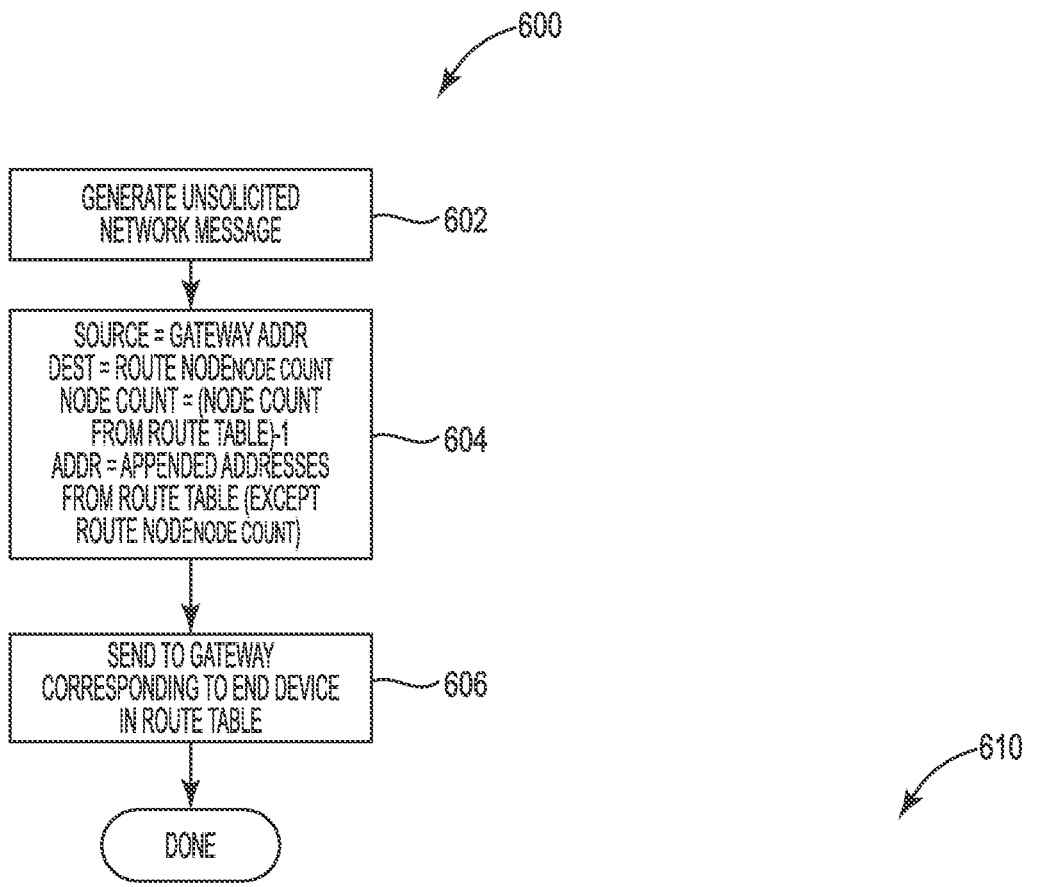
FIG. 39 is a flowchart illustrating an example process by which a server computing device may generate and transmit an unsolicited upstream message in accordance with the present disclosure.

FIG. 39 is a flowchart illustrating an example process (600) by which a server computing device may generate and transmit an unsolicited upstream message in accordance with the present disclosure. Reference may also be made to the example upstream network messages at each hop along a route illustrated in FIG. 30.

In the event that the server needs to send updates to settings or firmware, or other unsolicited message to any of the computing devices (including gateways, cluster hosts, and end devices) in an adaptive route network, the server generates the adaptive route network message (602), such as that shown as Hop 1 in FIG. 30, creates a TCP/IP network packet including the AR network message as its payload, and transmits the network packet to the appropriate gateway address. The server lists the gateway network address in the Source field of the network message, as the gateway will be the first device along the route to the intended recipient device. In this sense, the server essentially generates the network message to be delivered by the gateway to the first cluster host along the route to the intended recipient. Thus, the server sets the Source address to the appropriate gateway address corresponding to the destination computing device in the route table; sets the destination address to the first route node (cluster host) along the route to the destination computing device as specified in the route table (in this example, the first route node is the route node corresponding to the node count in the route table); decrements the node count as specified in the route table by one (because the server is generating the network message for the gateway, the node count at the gateway is one less than the total node count); and sets the Appended Address field in the network message using the appended addresses specified in the route table, except for the cluster host first in the route (as that is already specified in the Destination Address (604). The server then transmits the network packet to the appropriate gateway computing device (606).

Figure 40:
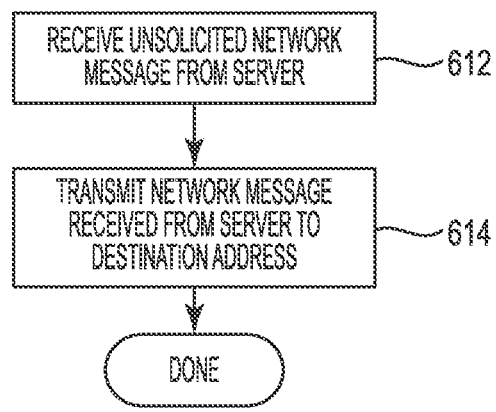
FIG. 40 is a flowchart illustrating an example process by which a gateway computing device may receive and transmit an unsolicited upstream message in accordance with the present disclosure.

FIG. 40 is a flowchart illustrating an example process (610) by which a gateway computing device may receive and transmit an unsolicited upstream message in accordance with the present disclosure. Gateway computing device receives the network packet containing the unsolicited network message from the server (612). The gateway extracts the network message from the network packet. As the network message has already been constructed by the server for transmission by the gateway, the gateway simply transmits the network message to the Destination Address specified in the message (614). (See, e.g., Hop 1 in FIG. 30).

Figure 41:
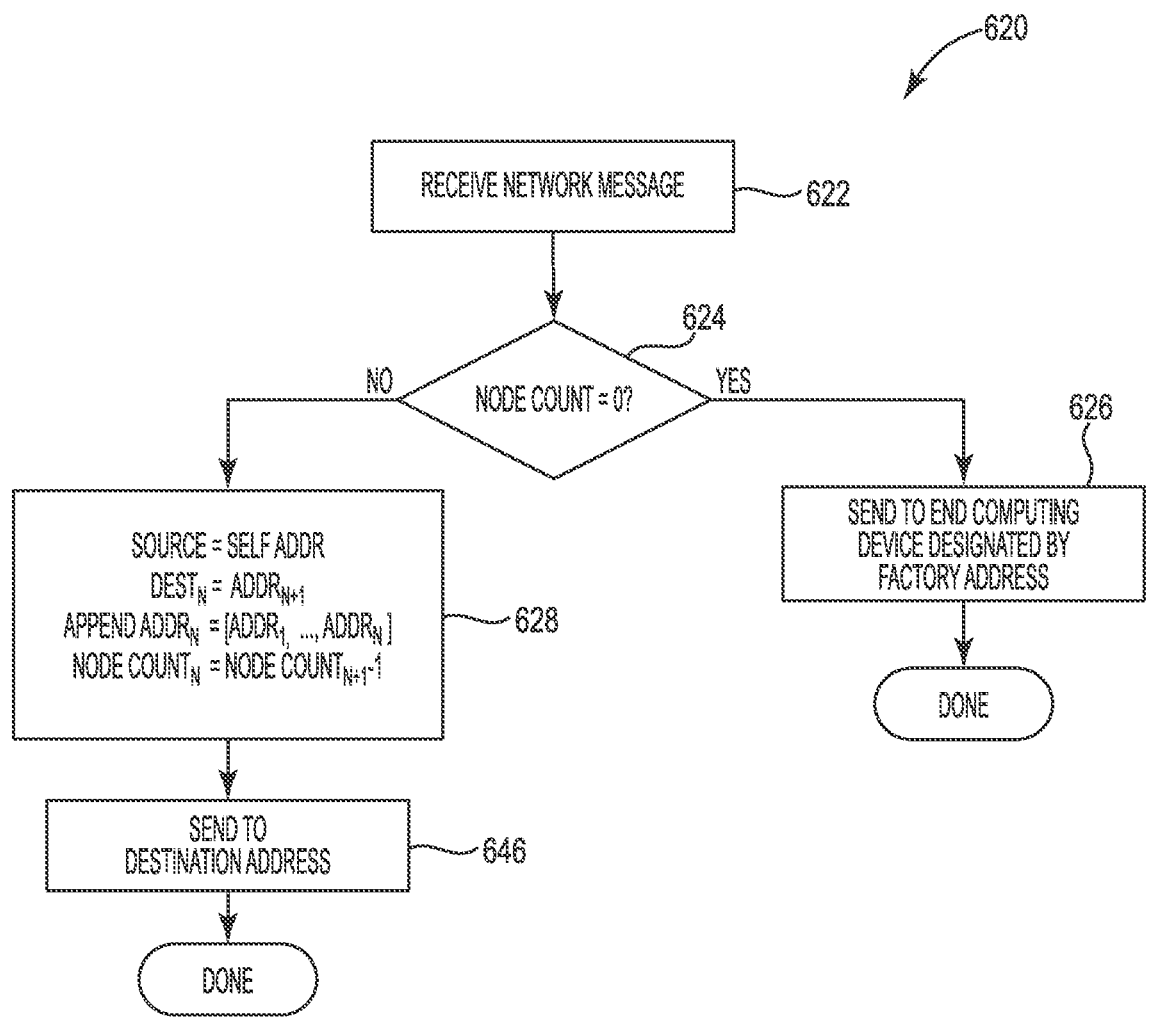
FIG. 41 is a flowchart illustrating an example process by which a cluster host computing device may receive and transmit an unsolicited upstream message in accordance with the present disclosure.

FIG. 41 is a flowchart illustrating an example process (620) by which a cluster host computing device may receive and transmit an unsolicited upstream message in accordance with the present disclosure. The cluster host computing device receives the network message (622). The network message may be received from a gateway or from another cluster host computing device along a route to the destination computing device. If the node count specified in the Node Count field of the network message equals zero (0) (624) (see, e.g., Hop 4 of FIG. 30) this means that the current cluster host is the last cluster host on the route to the destination computing device; that is, the destination device is an end computing device that is a member of the cluster belonging to the current cluster host. Alternatively, the current cluster host is the intended recipient. The cluster host computing device therefore transmits the network message to the destination end device indicated by the factory address in the payload field of the network message (626). Alternatively, if the factory address in the payload field of the network message is the cluster host's own factory address, the cluster host computing device receives the data in the network message and acts accordingly (626).

If the node count does not equal zero (624) the current cluster host computing device generates a new network message for transmission to the next node along the route (628), and in doing so, sets the Source Address to its own network address (SELF ADDR); sets the Destination address to the Appended Address Node byte corresponding to the current Node Count specified in the received network message ($ADDR_{N+1}$); deletes/removes the Appended Address Node byte corresponding to the current Node Count from the Appended Address list of the received network message; and decrements the Node Count in the Node Count field; (see, e.g., Hops, 2, 3, and 4 in FIG. 30). The cluster host then transmits the network message to the Destination Address specified in the network message (646).

The adaptive route wireless network topology and bi-directional communication protocol in accordance with the present disclosure provides a network having the ability to support multiple gateways, dynamically discover the best route between an end device and a gateway and to dynamically adapt to changing environments, dynamically discover a new route between an end device and a gateway if a link is broken, and/or support bi-directional communication between and end device and a gateway. The adaptive route wireless network therefore provides a flexible system that is designed to be easier for users and service technicians to use and maintain. The adaptive route wireless network is a stand-alone network that does not consume network traffic on an enterprise's wired or wireless network(s). The ability to support multiple gateways increases the number of end devices that can be supported as compared to networks that only permit one gateway per building, and thus the size of the customer, and the number of end devices, is therefore not limited in that respect. The bi-directional communication protocol allows information to be transmitted from the end devices to a local or remote computing devices and/or a server/data repository (on or off-site) for analysis, and also allows information to be easily transmitted from the server, or from other local or remote computing devices, to the end computing devices with a very small amount of overhead, so that unsolicited updates to settings or firmware may be easily and efficiently transmitted from the server computing device throughout the network.

The bi-directional communication protocol of the present disclosure enables simplified, low-overhead bi-directional network communication without requiring each device or node in the network to maintain large route tables in their own local memory that store routes from itself to every other device in the network, thus simplifying their design and lowering cost. The bi-directional communication protocol of the present disclosure also eliminates the network traffic required to keep such route tables up to date, as route addresses are sent within messages themselves using a relatively small number of bytes, rather than requiring separate route maintenance messages to be continually sent throughout the network.

Figure 42:
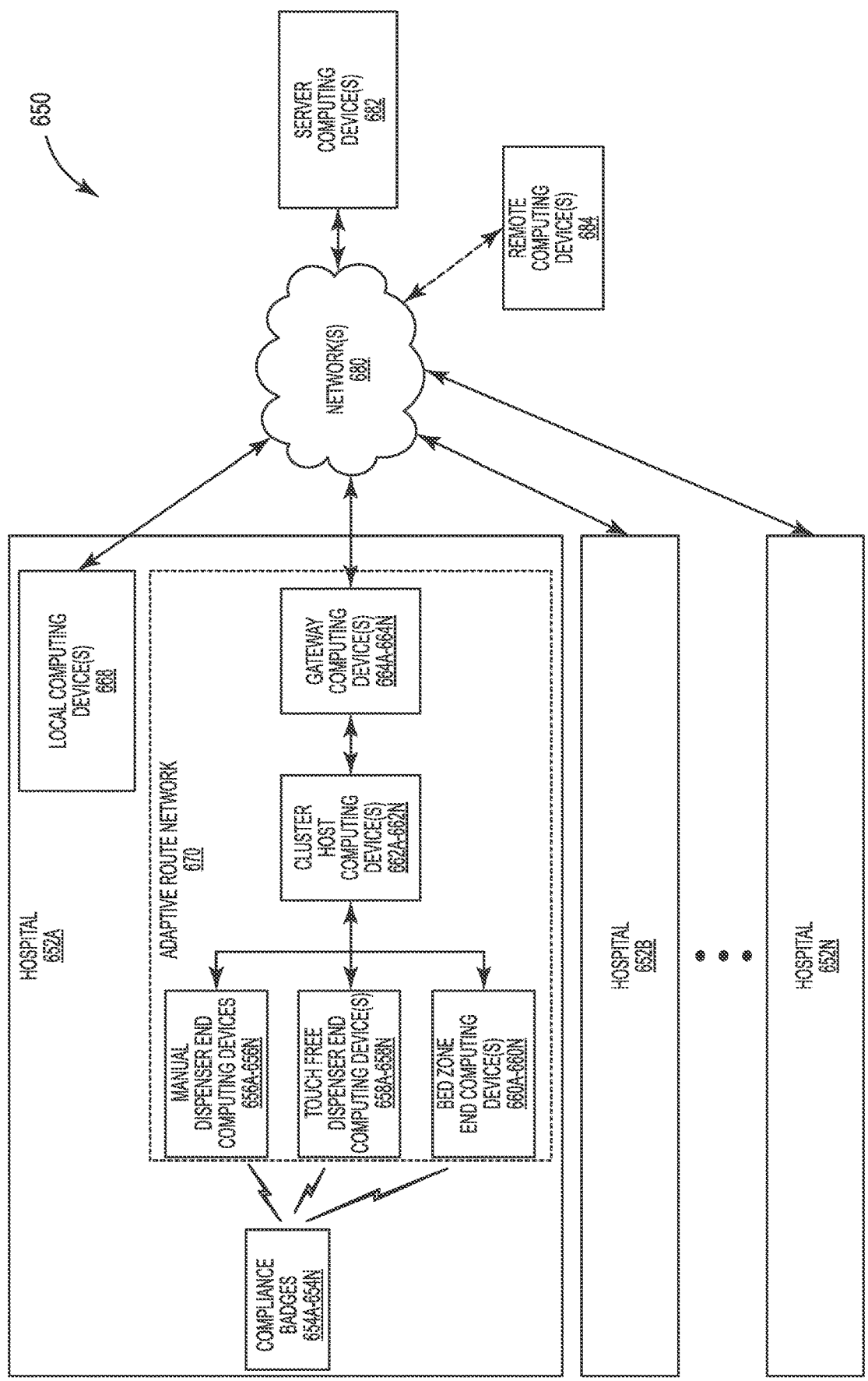
FIG. 42 is a block diagram illustrating an example hand hygiene compliance network employing an adaptive route network and bi-directional communication protocol in accordance with the present disclosure.

FIG. 42 is a block diagram of an example hand hygiene compliance monitoring system 650 which uses an adaptive route network and bi-directional communication protocol in accordance with the present disclosure. A plurality of healthcare facilities, such as hospitals 652A-652N, each include a plurality of manual and/or touch free hand hygiene product dispensers for the dispensation of hand hygiene product(s). The hand hygiene product(s) may include antimicrobial soaps, hand sanitizers, general use soaps, surgical scrubs, lotions, body washes, etc. The hand hygiene products may take the form of any of liquids, gels, foams, lotions, pastes, powders, pellets, or any other form in which a hand hygiene product may be dispensed.

In this example, in order to monitor hand hygiene compliance of a plurality of healthcare workers associate with the healthcare facility, each healthcare worker is uniquely assigned to one of a plurality of compliance badges 654A-654N. For simplicity of illustration, these are shown with respect to hospital 652A. It shall be understood, however, that compliance badges need not necessarily be used with implementation of an adaptive route network, but rather that compliance badges may be used in conjunction with an adaptive route network where monitoring of individuals is desired, such as the example shown in FIG. 42.

Each of the plurality of manual dispensers is associated with a different one of a plurality of manual dispenser end computing devices 656A-656N configured to detect a dispense event each time the respective manual dispenser is actuated. Similarly, each of the plurality of touch free dispensers is associated with a different one of a plurality of touch free dispenser end computing devices 658A-658N and is configured to detect a dispense event each time the respective touch free dispenser is actuated. In addition, each of a plurality of bed zone end computing device(s) 660A-660N is configured to generate a zone around an area to be monitored, such as a patient bed zone, and to detect entry events into the zone when it detects a compliance badge entering the patient bed zone, and to detect exit events out of the zone when it detects a compliance badge leaving the patient bed zone. Each of end computing devices 656A-656N, 658A-658N, and 660A-660N may be implemented as the end computing device 400 as shown in FIG. 32.

It shall be understood that other end computing devices associated with other devices, apparatus, and/or areas to be monitored may also be included, and that the disclosure is not limited in this respect. For example, end computing devices may also be associated with an area to be monitored, such as to detect presence of a compliance badge or healthcare worker in a patient room, treatment area, bathroom, or other area to be monitored). End computing devices may also be associated with any of sinks, toilets, or other device, apparatus, or area to be monitored for monitoring of hand hygiene compliance.

Each compliance badge 654A-654N is configured for short-range wireless communication with any of end computing device(s) 656A-656N, 658A-658N, and 660A-660N. Upon detection of a dispense event, for example, a manual dispenser end computing device 656A-656N may generate and transmit a short-range wireless interrogation signal, which induces any compliance badge 654A-654N within range of the transmission to transmit badge data, such as badge id, healthcare worker id, etc., upon receipt of the interrogation signal. The short-range wireless communication may include, for example short-range radio (RF) (e.g., Bluetooth, ZigBee, or ultra-wide band (UWB)) communication, infrared (IR) communication, or near field (NFC) communication techniques.

The end computing device(s) 656A-656N, 658A-658N, and 660A-660N are further configured to form part of an adaptive route wireless network 670 and communicate using the bi-directional communication protocol in accordance with the present disclosure. Upon receipt of the badge data from a compliance badge, end computing device 656A-656N associates the badge data with the dispense event, and transmits the badge data along with the other dispense event data, in an adaptive route network message as described herein.

To that end, end computing device(s) 656A-656N, 658A-658N, and 660A-660N are configured for wireless transmission of dispense event data and/or entry/event data via the adaptive route network 670. Each of end computing devices 656A-656N, 658A-658N, and 660A-660N is therefore configured to join a cluster with, and to transmit to and receive data from, one of cluster host computing devices 662A-662N. Each of cluster host computing devices 662A-662N is further in turn configured to join a route to a gateway 664A-664N with one or more of the other cluster host computing device 662A-662N as described herein (or none if there is only one cluster host along the route). Cluster host computing devices 662A-662N may be implemented as, for example, cluster host computing device 370 as shown in FIG. 33. Gateway computing devices 664A-664N may be implemented as, for example, gateway computing device 350 as shown in FIG. 34.

The dispense event data may include, among other things, a time and date stamp for the dispense event, a healthcare worker id or badge number received from a compliance badge associated with the dispense event, and a dispenser id. The dispense event data may also include status information corresponding to the dispense event, including a battery level for the dispenser or for the associated end computing device, a bottle presence indicator, a dispense event count, a number of dispenses remaining, a product empty indicator, or any other information relevant to the dispense event or to the status of the dispenser.

The zone entry/exit event data may include, among other things, a time and date stamp for the entry/exit event, a healthcare worker id or badge number received from a compliance badge associated with the entry/exit event, and a bed zone beacon id. The entry/exit event data may also include status information corresponding to the entry/exit event, including a battery level for the bed zone beacon or for the associated end computing device, an entry event count, an exit event count, or any other information relevant to the entry/exit event or to the status of the bed zone beacon or end computing device.

To monitor hand hygiene compliance, dispense event data from the plurality of dispenser end computing devices 656A-656N, 658A-658N, and/or entry/exit event data from the plurality of bed zone end computing device(s) 660A-660N, is wirelessly transmitted along a route through the adaptive route network in accordance with the bi-directional communication protocol of the present disclosure to one or more server computing device(s) 682 for data analysis and reporting. Server computing device may include, for example, server computing device 300 as shown in FIG. 35. Adaptive route network 670 may communicate with server computing device(s) 682 via one or more networks 680. Network(s) 680 may include, for example, one or more of a dial-up connection, a local area network (LAN), a wide area network (WAN), the internet, a wireless or Wi-Fi network, a cell phone network, satellite communication, or other means of electronic communication. The communication within network(s) 680 may be wired or wireless. In addition, the local computing device(s) 668, server computing device(s) 682, and remote user computing device(s) 684 may communicate via network(s) 680. Remote/local computing device(s) 684 may include, for example, one or more of a server computing device, a desktop computing device, a laptop computing device, a tablet computing device, a mobile computing device (such as a smart phone) a personal digital assistant, a pager, or any other type of computing device.

Server computing device 682 includes an analysis application that, when executed by processors of server computing device 682, analyzes the hand hygiene data (e.g., dispense event data and entry/exit event data) in accordance with one or more compliance rules so as to monitor hand hygiene compliance of healthcare workers within the healthcare facility. Server computing device 682 further includes a reporting application that, when executed by processors of server computing device 682, generates reports regarding hand hygiene compliance. For example, server computing devices 682 may analyze the hand hygiene data to monitor hand hygiene compliance by individual healthcare worker, type of healthcare worker (e.g., nurses, doctors, environmental services (EVS), housekeeping personnel, maintenance personnel, etc.), department, type of department, individual hospital, type of hospital, across multiple hospitals, or by various other selected parameters. Server computing devices 682 may generate and transmit a variety of reports automatically or on demand to one or more local computing device(s) 668, one or more remote user computing device(s) 684, with both qualitative and quantitative data regarding hand hygiene compliance at their hospital, to compare data over time to determine whether improvement has occurred, and/or to benchmark hand hygiene compliance at one hospitals, at multiple hospitals, or to view and compare hand hygiene compliance over time. Analysis and/or reporting applications may also be stored locally on hospital computing devices 668 so that analysis and reporting of hand hygiene data may be done locally if desired.

In some example adaptive route networks in accordance with the present disclosure, the system may include a plurality of badges for monitoring user's behavior and/or interaction with other devices in the network. In a hand hygiene compliance network, for example, each of a plurality of compliance badges may be uniquely assigned to one of a plurality of users whose hand hygiene practices are to be monitored. The hand hygiene compliance system may further include dispenser module end computing devices, each of which detects dispense events at a hand hygiene product dispenser and communicates with the compliance badges to associate each dispense event with a particular user. The system may further include zone module end computing devices, each of which generates a "zone" around an area to be monitored, and detects entry and/or exit events of compliance badges to/from the zone, such as a zone around a patient bed or other area to be monitored.

To analyze compliance with hand hygiene procedures, the adaptive route network may include one or more sets of compliance rules that define compliant and non-compliant hand hygiene practices. Each set of compliance rules corresponds to a different type of user. In a hand hygiene network for use in a healthcare facility, for example, the user types may include physicians, nurses, physical therapists, environmental service staff, administrative personnel, etc. The compliance rules corresponding to each user type may include zone entry/exit event and dispense event timings designed with the anticipated workflow of the user type taken into account. Each set of compliance rules may include one or more configurable items that may be programmed or adjusted to accommodate the workflow of a corresponding user type. For example, the configurable items may include one or more audible indicator settings, one or more visible indicator settings, one or more timers or grace periods including times between patient zone entry/exit events, times between patient zone entry/exit events and dispense events, times after leaving a patient zone, and any other configurable item that may be used to evaluate compliance with hand hygiene procedures.

Upon sensing of a zone entry/exit event and/or dispense event, the sensing end device obtains badge identification information from the compliance badge associated with the zone entry/exit event and/or dispense event. The dispense event data and/or the zone entry/exit event data (including a time/date stamp associated with the event, the badge id, device id, etc.) is transmitted from the end device(s) to the server via the adaptive route network, which analyzes the data in accordance with the compliance rules. In this way, individual compliance/non-compliance with hand hygiene procedures may be monitored and analyzed. Each compliance badge may also be programmed to analyze dispense event and/or zone entry/exit data in accordance with the compliance rules to determine compliance/non-compliance with the hand hygiene procedures.

In some circumstances, it may be desirable to update, customize, or otherwise change the one or more sets of compliance rules or other badge settings in an adaptive route network. To that end, the adaptive route network includes configurable compliance badges having one or more sets of compliance rules that may be configured based on user type and/or the needs of the site.

The server computing device maintains a current set of compliance rules. Each time the set of compliance rules is updated or changed, the server increments a "configuration id" number corresponding to the current set of compliance rules. In order to distribute the updated set of compliance rules throughout the adaptive route network, the server transmits the current set of compliance rules and associated configuration id to the gateway computing device(s), which is local to the site.

To distribute the current set of compliance rules from a gateway computing device to all the hub/cluster host computing devices in an adaptive route network, the heartbeat messages transmitted by the route nodes (e.g., hub/cluster host computing device) in an adaptive route network are used to monitor the sets of compliance rules stored by each device. As mentioned above, in some examples, to verify that a route node is active (that is, that a route node is a hub with current network membership), each active route node (e.g., hub/cluster host computing device) transmits heartbeat messages at periodic (e.g., one (1) hour) intervals. Each heartbeat message includes the hub computing device's configuration id number. Each time the gateway receives a heartbeat message from a route node, the gateway compares the hub computing device's configuration id number with the current configuration id number. If the hub computing device's configuration id number is less than the current configuration id number, the gateway transmits a badge configuration message (BCM) to the hub computing device, and also transmits the current set of compliance rules and the current configuration id number to the device. In response to receipt of the BCM, the hub computing device updates the set of compliance rules and the configuration id number stored on the hub computing device. In this way, a current set of compliance rules may be distributed to all of the hubs in an adaptive route network using a relatively small amount of network traffic. As the heartbeat message is sent only once per hour, and the configuration id number takes up only a small number of bytes in the heartbeat message, the status of each device's set of compliance rules may be determined using a relatively small amount of network traffic, and the full set of compliance rules need only be sent if it is determined that a particular device's configuration id is less than the configuration id corresponding to the current set of compliance rules. In addition, the hubs may be updated relatively quickly as their configurations are checked with every heartbeat message.

Similarly, a dispense event message and/or heartbeat message transmitted by each end computing device (such as a dispenser) also includes the configuration id stored by the end computing device's stored configuration id. An end computing device generates a heartbeat message if no events have occurred within the heartbeat timeout period (e.g., 1 hour). If an event occurs before the heartbeat timeout has expired, the end computing device will reset the heartbeat timeout to 1 hour. Each time a hub/cluster host computing device receives a heartbeat message or dispense event message from an end computing device, the hub computing device compares its configuration id number with the configuration id number received from the end computing device. If the end computing device's configuration id number is less than the hub's configuration id number, the hub transmits a badge configuration message (BCM) to the end computing device, and also transmits the set of compliance rules and the configuration id number stored by the hub to the end computing device. In response to receipt of the BCM, the end computing device updates the set of compliance rules and the configuration id number stored on the end computing device. In this way, similar to updating the hubs in an adaptive route network, an updated set of compliance rules may be distributed to all of the end computing devices in an adaptive route network using a relatively small amount of network traffic. Because the configuration id number takes up only a small number of bytes in an event message or a heartbeat message, the status of each end computing device's set of compliance rules may be determined using a relatively small amount of network traffic, and the full set of compliance rules need only be sent if it is determined that a particular end device's configuration id is less than the configuration id stored by the hub/cluster host computing device. An end computing device will be checked at least as often as a heartbeat message is sent, and sometimes more frequently if a dispense event occurs.

To update the compliance badges in the network with the current set of compliance rules, each time an end computing device detects a dispense event or zone entry/exit event, the device establishes communication with the compliance badge associated with the event, and the compliance badge transmits a dispense event message, including its configuration id number and badge identification number to the end computing device. For example, if a dispenser detects a dispense event, the dispenser establishes communication with the compliance badge associated with the dispense event, and the compliance badge transmits dispense event message, including its badge id number and its configuration id number to the dispenser. The dispenser compares the configuration id number received from the compliance badge with the configuration id number stored by the dispenser. If the badge configuration id number is less than the configuration id number stored by the dispenser, the dispenser transmits a badge configuration message (BCM) back to the compliance badge associated with the dispense event. In response to receipt of the BCM, the badge updates the set of compliance rules and the configuration id number stored on the badge. In this way, the set of compliance rules stored by each compliance badge in the network is checked against the current set of compliance rules each time a dispense event associated with the badge is detected, and the set of compliance rules stored by the compliance badge is updated if necessary.

As with updating the hubs and the end computing devices, an updated set of compliance rules may be distributed to all of the compliance badges in an adaptive route network using a relatively small amount of network traffic. Because the configuration id number takes up only a small number of bytes in an event message, the status of each compliance badge's set of compliance rules may be determined using a relatively small amount of network traffic, and the full set of compliance rules need only be sent if it is determined that a particular compliance badge's configuration id is less than the configuration id stored by the end computing device.

The time required for updating a compliance badge is determined by how often the compliance badge is used to complete a dispense event.

Figure 43:
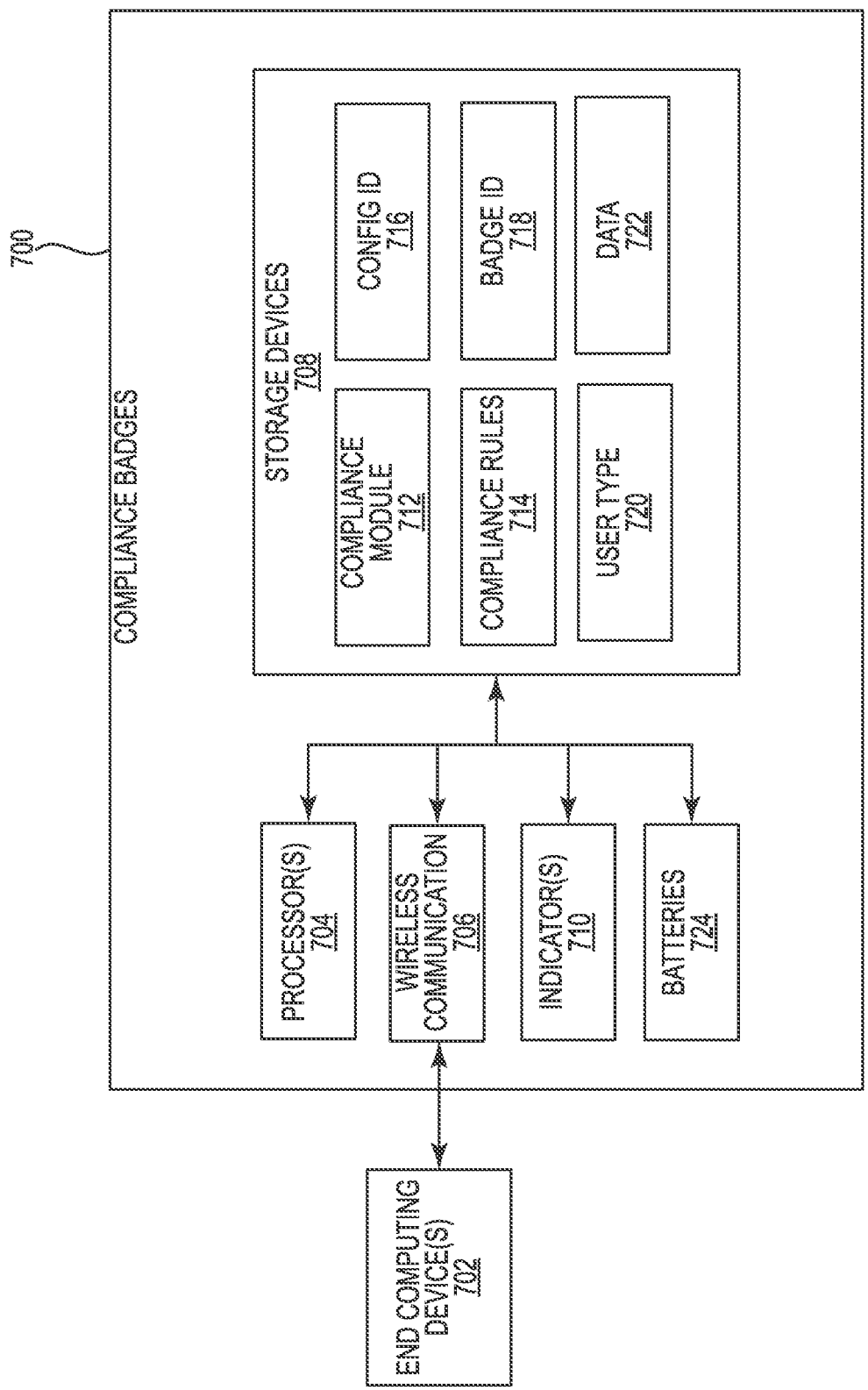
FIG. 43 is a block diagram of an example compliance badge 700 in accordance with the adaptive route network and protocol of the present disclosure.

FIG. 43 is a block diagram of an example compliance badge 700 in accordance with the adaptive route network and protocol of the present disclosure. FIG. 43 illustrates one example of a compliance badge 700, and many other examples of compliance badge 700 may be used in other instances. Compliance badge 700 may include a subset of the components included in FIG. 43 or may include additional components not shown in FIG. 43.

Compliance badge 700 includes one or more processor(s) 704, a wireless communication unit 706, one or more indicator(s) 710, one or more batteries 724, and one or more storage device(s) 708. Storage device(s) 708 includes a compliance module 712, compliance rules 714, a configuration id 716, a badge id 718, a user type 720, and a data storage/message buffer 722.

One or more wireless communication units 706 permit short-range wireless communication with end computing devices, such as end computing device(s) 702 in an adaptive route network. The end computing device(s) 702 may include, for example, any of dispenser end devices and/or bed beacon end devices in a hand hygiene compliance network, or any other type of end computing device. Upon detection of a dispense event, for example, a dispenser end computing device 702 may generate and transmit a short-range wireless interrogation signal, which induces any compliance badge 700 within range of the transmission to transmit badge data, such as badge id, healthcare worker id, configuration id number, etc., in response to receipt of the interrogation signal. The short-range wireless communication may include, for example short-range radio (RF) (e.g., Bluetooth, ZigBee, or ultra-wide band (UWB)) communication, infrared (IR) communication, or near field (NFC) communication techniques.

One or more processors 704 may implement functionality and/or execute instructions associated with compliance badge 700. Examples of processors 704 include application processors, microcontrollers, and any other hardware configured to function as a processor, a processing unit, controller, or a processing device. Processors 704 may execute compliance module 712 to communicate with one or more end computing device(s), detect dispense and/or exit/entry events, and/or perform any corresponding analysis or communication regarding such detected events. For example, processors 704 may retrieve and execute instructions stored by storage components 708 that cause processors 704 to perform or execute the operations stored in compliance module 712. The instructions, when executed by processors 704, may cause compliance badge 700 to generate and/or store information within storage components 708, such as data storage/message buffer 722.

In some examples, compliance rules 714 includes one or more sets of compliance rules, each corresponding to a different defined user type. In a healthcare facility, for example, the user types may include a physician user type, a nurse user type, a physical therapist user type, an environmental services user type, a dietary stuff user type, and any other defined user type. Each compliance is uniquely associated with a different user, and the user type 720 corresponding to that user is stored. To analyze hand hygiene behaviors, compliance badge 700 uses the set of compliance rules 714 corresponding to the user type 720.

Transmission of certain types of messages by compliance badge 700 may be event triggered. For example, upon detection of an event by one of end computing devices 702, processor(s) 704 may execute compliance module 712 to generate and transmit an event message including badge id 718, user type 720, and configuration id 716 to the end computing device 702 associated with the event. Compliance module 712 may also include instructions that, when executed by processor(s) 704, permit compliance badge 700 to analyze data corresponding to the detected event based on the compliance rules 714 and the user type 720 to determine compliance and/or non-compliance with hand hygiene practices.

Figure 44:
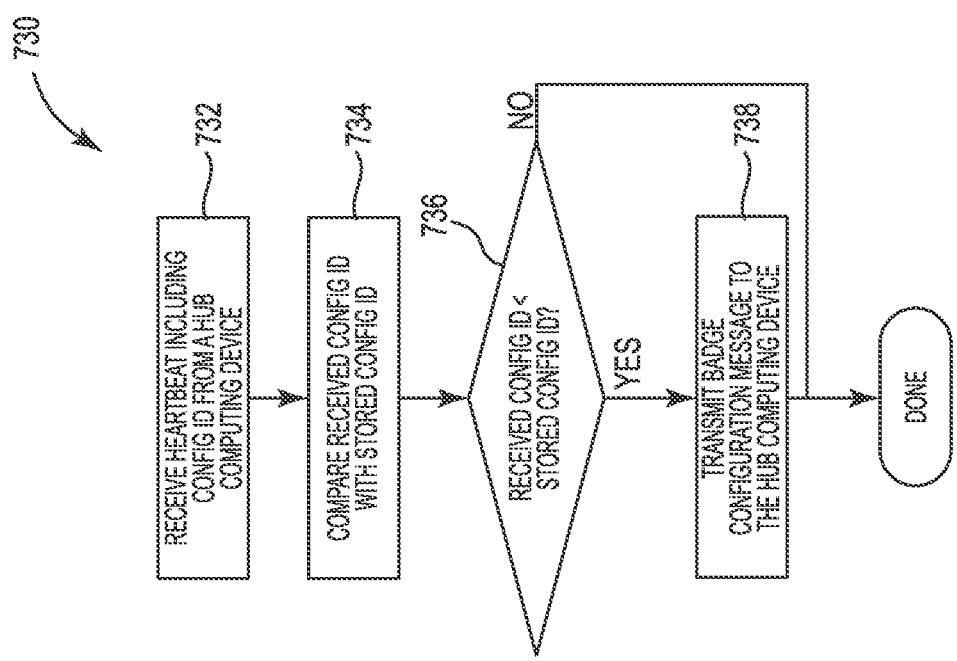
FIG. 44 is a flowchart illustrating an example process by which a gateway computing device may determine whether a hub in an adaptive route network includes a current set of compliance rules.

FIG. 44 is a flowchart illustrating an example process (730) by which a gateway computing device may determine whether a hub in an adaptive route network includes a current set of compliance rules. The gateway device receives a heartbeat message including a configuration id from an active device (e.g., a cluster host/hub device) on an adaptive route network (732). The gateway computing device compares the received configuration id with a current configuration id corresponding to the most recent set of compliance rules (734). If the received configuration id is less than the current configuration id (YES branch of 736), the device does not include the most current set of compliance rules, and the gateway device transmits a configuration update message (BCM) back to the device (738). The configuration update message may include the current set of compliance rules and the current configuration id. If the received configuration id is not less than the current configuration id (NO branch of 736), the device includes the most current set of compliance rules (at least as far as the gateway computing device is concerned), and no update is required.

Figure 45:
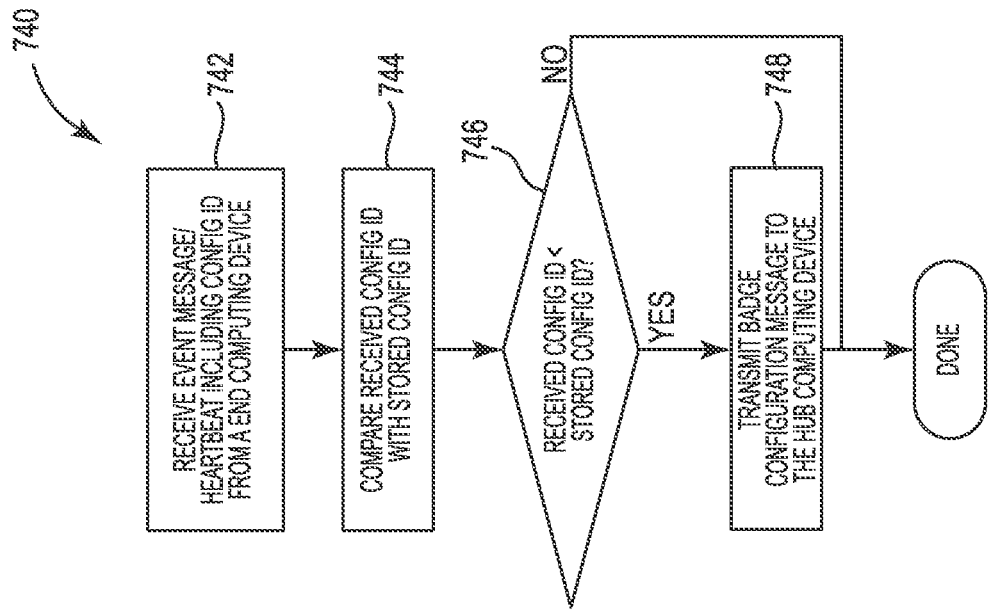
FIG. 45 is a flowchart illustrating an example process by which a hub/cluster host computing device may determine whether an end computing device in an adaptive route network includes a current set of compliance rules.

FIG. 45 is a flowchart illustrating an example process (740) by which a hub/cluster host computing device may determine whether an end computing device in an adaptive route network includes a current set of compliance rules. The hub computing device receives an event message or a heartbeat message including a configuration id from an end computing device on an adaptive route network (e.g., a hand hygiene dispenser in a hand hygiene compliance network) (742). The hub computing device compares the configuration id received from the end computing device with the configuration id stored on the hub computing device (744). If the configuration id received from the end computing device is less than the stored configuration id (YES branch of 746), the end computing device has not been updated with the most current set of compliance rules, and the hub computing device transmits a badge configuration message (BCM) back to the end computing device (748). The badge configuration message may include the set of compliance rules stored by the hub computing device and the associated configuration id. If the configuration id received from the end computing device is not less than the stored configuration id (NO branch of 736), the end computing device includes the most current set of compliance rules (at least as far as the hub computing device is concerned), and no update is required.

Figure 46:
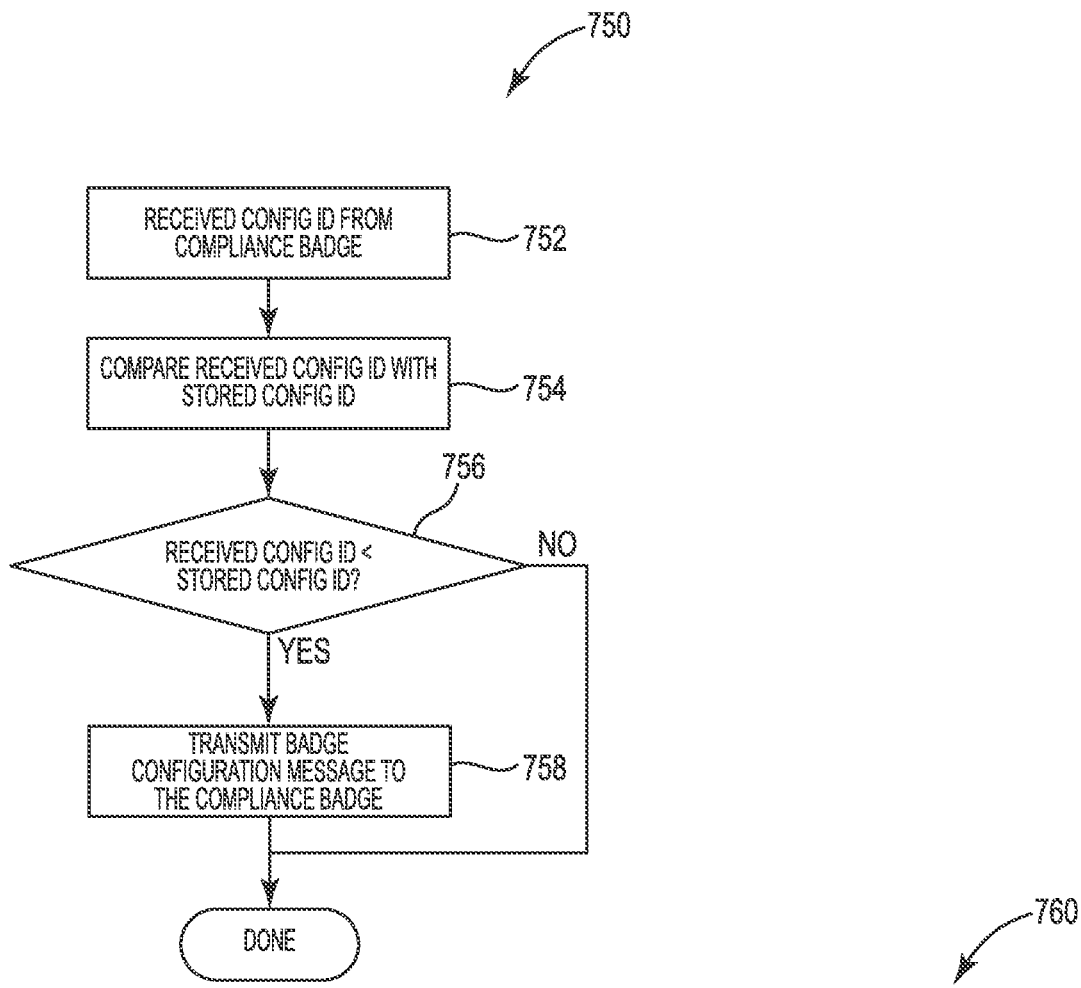
FIG. 46 is a flowchart illustrating an example process by which an end computing device (such as a hand hygiene product dispenser) may determine whether a compliance badge includes a current set of compliance rules.

FIG. 46 is a flowchart illustrating an example process (750) by which an end computing device (such as a hand hygiene product dispenser) may determine whether a compliance badge includes a current set of compliance rules. During the event detection process, the end computing device receives event data from a compliance badge associated with the event, including a badge id, a user type, and a configuration id (752). The end device compares the received configuration id to the stored configuration id corresponding to the set of compliance rules stored by the end device (754). If the received configuration id is less than the stored configuration id (YES branch of 756), the compliance badge does not include an up to date set of compliance rules, and the end computing device transmits a badge configuration message back to the compliance badge (758). The badge configuration message may include the set of compliance rules stored by the end device and the associated configuration id. If the received configuration id is not less than the stored configuration id (NO branch of 756), the compliance badge includes the up to date set of compliance rules (at least as far as the end computing device is concerned), and no update is required.

Figure 47:
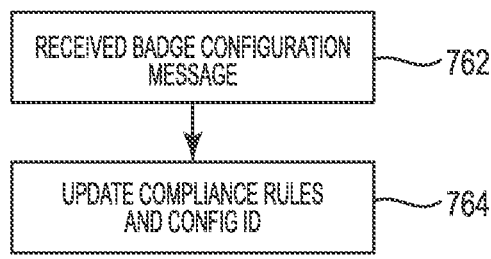
FIG. 47 is a flowchart illustrating an example process by which a compliance badge may update its stored set of compliance rules and configuration id.

FIG. 47 is a flowchart illustrating an example process (760) by which a compliance badge may update its stored set of compliance rules. A compliance badge, as part of a detection event, may receive a badge configuration message from an end computing device (762). This means that the end computing device has determined that the compliance badge does not include an up to date set of compliance rules as described above with respect to FIG. 45. The badge configuration message may include, for example, an updated set of compliance rules and an associated configuration id number. Upon receipt of the badge configuration message (762), the compliance badge updates the set of compliance rules and the configuration id number stored on the compliance badge with the received set of compliance rules and the associated configuration id number received in the badge configuration message (764). In this way, the set of compliance rules stored by each compliance badge is checked each time it is associated with a detected event, thus helping to ensure that each compliance badge will receive an updated configuration as soon as it interacts with an end device that has received an updated set of compliance rules.

The example process (760) illustrated in FIG. 47 is also the process by which a hub computing device or end computing device may update its stored set of compliance rules upon receipt of a badge configuration message (BCM). The compliance rules and configuration id number may be stored, for example, on a gateway computing device 350 in data/message buffer 368, as shown in FIG. 34. The compliance rules and configuration id number may be stored, for example, on a hub/cluster host computing device 370 in data/message buffer 388, as shown in FIG. 33. The compliance rules and configuration id number may be stored, for example, on an end computing device 400 in data/message buffer 416, as shown in FIG. 32.

Examples of the compliance rules and compliance badge hygiene status levels (states) for an example hand hygiene compliance network will now be described. By performing proper hand hygiene before and after each patient contact (i.e., when entering and exiting a patient zone), a Healthcare Worker (HCW) is proactively reducing the potential for the spread of harmful or even deadly pathogens. This proactive behavior results in a higher level of protection for both the patient and the HCW. The purpose of the compliance badge is to assist in reaching this higher level of protection by reminding or alerting the HCW of their current hand hygiene status level at all times. This is done, in real-time, as the HCW interacts with patient beds equipped with bed zone module end computing devices and soap/sanitizer dispenser module end computing devices. In some examples, each compliance badge includes one or more status indicators (such as status indicators 710 of FIG. 43). For example, a combination of colored LED lights (e.g., red, green, and yellow) on the badge can represent one of five hand hygiene status levels. By checking the badge's current status level before entering a patient zone and after exiting a patient zone, the HCW will be reminded that it is necessary to perform hand hygiene, thus reinforcing good hand hygiene practices.

FIG. 48 is a Table summarizing example badge status levels, states, and corresponding status indicator colors. State 0 corresponds to a "Clean" status level. In the example of FIG. 48, "Clean" is indicated by a green LED light on the badge, resulting from the recent use of a monitored soap or sanitizer dispenser. When the green LED is on and the HCW enters a patient zone, this registers as a compliant patient interaction. The badge will not remain in the "Clean" Status level indefinitely after performing hand hygiene. It has a configurable internal timer that will eventually expire and change the badge to the yellow or "Cue to Clean" status level (State 4) unless the HCW performs hand hygiene. The internal timer, for the "Clean" Status level, has a factory default expiration time of 10 minutes, but this can be adjusted or configured to accommodate a HCW's workflow.

State 1 corresponds to a "Compliant Patient Contact" status level. When an HCW enters a patient zone with a badge at the "Clean" Status level (State 0), the badge's status level changes to State 1 and the LED will remain green while inside that specific patient zone. This informs both the HCW and the patient that the HCW has performed recent hand hygiene prior to contact with the patient.

State 1 may also correspond to a "Compliant Patient Re-Contact" status level (during the State 1 Grace Period). When the HCW leaves the patient zone, their badge will flash the green LED and then the yellow LED together. While the badge is flashing "green/yellow" lights together, this indicates that the HCW may re-enter the same patient zone without the need to perform hand hygiene again. The badge will only remain at the "Compliant Patient Re-Contact Status" level for a limited time. It has a configurable internal timer that will eventually expire and change the badge to the yellow "Cue to Clean" status level (State 1) unless the HCW performs hand hygiene. The internal timer for the "Compliant Patient Re-Contact" status level has a factory default expiration time of 5 minutes, but this can be adjusted to accommodate a HCW's workflow. It is recommended that the HCW check the status of their badge before re-contacting a patient to determine if performing hand hygiene is necessary.

When the badge shows "green/yellow" lights together, the HCW may not enter the patient zone of a different patient without first performing hand hygiene. Going from one patient zone to a different patient zone without performing hand hygiene would be recorded as a non-compliant event, and the badge LED would display a red LED after a brief grace period (30 seconds after leaving the original patient zone).

The yellow LED seen for the "Cue to Clean" status level (State 1 or State 4) indicates that the HCW must perform hand hygiene before either entering or re-entering a patient zone. The "Cue to Clean" status level occurs when the HCW has not recently performed routine hand hygiene (State 4) or when the HCW has recently exited a patient zone (State 1) without performing hand hygiene.

In the case of recent patient zone exit, the badge has a configurable internal timer that will give the HCW a default grace period of 5 minutes during which they can return to their patient. After 5 minutes, another configurable timer begins that causes the yellow LED to flash for one minute (a total of 6 minutes after leaving the patient zone, at default timings). If the one-minute grace period expires before the HCW performs hand hygiene, the badge's hand hygiene status will update to the "NON-Compliant" status level (State 5), showing the red LED.

The internal timer for the "Cue to Clean" status level after inactivity (State 4), has a factory default expiration time of 10 minutes, but this can be adjusted to accommodate a HCW's workflow. It is recommended that the HCW always perform hand hygiene immediately after leaving a patient zone when they are done working with that patient.

When the red LED is visible, the badge is at the "Non-Compliant" status level. This indicates that the HCW has broken the proper hand hygiene protocol of performing hand hygiene before entering a patient zone (State 2—Non-Compliant Patient Contact), before re-entering a patient zone (State 3—Non-Compliant Patient Re-contact) or after exiting a patient zone (State 5—Non-Compliant After Patient Contact). At any of these status levels, the HCW may have the potential to spread pathogens from one patient to another because the defined hand hygiene procedures have not been followed. As soon as the HCW recognizes that they are at a "Non-Compliant" status level, they should immediately perform hand hygiene, unless a critical patient need takes priority.

In this example, there are four ways that an HCW can reach the "Non-Compliant" (red LED) status level:

1. Failing to perform hand hygiene before entering a patient zone (State 2).

2. Failing to perform hand hygiene when going directly from one patient zone to another patient zone (State 2).

3. Failing to perform hand hygiene before re-entering a patient zone after being away from that specific patient zone for more than 5 minutes (default); i.e., exiting and re-entering the same patient zone after being away for an extended time period (State 3).

4. Failing to perform hand hygiene after exiting a patient zone (State 5).

The steps below can be followed to prevent reaching the "Non-Compliant" (red LED) status level:

1. If the badge is asleep, i.e., no flashing LED is visible, perform hand hygiene at a monitored dispenser to wake it up, and to reset hand hygiene status to "Clean" before entering a patient zone.

2. Check the badge's status level before entering a patient zone.

a. If the badge is at the "green" or "Clean" status level, patient zone entry will be compliant.

b. If the badge is at the "Cue to Clean" status level (yellow LED), avoid patient zone entry until hand hygiene has been performed, assuming that there is no overriding patient safety concern.

3. Before re-entering the same patient zone, verify that the badge is at the "Compliant Patient Re-Contact" status level (green/yellow LEDs). Otherwise, perform hand hygiene before re-entering the patient zone.

4. Perform hand hygiene immediately after leaving a patient zone.

In the example hand hygiene compliance network, each patient bed includes a bed zone end computing device that generates a patient zone around a patient bed and detects an entry event and/or an exit event each time a healthcare worker wearing an electronic identification badge enters and/or leaves the patient zone. The badge patient zone detection time (or "bed attach time") is the length of time a badge remains inside a patient zone before changing from the "Clean" status level (green LED, State 0) to the "Patient Contact" status level (State 1). In one example, the patient zone detection or bed attach time is adjustable/configurable from 0 seconds to 15 seconds with a default time of 3 seconds. The patient zone detection time only applies if the HCW's badge is at the "Clean" status level (State 0) when entering the patient zone. The purpose of the bed attach time feature is to allow the badge to determine if patient zone entry is intentional or unintentional and thus prevent a brief, unintentional patient zone entry from changing the badge's status level (State).

The example compliance badges (such as compliance badges 654A-654N of FIG. 42 and/or compliance badge 700 of FIG. 43, for example) are equipped with three programmable grace periods that assist in maintaining a normal workflow for each user type. Each grace period is designed to make the system fit smoothly into a HCW's (or other user) daily tasks. Adjustable/configurable grace periods also provide flexibility to HCWs with specialized workflows that may otherwise not be compatible with the system. The grace periods are defined by the compliance rules for each user type and may be stored in compliance rules 714 of FIG. 43, for example.

The purpose of the State 0 Grace Period (Clean-After Washing or Sanitizing Hands) is to allow time after an HCW uses a monitored dispenser, during which their badge will ignore patient zones. Immediately after using a monitored dispenser, the badge will ignore patient zone entry and maintain the "Clean" Status level (State 0) for the duration of the grace period. After the grace period expires, the badge will behave normally and change to the "Clean Patient Contact" status level (State 1) when patient zone entry occurs. The State 0 Grace Period can be adjusted between 0 and 60 seconds. The factory default is 15 seconds.

Figure 49:
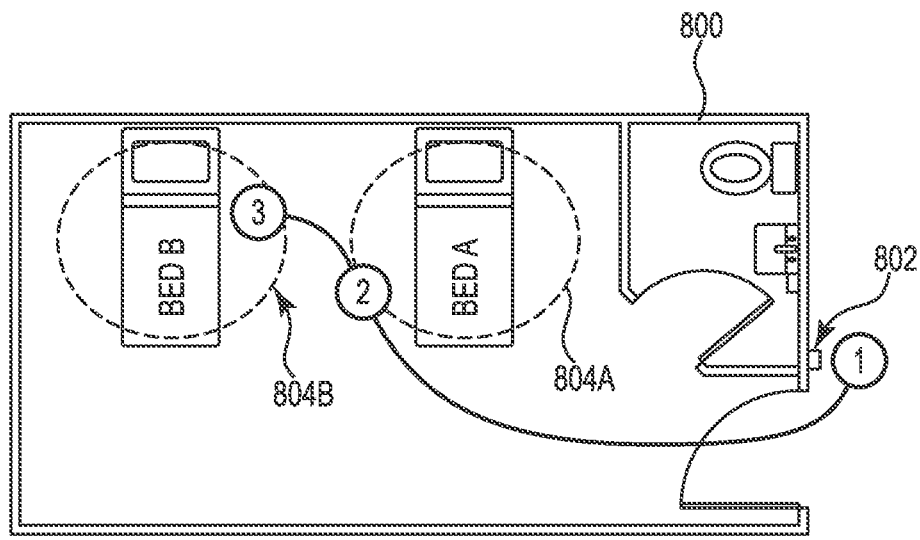
FIG. 49 shows an example HCW workflow and the State 0 grace period.

FIG. 49 shows an example HCW workflow and the State 0 grace period. An HCW uses a monitored sanitizer dispenser 802 next to a door to a patient room 800. The HCW's badge is now at the "Clean" status level (green LED, State 0). The HCW then enters the patient room 800 which includes two beds (FIG. 49 step 1). The HCW needs to attend to the patient in the bed furthest from the door (bed B). The HCW must walk past the bed of the patient closest to the door (bed A) (FIG. 49 step 2). After performing the hand hygiene at dispenser 802, the HCW's badge enter the State 0 grace period. Without the State 0 Grace Period, it is possible that the HCW's badge could detect the patient zone 804A of bed A as the HCW passes, turn to the "Compliant Patient Contact" status level (State 1) and then turn to the "Non-Compliant" status level (State 2) when the HCW approaches bed B (FIG. 49 step 3). With the State 0 Grace Period set to 15 seconds, the HCW has 15 seconds, from the time the dispenser 802 was activated (FIG. 49 step 1), to walk past bed A (FIG. 49 step 2) without worry that the badge will detect bed A's patient zone 804A. When the HCW enters the patient zone 804B of bed B (FIG. 49 step 3), their badge will correctly turn to the "Compliant Patient Contact" status level (State 1) when the badge's State 0 Grace Period expires.

Figure 50:
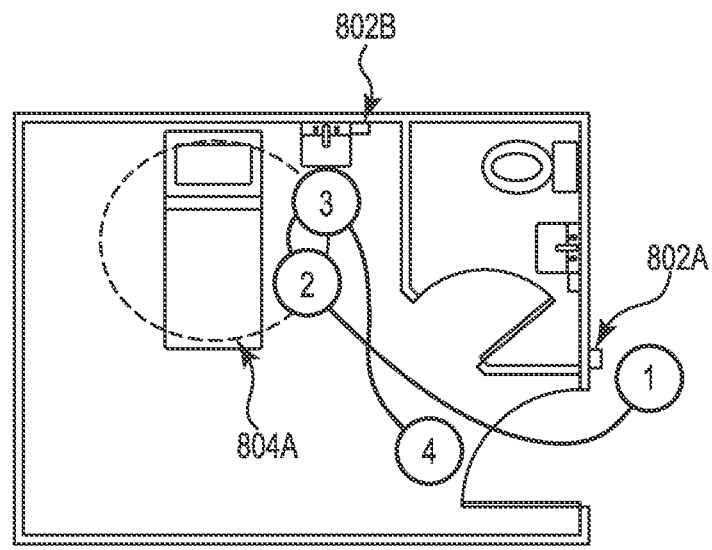
FIG. 50 shows another example HCW workflow and the State 0 grace period.

FIG. 50 shows another example HCW workflow and the State 0 grace period. An HCW uses a monitored sanitizer dispenser 802A next to a patient room door and then enters the patient room (FIG. 50 step 1). The HCW's badge is now at the "Clean" status level (State 0). The HCW enters the patient zone 804A, their badge changes to the "Compliant Patient Contact" status level (State 1) and they attend to the patient (FIG. 50 step 2). The HCW then approaches the hand-washing sink next to the patient bed, activates the dispenser 802B and washes their hands (FIG. 50 step 3). In this example, the HCW is within the patient zone at the time the dispenser is actuated. Without the State 0 Grace Period, the HCW's badge would change to the "Clean" status level (State 0) after dispenser activation and then immediately change back to the "Compliant Patient Contact" status level (State 1) because of interaction with the patient zone. This would require the HCW to activate the dispenser outside the patient room door to get the badge back to the "Clean" status level (State 0) after exiting the patient zone.

With the State 0 Grace Period set to 15 seconds, the HCW activates the dispenser (FIG. 50 step 3) causing the badge to change to the "Clean" status level. After activating the dispenser, the HCW has 15 seconds to complete their hand-wash and exit the patient zone (FIG. 50 step 4). All the while, the badge is ignoring the patient zone allowing the badge to remain at the "Clean" status level.

The purpose of the State 2 grace period (Non-Compliant Patient Contact) is to prevent the HCW's badge from entering the "Non-Compliant" status level if the HCW briefly and unintentionally moves from one patient zone to another. In this example, when a badge with a "Clean" status level (State 0) enters a patient zone, it will change to the "Compliant Patient Contact" status level (State 1). If the HCW wearing the badge exits the patient zone and enters a different patient zone, the badge should immediately change to the "Non-Compliant" status level (State 2). However, in areas where patient beds are particularly close to one another, it may be unreasonable to enforce non-compliant bed-to-bed contact so strictly. To this end, the State 2 grace period allows an HCW to briefly enter a second patient zone without penalty.

The badge's internal State 2 Grace Period timer starts the moment an HCW exits the patient zone of initial contact. During this time, the HCW's badge will ignore other patient zones until the grace period expires (30 seconds for default setting). If the HCW enters a second patient zone during the State 2 grace period, the badge will produce warning beeps indicating the HCW has entered the second patient zone. Once the grace period expires, the badge will change to the "Non-Compliant" (red LED) status level (State 2) if the HCW is currently inside a second patient zone or enters a second patient zone. If the HCW re-enters the patient zone of initial contact prior to grace period expiration, the internal timer will reset and the badge will remain at the "Compliant Patient Contact" status level (State 1). In the present example, the State 2 grace period can be adjusted between 0 and 60 seconds, and the factory default is 30 seconds.

Figure 51:
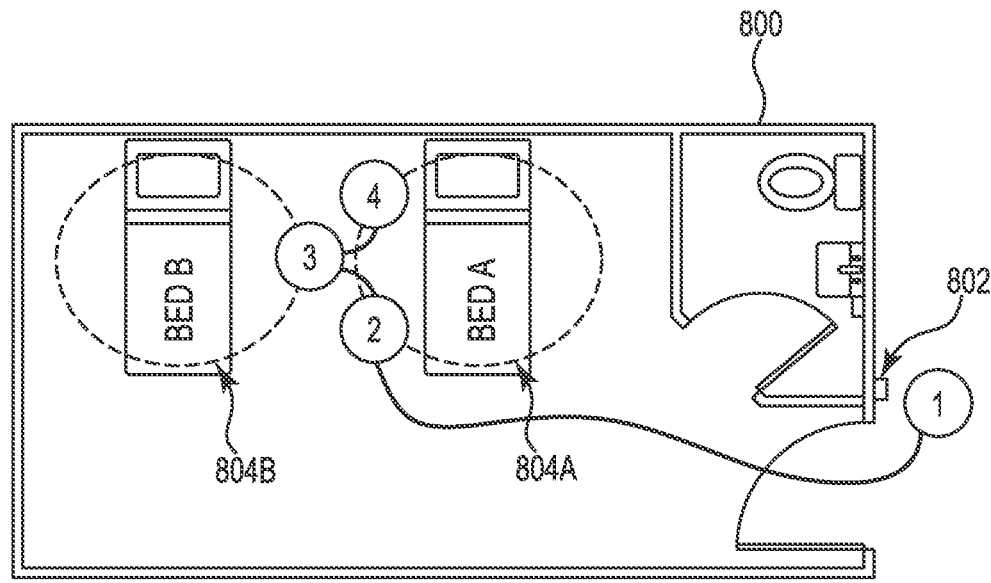
FIG. 51 shows another example HCW workflow and the State 2 grace period.

FIG. 51 illustrates an example HCW workflow and the State 2 grace period. An HCW uses a monitored sanitizer dispenser 802 next to a patient room door and then enters the patient room 800 (FIG. 51 step 1). The HCW's badge is now at the "Clean" status level (State 0). The HCW enters the bed A patient zone 804A, their badge changes to the "Compliant Patient Contact" status level (State 1) and they attend to the patient (FIG. 51 step 2). The HCW unintentionally steps out of the bed A patient zone 804A and into the bed B patient zone 804B (FIG. 51 step 3). Without the State 2 grace period, the HCW's badge would change to the "Non-Compliant" (red LED) status level (State 2) and a non-compliant event would be logged by the system. With the State 2 grace period, the HCW's badge will ignore the bed B patient zone 804B until the State 2 grace period expires. If the HCW moves back into bed A's patient zone 804A before the grace period expires (FIG. 51 step 4), the badge will remain at the "Compliant Patient Contact" status level (State 1) and no event is reported to the system. By re-entering the bed, A patient zone 804A before the grace period expired, the badge's internal State 2 grace period timer was reset. This means that the HCW could repeat FIG. 51 steps 3 and 4 indefinitely, as long as the State 2 grace period does not expire during step 3.

The purpose of the State 3 grace period (Compliant Patient Re-contact) is to provide an HCW with flexibility while working around a patient bed by giving them the ability to enter, exit and re-enter the same patient zone as many times as necessary without having to perform hand hygiene before each re-entry. When a badge having a "Clean" status level (State 0) enters a patient zone, it will change to the "Compliant Patient Contact" status level (State 1). When the badge leaves the patient zone, it will change to the "Compliant Patient Re-Contact" status level (State 1) with green and yellow flashing LEDs (FIG. 48).

The State 3 grace period begins at the moment the badge leaves the patient zone and will reset when the badge re-enters the patient zone, unless the State 3 grace period has expired before re-entry. If the State 3 grace period has expired, the badge may beep, for example, three times, and change to the "Cue to Clean" status level with only the yellow LED flashing. Now, the badge will change to the "Non-Compliant" (red LED) status level (State 3) if it re-enters the patient zone unless the HCW performs hand hygiene prior to entry.

In this example, the State 3 grace period may be adjusted between 1 minute and 45 minutes. The factory default may be, for example, 5 minutes.

Figure 52:
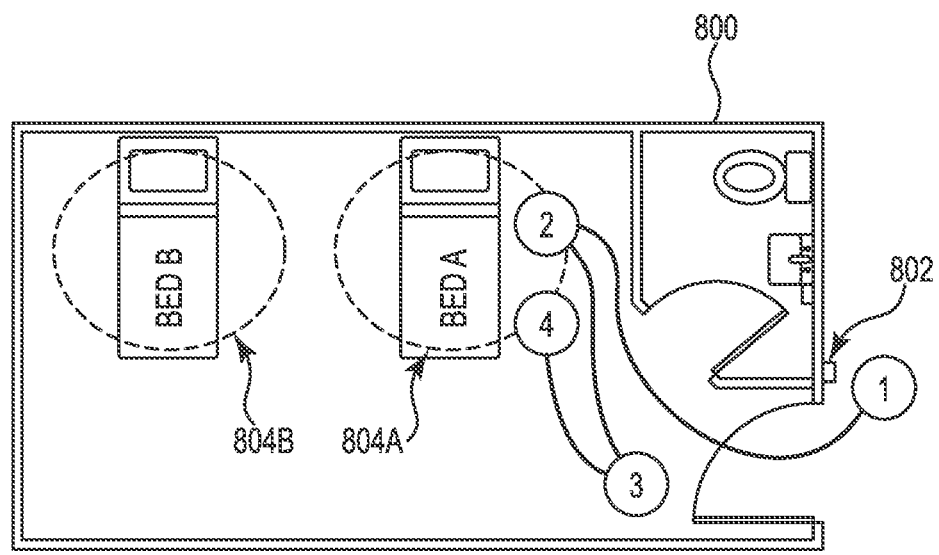
FIG. 52 shows another example HCW workflow and the State 3 grace period.

FIG. 52 illustrates an example HCW workflow and the State 3 grace period. An HCW uses a monitored sanitizer dispenser 802 next to a patient room door and then enters the patient room 800 (FIG. 52 step 1). The HCW's badge is now at the "Clean" status level (State 0). The HCW enters the patient zone 804A, their badge changes to the "Compliant Patient Contact" status level (State 1) and they attend to the patient (FIG. 52 step 2). The HCW then exits the patient zone 804A (FIG. 52 step 3), the badge changes to the "Compliant Patient Re-contact" status level (State 1), the green and yellow LEDs flash and the State 3 grace period internal timer starts. If the HCW re-enters the patient zone 804A before the State 3 grace period has expired (FIG. 52 step 4), the badge will return to the "Compliant Patient Contact" status level (State 1), only the green LED will flash and the State 3 grace period internal timer will be reset.

If the State 3 grace period expires, the badge will beep, for example, three times and change to the "Cue to Clean" status level (State 1) with only the yellow LED flashing. If the HCW re-enters the patient zone 804A while at the "Cue to Clean" status level (FIG. 52 step 4), the badge will change to the "Non-Compliant" status level (red LED). When the State 3 grace period expires, the HCW must perform hand hygiene before re-entering the patient zone.

Table 3 lists example adjustable/configurable badge configurations:

TABLE 3

Hand Hygiene Compliance Badge Configurations

| Configuration Item | Configuration Option (mm:ss) | Default | Size (bits) | 1.5 s Ticks | 1 Minute Ticks |
|---|---|---|---|---|---|
| LED Enabled | 0, 1, 2, 3 | 2 | 2 | N/A | N/A |
| Piezo Enabled | 0, 1, 2, 3 | 1 | 2 | N/A | N/A |
| Bed Attach Time | 00:00-00:15 | 00:03 | 4 | 10 | N/A |
| State 0 Grace Period | 00:00-01:00 | 00:15 | 6 | 40 | N/A |
| State 2 Grace Period | 00:00-06:00 | 00:30 | 8 | 240 | N/A |
| State 3 Grace Period | 01:00-45:00 | 05:00 | 6 | N/A | 45 |
| State 4 Timeout | 05:00-45:00 | 10:00 | 6 | N/A | 45 |
| State 5 Timeout | 03:00-45:00 | 06:00 | 6 | N/A | 45 |

In this example, the State 2 grace period is less than the State 3 grace period, and the State 3 grace period is less than the State 5 timeout. The bed attach time is in multiples of 3, i.e., at 3 second intervals. Thus configuration option 0=0 seconds, 1=3 seconds, 2=6 seconds, 3=9 seconds, 4=12 seconds, and 5=15 seconds.

FIG. 53 shows an example hand hygiene compliant network configuration data packet. FIGS. 54 and 55 show an example LED enable bits truth table and an example piezo enable bits truth table, respectively. In this example, the configuration packet is 5 bytes and includes values for the configurable items listed in Table 3. This data packet may be sent along with a badge configuration message (BCM) whenever a device on the adaptive route network needs to be updated with a more current version of the compliance rules. In examples where more than one user type is supported, multiple configuration data packets, each corresponding to a different one of the supported user roles, would be sent with the BCM. In this way, all of the hubs and dispenser end computing devices are updated with the badge configurations corresponding to tall of the user types. When the badge analyzes dispense event and entry/exit event data, it analyzes that data in conjunction with the configuration corresponding to the user type stored on the badge. Thus, if a compliance badge is programmed as user type "nurse", the compliance badge analyzes the dispense event data and/or entry/ exit event data based on the badge configuration data corresponding to the "nurse" user type.

EXAMPLES

Example 1

A wireless sensor network system, comprising a gateway computing device, a plurality of cluster host computing devices, and a plurality of end computing devices, each end computing device including a sensor that detects event data, each end computing device further configured for wireless bi-directional communication with one of the plurality of cluster-host computing devices; the plurality of cluster host computing devices forming a route between each of the plurality of end devices and the gateway, each cluster host computing device storing a next downstream network address; wherein each of the plurality of cluster host computing devices forming part of the route from one of the plurality of end computing devices to the gateway further modifies a downstream network message received from a previous cluster host computing device, and further: appends a network address of the previous cluster host obtained from a source address field of a downstream network message to an appended addresses field of the downstream network message; sets a source address field of the downstream network message to a network address of the current cluster host computing device; and sets the destination address field of the downstream network message to the next downstream network address stored by the current cluster host computing device; and wherein the current cluster host computing device further wirelessly transmits the modified downstream network message to the next downstream network address contained in the destination field of the modified downstream network message.

Example 2

The system of Example 1, wherein the downstream network message further includes a message payload field including event data corresponding to an event detected one of the end computing device.

Example 3

The system of Example 1, wherein the downstream network message further includes a node count field containing a node count corresponding to a number of nodes between the current cluster host computing device and an originating computing device of the downstream network message, and wherein the current cluster host computing device further increments the node count in the node count field of the downstream network message.

Example 4

The system of Example 1, wherein the downstream network message further includes a message payload field including a factory address of the originating computing device.

Example 5

The system of Example 1, wherein the wireless network comprises a cluster-tree network.

Example 6

The system of Example 1 further comprising a server computing device configured to receive downstream network messages from the gateway computing device; the server computing device further configured to update a portion of a route table corresponding to an originating end computing device, the portion of the route table including a factory address of the originating end computing device, appended network addresses contained in the appended addresses field of the modified downstream network message, and a node count contained in the node count field of the modified network message.

Example 7

The system of Example 6, the server computing device further configured to generate an upstream network message to be transmitted to the originating computing device, the upstream network message including a payload field containing the factory address of the originating computing device, an appended addresses field containing the appended network addresses stored in the portion of the route table corresponding to the originating computing device, and a node count field containing the node count stored in the portion of the route table corresponding to the originating computing device.

Example 8

A method of wireless communication between a first computing device, a second computing device, and a third computing device in a wireless network, comprising storing, by the second computing device, a network address of a third computing device, the third computing device being a next downstream node along a route through the wireless network from the second computing device to a gateway computing device; wirelessly receiving, by the second computing device, a downstream network message from the first computing device, the downstream network message including a source address field containing a network address of the first computing device, a destination address field containing a network address of the second computing device, and an appended address field; modifying, by the second computing device, the downstream network message, comprising appending, by the second computing device, the network address of the first computing device to the appended addresses field of the downstream network message; setting, by the second computing device, the source address field of the downstream network message to the network address of the second computing device; and setting, by the second computing device, the destination address field of the downstream network message to the network address of the third computing device stored by the second computing device; and wirelessly transmitting, by the second computing device, the modified downstream network message to the network address of the third computing device as contained in the destination field of the modified network message.

Example 9

The method of Example 8, wherein the downstream network message further includes a node count field containing a node count corresponding to a number of nodes between the first computing device and an originating computing device of the downstream network message, and wherein modifying the downstream network message further comprises incrementing, by the second computing device, the node count in the node count field of the downstream network message.

Example 10

The method of Example 8, wherein the downstream network message further includes a message payload field including event data corresponding to an event detected at the originating computing device.

Example 11

The method of Example 8, wherein the downstream network message further includes a message payload field including a factory address of the originating computing device.

Example 12

The method of Example 8, wherein the wireless network comprises a cluster-tree network.

Example 13

The method of Example 8, further comprising receiving, by a server computing device and from the gateway computing device, the modified network message; updating, by the server computing device, a portion of a route table corresponding to the originating computing device, the portion of the route table including a factory address of the originating computing device, appended network addresses contained in the appended addresses field of the modified network message, and the node count contained in the node count field of the modified network message.

Example 14

The method of Example 13, further comprising generating, by the server computing device, an upstream network message to be transmitted to the originating computing device, the upstream network message including a payload field containing the factory address of the originating computing device, an appended addresses field containing the appended network addresses stored in the portion of the route table corresponding to the originating computing device, and a node count field containing the node count stored in the portion of the route table corresponding to the originating computing device.

Example 15

The method of Example 13, further comprising receiving, by the second computing device, the upstream network message; modifying, by the second computing device, the upstream network message, comprising setting, by the second computing device, the source address field of the downstream network message to the network address of the second computing device; and setting, by the second computing device, the destination address field of the upstream network message to a next hop network address contained in the appended addresses field of the upstream network message, the next hop network address corresponding to the network address of the first computing device; removing, by the second computing device, the next hop network address from the appended addresses field of the upstream network message; and wirelessly transmitting, by the second computing device, the modified upstream network message to the network address of the first computing device as contained in the destination address field of the modified upstream network message.

Example 16

A method comprising wirelessly receiving, by a server computing device and from a gateway computing device, a network message originating from one of a plurality of end computing devices, the network message including event data corresponding to an event detected at the originating end computing device, the network message further including a list of one or more appended network addresses corresponding to one or more cluster host computing devices forming a wireless communication route between the originating end computing device and the gateway computing device, the network messages further including a node count corresponding to the number of cluster host computing devices forming the wireless communication route between the originating end computing device and the gateway computing device; and maintaining, by the server computing device, and based on the received network message, a portion of a route table corresponding to the originating end computing device, the portion of the route table including the list of one or more appended network addresses and the node count.

Example 17

The method of Example 16, wherein the network message further includes a factory address of the originating end computing device, and the portion of the route table further includes the factory address of the originating end computing device.

Example 18

The method of Example 16, further including generating, by the server computing device, an upstream network message intended for a destination one of the plurality of end computing devices, the upstream network message including the list of one or more appended network addresses from the portion of the route table corresponding to the destination end computing device, and including the node count from the portion of the route table corresponding to the destination end computing device.

Example 19

A method comprising wirelessly receiving, by a current cluster host computing device and from a previous cluster host computing device, a network message originating from one of a plurality of end computing devices, the network message including event data corresponding to an event detected at the originating end computing device; and wirelessly transmitting, by the current cluster host computing device, the network message, the transmitted network message including the event data, a list of one or more appended network addresses corresponding to one or more previous cluster host computing devices forming a wireless communication route between the originating end computing device and the current cluster host computing device, and a node count corresponding to the number of cluster host computing devices forming the wireless communication route between the originating end computing device and the current cluster host computing device.

Example 20

A hand hygiene compliance network, comprising a plurality of end computing devices, each of the plurality of end computing devices associated with a different one of a plurality of hand hygiene product dispensers and configured to detect dispense events; and a server computing device configured to wireless receive, from a gateway computing device, a downstream network message originating from one of the plurality of end computing devices, the downstream network message including dispense event data corresponding to a detected dispense event, the downstream network message further including a list of one or more appended network addresses corresponding to one or more cluster host computing devices forming a wireless communication route between the originating end computing device and the gateway computing device, the downstream network message further including a node count corresponding to the number of cluster host computing devices forming the wireless communication route between the originating end computing device and the gateway computing device, the server computing device further configured to maintain based on the received downstream network message, a portion of a route table corresponding to the originating end computing device, the portion of the route table including the list of one or more appended network addresses and the node count the server computing device further configured to analyze the dispense event data and to monitor hand hygiene compliance based on the analysis.

Various examples have been described. These and other examples are within the scope of the following claims.

The invention claimed is:

1. A wireless sensor network system, comprising:
   a gateway computing device;
   a plurality of cluster host computing devices;
   a plurality of end computing devices, each end computing device including a sensor that detects event data, each end computing device further configured for wireless bi-directional communication with one of the plurality of cluster-host computing devices, wherein an originating one of the plurality of end computing devices generates a downstream network message;
   the plurality of cluster host computing devices forming a route between each of the plurality of end computing devices and the gateway computing device, each cluster host computing device storing a next downstream network address;
   wherein a current cluster host computing device of the plurality of cluster host computing devices forming part of the route from the originating end computing device to the gateway computing device further modifies the downstream network message received from a previous cluster host computing device, and further:
      appends a network address of the previous cluster host computing device obtained from a source address field of the downstream network message to an appended addresses field of the downstream network message;
      sets the source address field of the downstream network message to a network address of the current cluster host computing device; and
      sets a destination address field of the downstream network message to the next downstream network address stored by the current cluster host computing device; and
   wherein, upon modifying of the downstream network message, the current cluster host computing device further wirelessly transmits the downstream network message to the next downstream network address contained in the destination field of the downstream network message; and a server computing device configured to, in response to receipt of the downstream network message from the gateway computing device, update a portion of a route table corresponding to the originating end computing device with appended network addresses contained in the appended addresses field of the downstream network message.

2. The system of claim 1, wherein the downstream network message further includes a message payload field including event data corresponding to an event detected one of the end computing device.

3. The system of claim 1, wherein the downstream network message further includes a node count field containing a node count corresponding to a number of nodes between the current cluster host computing device and an originating computing device of the downstream network message,
and wherein the current cluster host computing device further increments the node count in the node count field of the downstream network message.

4. The system of claim 1, wherein the downstream network message further includes a message payload field including a factory address of the originating computing device.

5. The system of claim 1, wherein the wireless network comprises a cluster-tree network.

6. The system of claim 1, wherein
the server computing device is further configured to update the portion of the route table corresponding to the originating end computing device with a node count contained in a node count field of the downstream network message.

7. The system of claim 6, the server computing device further configured to generate an upstream network message to be transmitted to the originating end computing device, the upstream network message including a payload field containing an address of the originating end computing device, an appended addresses field containing the appended network addresses stored in the portion of the route table corresponding to the originating computing device, and a node count field containing the node count stored in the portion of the route table corresponding to the originating computing device.

8. A method of wireless communication between a first computing device, a second computing device, and a third computing device in a wireless network, comprising:
storing, by the second computing device, a network address of a third computing device, the third computing device being a next downstream node along a route through the wireless network from the second computing device to a gateway computing device;
wirelessly receiving, by the second computing device, a downstream network message from the first computing device, the downstream network message including a source address field containing a network address of the first computing device, a destination address field containing a network address of the second computing device, and an appended address field;
modifying, by the second computing device, the downstream network message, comprising:
appending, by the second computing device, the network address of the first computing device to the appended addresses field of the downstream network message;
setting, by the second computing device, the source address field of the downstream network message to the network address of the second computing device; and
setting, by the second computing device, the destination address field of the downstream network message to the network address of the third computing device stored by the second computing device; and
upon modifying of the downstream network message, wirelessly transmitting, by the second computing device, the downstream network message to the network address of the third computing device as contained in the destination field of the downstream network message,
receiving, by a server computing device and from the third computing device, the downstream network message; and
updating, by the server computing device, a portion of a route table corresponding to an originating computing device of the downstream network message with appended network addresses contained in the appended addresses field of the downstream network message.

9. The method of claim 8, wherein the downstream network message further includes a node count field containing a node count corresponding to a number of nodes between the first computing device and the originating computing device of the downstream network message,
and wherein modifying the downstream network message further comprises incrementing, by the second computing device, the node count in the node count field of the downstream network message.

10. The method of claim 8, wherein the downstream network message further includes a message payload field including event data corresponding to an event detected at the originating computing device.

11. The method of claim 8, wherein the downstream network message further includes a message payload field including a factory address of the originating computing device.

12. The method of claim 8, wherein the wireless network comprises a cluster-tree network.

13. The method of claim 8, further comprising:
updating, by the server computing device, the portion of a route table corresponding to the originating computing device with a node count contained in a node count field of the downstream network message.

14. The method of claim 13, further comprising:
generating, by the server computing device, an upstream network message to be transmitted to the originating computing device, the upstream network message including a payload field containing the factory address of the originating computing device, an appended addresses field containing the appended network addresses stored in the portion of the route table corresponding to the originating computing device, and a node count field containing the node count stored in the portion of the route table corresponding to the originating computing device.

15. The method of claim 14, further comprising:
receiving, by the second computing device, the upstream network message;
modifying, by the second computing device, the upstream network message, comprising:
setting, by the second computing device, the source address field of the downstream network message to the network address of the second computing device; and setting, by the second computing device, the destination address field of the upstream network message to a next hop network address contained in the appended addresses field of the upstream network message, the next hop network address corresponding to the network address of the first computing device;

removing, by the second computing device, the next hop network address from the appended addresses field of the upstream network message; and wirelessly transmitting, by the second computing device, the modified upstream network message to the network address of the first computing device as contained in the destination address field of the modified upstream network message.

16. A method comprising:

wirelessly receiving, by a server computing device and from a gateway computing device, a network message originating from one of a plurality of end computing devices, the network message including event data corresponding to an event detected at the originating end computing device, the network message further including a list of one or more appended network addresses corresponding to one or more cluster host computing devices forming a wireless communication route between the originating end computing device and the gateway computing device, the network messages further including a node count corresponding to the number of cluster host computing devices forming the wireless communication route between the originating end computing device and the gateway computing device;

maintaining, by the server computing device, and based on the received network message, a portion of a route table corresponding to the originating end computing device, the portion of the route table including the list of one or more appended network addresses and the node count; and generating, by the server computing device, an upstream network message intended for a destination one of the plurality of end computing devices, the upstream network message including the list of one or more appended network addresses from the portion of the route table corresponding to the destination end computing device.

17. The method of claim 16, wherein the network message further includes a factory address of the originating end computing device, and the portion of the route table further includes the factory address of the originating end computing device.

18. The method of claim 16, wherein the upstream network message further includes the node count from the portion of the route table corresponding to the destination end computing device.

19. A method comprising:

wirelessly receiving, by a current cluster host computing device and from a previous cluster host computing device, a network message originating from one of a plurality of end computing devices, the network message including event data corresponding to an event detected at the originating end computing device;

wirelessly transmitting, by the current cluster host computing device, the network message, the transmitted network message including the event data, a list of one or more appended network addresses corresponding to one or more previous cluster host computing devices forming a wireless communication route between the originating end computing device and the current cluster host computing device, and a node count corresponding to the number of cluster host computing devices forming the wireless communication route between the originating end computing device and the current cluster host computing device; and updating, by a server computing device and in response to receipt of the network message, a portion of a route table corresponding to the originating end computing device with the list of appended network addresses.

20. A hand hygiene compliance network, comprising:

a plurality of end computing devices, each of the plurality of end computing devices associated with a different one of a plurality of hand hygiene product dispensers and configured to detect dispense events; and a server computing device configured to wireless receive, from a gateway computing device, a downstream network message originating from one of the plurality of end computing devices, the downstream network message including dispense event data corresponding to a detected dispense event, the downstream network message further including a list of one or more appended network addresses corresponding to one or more cluster host computing devices forming a wireless communication route between the originating end computing device and the gateway computing device, the downstream network message further including a node count corresponding to the number of cluster host computing devices forming the wireless communication route between the originating end computing device and the gateway computing device, the server computing device further configured to maintain, based on the received downstream network message, a portion of a route table corresponding to the originating end computing device, the portion of the route table including the list of one or more appended network addresses and the node count;

the server computing device further configured to analyze the dispense event data and to monitor hand hygiene compliance based on the analysis.

* * * * *